(12) United States Patent
Fujimoto et al.

(10) Patent No.: US 10,670,847 B2
(45) Date of Patent: Jun. 2, 2020

(54) ZOOM LENS, OPTICAL APPARATUS, AND METHOD FOR MANUFACTURING THE ZOOM LENS

(71) Applicant: NIKON CORPORATION, Minato-ku, Tokyo (JP)

(72) Inventors: Makoto Fujimoto, Tokyo (JP); Takeshi Umeda, Fujisawa (JP)

(73) Assignee: Nikon Corporation, Tokyo (JP)

( * ) Notice: Subject to any disclaimer, the term of this patent is extended or adjusted under 35 U.S.C. 154(b) by 138 days.

(21) Appl. No.: 15/916,186

(22) Filed: Mar. 8, 2018

(65) Prior Publication Data

US 2018/0196240 A1 Jul. 12, 2018

Related U.S. Application Data

(62) Division of application No. 14/909,139, filed as application No. PCT/JP2014/068447 on Jul. 10, 2014, now Pat. No. 9,939,621.

(30) Foreign Application Priority Data

Aug. 2, 2013 (JP) ................................. 2013-161486
Aug. 2, 2013 (JP) ................................. 2013-161487

(Continued)

(51) Int. Cl.
*G02B 27/64* (2006.01)
*G02B 15/177* (2006.01)
(Continued)

(52) U.S. Cl.
CPC ......... *G02B 15/177* (2013.01); *G02B 15/163* (2013.01); *G02B 27/0025* (2013.01); *G02B 27/646* (2013.01)

(58) Field of Classification Search
CPC ........... H04N 5/23248; H04N 5/23264; H04N 5/2328; H04N 5/23287; G02B 9/00;
(Continued)

(56) References Cited

U.S. PATENT DOCUMENTS 5,078,481 A 1/1992 Nakayama et al.
8,917,455 B2 * 12/2014 Matsuo ................ G02B 15/177
348/345

(Continued)

FOREIGN PATENT DOCUMENTS

CN 101859019 A 10/2010
JP 03-092808 A 4/1991
(Continued)

OTHER PUBLICATIONS

Notice of Allowance dated Dec. 1, 2017 in U.S. Appl. No. 14/909,139.
(Continued)

*Primary Examiner* — Arnel C Lavarias
(74) *Attorney, Agent, or Firm* — SGPatents PLLC

(57) ABSTRACT

A zoom lens includes a first lens group having negative refractive power; a second lens group having positive refractive power; a third lens group having negative refractive power and a fourth lens group having positive refractive power. Upon varying magnification, distances between the first lens group and the second lens group, between the second lens group and the third lens group and between the third lens group and the fourth lens group vary. The second lens group includes a front lens group, an aperture stop, and a rear lens group. Each of the front lens group and the rear lens group includes at least one positive lens. At least a part of the lenses in the second lens group is moved as a group to have a component in a direction perpendicular to an optical axis.

17 Claims, 48 Drawing Sheets

(30) Foreign Application Priority Data

Mar. 11, 2014 (JP) ................................ 2014-047611
Mar. 12, 2014 (JP) ................................ 2014-048994
Mar. 12, 2014 (JP) ................................ 2014-048997

(51) Int. Cl.
   *G02B 15/163* (2006.01)
   *G02B 27/00* (2006.01)

(58) Field of Classification Search
   CPC .......... G02B 9/34; G02B 15/00; G02B 15/14;
                G02B 15/16; G02B 15/177
   USPC ....... 359/554, 557, 676, 686, 754, 771, 781;
              250/201.1, 201.2, 201.4; 348/208.99,
              348/208.2, 208.12; 396/52, 55
   See application file for complete search history.

(56) References Cited

U.S. PATENT DOCUMENTS

| | | | |
|---|---|---|---|
| 9,939,621 B2 * | 4/2018 | Fujimoto | ............. G02B 15/177 |
| 2002/0089761 A1 | 7/2002 | Hirose | |
| 2008/0231968 A1 | 9/2008 | Souma | |
| 2010/0259834 A1 | 10/2010 | Li et al. | |
| 2011/0279908 A1 | 11/2011 | Kon | |
| 2012/0013994 A1 | 1/2012 | Tashiro | |
| 2012/0019928 A1 | 1/2012 | Sato | |
| 2012/0019931 A1 | 1/2012 | Ogata et al. | |
| 2012/0057068 A1 | 3/2012 | Ichikawa et al. | |
| 2012/0057246 A1 | 3/2012 | Heu et al. | |
| 2012/0176529 A1 | 7/2012 | Matsuo et al. | |
| 2013/0027585 A1 | 1/2013 | Soumai | |
| 2013/0141616 A1 | 6/2013 | Imaoka | |
| 2013/0162884 A1 | 6/2013 | Tashiro et al. | |
| 2014/0022647 A1 | 1/2014 | Ogata et al. | |
| 2014/0078375 A1 | 3/2014 | Matsuo et al. | |
| 2015/0085374 A1 | 3/2015 | Matsuo et al. | |

FOREIGN PATENT DOCUMENTS

| | | |
|---|---|---|
| JP | 2001-343584 A | 12/2001 |
| JP | 2002-107627 A | 4/2002 |
| JP | 2006-023323 A | 1/2006 |
| JP | 2008-233611 A | 10/2008 |
| JP | 2009-014767 A | 1/2009 |
| JP | 2011-059597 A | 3/2011 |
| JP | 2011-237737 A | 11/2011 |
| JP | 2012-022106 A | 2/2012 |
| JP | 2012-027262 A | 2/2012 |
| JP | 2012-027283 A | 2/2012 |
| JP | 2012-058406 A | 3/2012 |
| JP | 2013-015778 A | 1/2013 |
| JP | 2013-130675 A | 7/2013 |
| JP | 2013-182054 A | 9/2013 |
| WO | WO 2012/086153 A1 | 6/2012 |

OTHER PUBLICATIONS

Non-Final Office Action dated Aug. 3, 2017 in U.S. Appl. No. 14/909,139.
Office Action dated Nov. 28, 2017, in Japanese Patent Application No. 2014-048994.
Office Action dated Sep. 5, 2017 in Japanese Patent Application No. 2013-161486.
Office Action dated Jun. 22, 2017, in Chinese Patent Application No. 201480051255.9.
Office Action dated Mar. 28, 2017, in Japanese Patent Application No. 2013-161486.
English Translation of International Preliminary Report on Patentability from International Patent Application No. PCT/JP2014/068447, dated Feb. 11, 2016.
International Search Report from International Patent Application No. PCT/JP2014/068447, dated Oct. 14, 2014.

\* cited by examiner

ZOOM LENS, OPTICAL APPARATUS, AND METHOD FOR MANUFACTURING THE ZOOM LENS

TECHNICAL FIELD

The present invention relates to a zoom lens suitable for an imaging apparatus such as a digital camera, a video camera or a camera for a silver salt film, an optical apparatus, and a method for manufacturing the zoom lens.

BACKGROUND ART

In recent years, an imaging element to be used in an optical apparatus such as digital cameras has had high pixels. And, high optical performance has been sought for an imaging lens to be used in an imaging apparatus equipped with an imaging element having high pixels.

Under such background, there has been proposed a zoom lens which comprises, in order from an object side, a first lens group having negative refractive power, a second lens group having positive refractive power, a third lens group having negative refractive power and a fourth lens group having positive refractive power, wherein magnification varying is carried out by varying distances between the neighboring lens groups. For example, refer to Japanese Patent application Laid-Open Gazette No. 2001-343584.

PRIOR ART DOCUMENT

Patent Document

Patent Document 1: Japanese Patent application Laid-Open Gazette No. 2001-343584.

SUMMARY OF THE INVENTION

Problems to be Solved by the Invention

However, the conventional zoom lens as mentioned above has not had sufficient optical performances.

The present invention is made in view of the above-described problem, and has an object to provide a zoom lens capable of realizing an excellent optical performance, an optical apparatus equipped with the zoom lens, and a method for manufacturing the zoom lens.

Means for Solving the Problem

In order to solve the above-mentioned problems, according to a first aspect of the present invention, there is provided a zoom lens comprising, in order from an object side: a first lens group having negative refractive power; a second lens group having positive refractive power; a third lens group having negative refractive power and a fourth lens group having positive refractive power, upon varying magnification, a distance between the first lens group and the second lens group, a distance between the second lens group and the third lens group and a distance between the third lens group and the fourth lens group being varied;

the second lens group including, in order from the object side, a front lens group, an aperture stop, and a rear lens group;

each of the front lens group and the rear lens group including at least one negative lens; and at least a part of the lenses in the second lens group being moved as a movable group to have a component in a direction perpendicular to the optical axis.

According to a second aspect of the present invention, there is provided a zoom lens comprising, in order from an object side: a first lens group having negative refractive power; a second lens group having positive refractive power; a third lens group having negative refractive power and a fourth lens group having positive refractive power;

upon varying magnification from a wide-angle end state to a telephoto end state, a distance between the first lens group and the second lens group, a distance between the second lens group and the third lens group and a distance between the third lens group and the fourth lens group being varied;

the second lens group including, in order from the object side, a front lens group, an aperture stop, and a rear lens group;

each of the front lens group and rear lens group including at least one negative lens; and at least a part of the lenses in the rear lens group being moved to have a component in a direction perpendicular to the optical axis.

According to a third aspect of the present invention, there is provided a zoom lens comprising, in order from an object side: a first lens group having negative refractive power; a second lens group having positive refractive power; a third lens group having negative refractive power and a fourth lens group having positive refractive power;

upon varying magnification from a wide-angle end state to a telephoto end state, the third lens group being moved along the optical axis, a distance between the first lens group and the second lens group, a distance between the second lens group and the third lens group and a distance between the third lens group and the fourth lens group being varied; and the following conditional expression being satisfied:

$$0.50 < m3/fw < 0.80$$

where m3 denotes an amount of movement of the third lens group from the wide angle end state to the telephoto end state, and fw denotes a focal length of the zoom lens in the wide angle end state.

According to a fourth aspect of the present invention, there is provided a zoom lens comprising, in order from an object side: a first lens group having negative refractive power; a second lens group having positive refractive power; a third lens group having negative refractive power and a fourth lens group having positive refractive power;

the second lens group including, in order from the object side, a first segment group having positive refractive power, a second segment group having negative refractive power, an aperture stop and a third segment group;

upon varying magnification, the first lens group, the second lens group and the third lens group being moved along the optical axis, and the position of the fourth lens group being fixed;

upon focusing, at least a part of the third lens group being moved along the optical axis;

the first segment group or the second segment group in the second lens group being moved, as a movable group, to have a component in a direction perpendicular to the optical axis; and the following conditional expression being satisfied:

$$0.15 < |fw/fvr| < 0.50$$

where fw denotes a focal length of the zoom lens in the wide angle end state, and fvr denotes a focal length of said movable group.

According to a fifth aspect of the present invention, there is provided an optical apparatus equipped with the zoom lens according to the first aspect of the present invention.

According to a sixth aspect of the present invention, there is provided a zoom lens according to the second aspect of the present invention.

According to a seventh aspect of the present invention, there is provided an optical apparatus equipped with a zoom lens according to the third aspect of the present invention.

According to an eighth aspect of the present invention, there is provided an optical apparatus equipped with a zoom lens according to the fourth aspect of the present invention.

According to a ninth aspect of the present invention, there is provided a method for manufacturing a zoom lens comprising, in order from an object side: a first lens group having negative refractive power; a second lens group having positive refractive power; a third lens group having negative refractive power and a fourth lens group having positive refractive power, comprising the steps of:

disposing the second lens group to include, in order from the object side, a front lens group, an aperture stop, and a rear lens group;

disposing the front lens group and the rear lens group such that each includes at least one negative lens;

disposing such that, upon varying magnification, a distance between the first lens group and the second lens group, a distance between the second lens group and the third lens group and a distance between the third lens group and the fourth lens group are varied; and disposing at least a part of the lenses in the second lens group to be moved as a movable group to have a component in a direction perpendicular to the optical axis.

According to a tenth aspect of the present invention, there is provided a method for manufacturing a zoom lens comprising, in order from an object side: a first lens group having negative refractive power; a second lens group having positive refractive power; a third lens group having negative refractive power and a fourth lens group having positive refractive power; comprising the steps of:

disposing the second lens group to include, in order from the object side, a front lens group, an aperture stop, and a rear lens group;

disposing such that each of the front lens group and rear lens group includes at least one negative lens;

disposing such that, upon varying magnification from a wide-angle end state to a telephoto end state, a distance between the first lens group and the second lens group, a distance between the second lens group and the third lens group and a distance between the third lens group and the fourth lens group are varied; and disposing such that at least a part of the lenses in the rear lens group is moved to have a component in a direction perpendicular to the optical axis.

According to an eleventh aspect of the present invention, there is provided a method for manufacturing a zoom lens comprising, in order from an object side: a first lens group having negative refractive power; a second lens group having positive refractive power; a third lens group having negative refractive power and a fourth lens group having positive refractive power; comprising the steps of:

disposing such that, upon varying magnification from a wide-angle end state to a telephoto end state, the third lens group is moved along the optical axis, and a distance between the first lens group and the second lens group, a distance between the second lens group and the third lens group and a distance between the third lens group and the fourth lens group are varied; and disposing such that the third lens group satisfies the following conditional expression:

$$0.50 < m3/fw < 0.80$$

where m3 denotes an amount of movement of the third lens group from the wide angle end state to the telephoto end state, and fw denotes a focal length of the zoom lens in the wide angle end state.

According to a twelfth aspect of the present invention, there is provided a method for manufacturing a zoom lens comprising, in order from an object side: a first lens group having negative refractive power; a second lens group having positive refractive power; a third lens group having negative refractive power and a fourth lens group having positive refractive power; comprising the steps of:

disposing the second lens group to include, in order from the object side, a first segment group having positive refractive power, a second segment group having negative refractive power, an aperture stop and a third segment group;

disposing such that, upon varying magnification, the position of the fourth lens group is fixed, and the first lens group, the second lens group and the third lens group are moved along the optical axis;

disposing such that, upon focusing, at least a part of the third lens group is moved along the optical axis;

disposing such that the first segment group or the second segment group in the second lens group is moved as a movable group to have a component in a direction perpendicular to the optical axis; and disposing such that the movable group satisfies the following conditional expression:

$$0.15 < |fw/fvr| < 0.50$$

where fw denotes a focal length of the zoom lens in the wide angle end state, and fvr denotes a focal length of said movable group.

Effect of the Invention

According to the first, fifth and ninth aspects of the present invention, it is possible to provide a zoom lens which can correct chromatic aberration excellently and has superb optical performances, an optical apparatus equipped with the zoom lens and a method for manufacturing the zoom lens.

According to the second, the sixth and the tenth aspects of the present invention, it is possible to provide a zoom lens which can correct chromatic aberration excellently upon both of conducting vibration reduction and non-conducting vibration reduction and has excellent optical performances, an optical apparatus equipped with the zoom lens and a method for manufacturing the zoom lens.

According to the third, the seventh and the eleventh aspects of the present invention, it is possible to provide a zoom lens whose entire length is small and which is compact in size and has excellent optical performances, an optical apparatus equipped with the zoom lens and a method for manufacturing the zoom lens.

According to the fourth, the eighth and the twelfth aspects of the present invention, it is possible to provide a zoom lens which is compact in size and has excellent optical performances upon conducting vibration reduction, an optical apparatus and a method for manufacturing the zoom lens.

BRIEF DESCRIPTION OF THE DRAWINGS

FIGS. 35A and 35B are respectively graphs showing various aberrations of the zoom lens according to the thirteenth Example of the present application in a wide angle state and in a telephoto end state, upon focusing on an infinitely distant object.

FIGS. 41A and 41B are respectively graphs showing various aberrations of the zoom lens according to the 15-th Example of the present application in a wide angle state and in a telephoto end state, upon focusing on an infinitely distant object.

EMBODIMENT FOR CARRYING OUT THE INVENTION

Figure 1A:
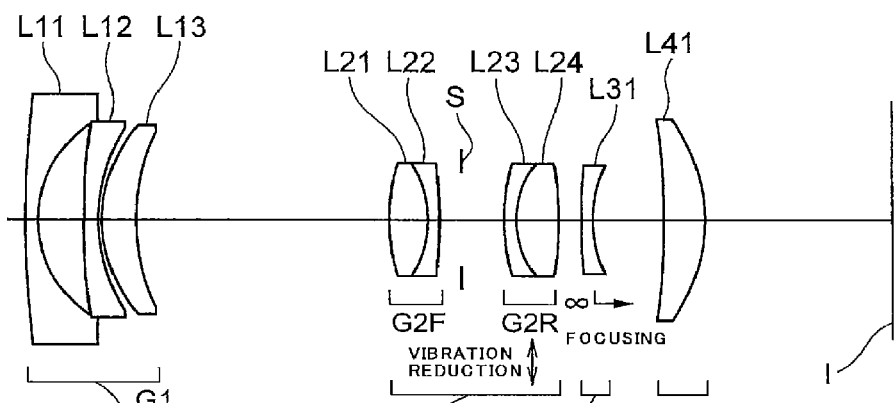
FIGS. 1A and 1B are respectively sectional views showing a zoom lens in a wide angle end state and in a telephoto end state, according to a first Example that is common to the first and second embodiments of the present application.

Hereinafter, a zoom lens, an optical apparatus and a method for manufacturing the zoom lens, according to a first embodiment of the present application will be explained.

A zoom lens according to the first embodiment of the present application comprises, in order from an object side: a first lens group having negative refractive power; a second lens group having positive refractive power; a third lens group having negative refractive power and a fourth lens group having positive refractive power; upon varying magnification, a distance between the first lens group and the second lens group, a distance between the second lens group and the third lens group and a distance between the third lens group and the fourth lens group being varied; the second lens group including, in order from an object side, a front lens group, an aperture stop, and a rear lens group; each of the front lens group and the rear lens group including at least one negative lens; and at least a part of the lenses in the rear lens group being moved as a movable group to have a component in a direction perpendicular to the optical axis. Herein, the front lens group means a lens group comprising optical element(s) disposed at an object side of the aperture stop in the second lens group. The rear lens group means a lens group comprising optical element(s) disposed at an image side of the aperture stop in the second lens group.

In the zoom lens according to the first embodiment of the present application, as described above, at least a part of the lenses in the second lens group is moved as a movable group in a direction including a component perpendicular to the optical axis, thereby it is possible to conduct correction of image blur caused by camera shake as well as vibration, that is, to conduct vibration reduction.

In the zoom lens according to the first embodiment of the present application, as described above, the second lens group includes, in order from the object side, a front lens group, an aperture stop, and a rear lens group, and each of the front lens group and rear lens group includes at least one negative lens. According to this configuration, while the second lens group has positive refractive power, it is possible to correct chromatic aberration within the second lens group, so that it is possible to attain a zoom lens that can correct chromatic aberration and has excellent optical performances.

Moreover, in the zoom lens according to the first embodiment of the present application, it is preferable that the front lens group has positive refractive power. Due to this configuration, the second lens group may be made to have positive refractive power, so a wide angle zoom lens having four group configuration of negative positive negative positive can be realized.

Moreover, in the zoom lens according to the first embodiment of the present application, it is preferable that the rear lens group has positive refractive power. Due to this configuration, the second lens group may be made to have positive refractive power, so a wide angle zoom lens having four group configuration of negative positive negative positive can be realized.

Moreover, in the zoom lens according to the first embodiment of the present application, it is preferable that the second lens group comprises, in order from the object side, a front lens group having positive refractive power, an aperture stop and a rear lens group having positive refractive power. Due to this configuration, symmetric arrangement can be made easily by distributing refractive power in the second lens group in front and rear of the aperture stop, thereby correction of spherical aberration and correction of coma aberration may be balanced well and excellent corrections can be made.

Moreover, in the zoom lens according to the first embodiment of the present application, it is preferable that at least one positive lens and at least one negative lens are included in the front lens group and in the rear lens group in the second lens group. Due to this configuration, degree of freedom of correction of chromatic aberration may be secured in comparison with a single lens configuration, so it is possible to set suitably refractive index and Abbe number of each lens composing the front lens group and the rear lens group. Further, since the rear lens group includes at least one positive lens and at least one negative lens, corrections of longitudinal chromatic aberration and lateral chromatic aberration upon conducting no vibration reduction and corrections of longitudinal chromatic aberration and lateral chromatic aberration upon conducting the vibration reduction can be well balanced while making refractive power of the movable group large.

Moreover, in the zoom lens according to the first embodiment of the present application, it is preferable that each of the front lens group and the rear lens group is composed of one positive lens and one negative lens. Further, it is preferable that each of the front lens group and the rear lens group is composed of one cemented lens. Furthermore, it is preferable in symmetric point of view, that the second lens group includes, in order from the object side, a positive lens, a negative lens, an aperture stop, a negative lens and a positive lens, or that the second lens group includes, in order from the object side, a negative lens, a positive lens, an aperture stop, a positive lens and a negative lens.

Moreover, in the zoom lens according to the first embodiment of the present application, it is preferable that the following conditional expression (1-1) is satisfied:

$$1.00 < |f2vr|/fw < 4.00 \quad (1\text{-}1),$$

where f2vr denotes a focal length of the movable group; and fw denotes a focal length of the zoom lens in the wide angle end state.

The conditional expression (1-1) defines the focal length of the movable group in the second lens group. The zoom lens in the first embodiment of the present application can correct excellently coma aberration and spherical aberration by satisfying the conditional expression (1-1).

When the value of |f2vr|/fw is equal to or falls below the lower limit value of the conditional expression (1-1), susceptibility of decentering of the movable group is increased, that is, various aberrations are apt to be generated in the case where decentering is generated in the movable group due to manufacturing error or the like, thereby coma aberration being deteriorated. Incidentally, in order to attain the effect of the present application more surely, it is more preferable to set the lower limit value of the conditional expression (1-1) to 1.50. Moreover, in order to attain the effect of the present application more surely, it is more preferable to set the lower limit value of the conditional expression (1-1) to 2.00.

On the other hand, when the value of |f2vr|/fw is equal to or exceeds the upper limit value of the conditional expression (1-1), an amount of the movement of the movable group upon conducting vibration reduction is increased, so that it becomes difficult to make the outer diameter or the entire length of the zoom lens according to the first embodiment of the present application small. If refractive power of the lenses other than the movable group in the second lens group is made large in order to secure refractive power of the second lens group, spherical aberration as well as coma aberration is deteriorated. This is not preferable. Incidentally, in order to attain the effect of the present application more surely, it is preferable to set the upper limit value of the conditional expression (1-1) to 3.50. Further, in order to attain the effect of the present application more surely, it is preferable to set the upper limit value of the conditional expression (1-1) to 3.20.

Moreover, in the zoom lens according to the first embodiment of the present application, it is preferable that the following conditional expression (1-2) is satisfied:

$$0.50 < |f2vr|/f2 < 5.00 \quad (1\text{-}2),$$

where f2vr denotes a focal length of the movable group; and f2 denotes a focal length of the second lens group.

The conditional expression (1-2) defines the focal length of the movable group in the second lens group. The zoom lens in the first embodiment of the present application can correct excellently coma aberration and spherical aberration by satisfying the conditional expression (1-2).

When the value of |f2vr|/f2 is equal to or falls below the lower limit value of the conditional expression (1-2), refractive power of the movable group becomes large and refractive power of other lenses than the movable group in the second lens group becomes small, so spherical aberration and coma aberration are deteriorated. Incidentally, in order to attain the effect of the present application more surely, it is more preferable to set the lower limit value of the conditional expression (1-2) to 1.00. Moreover, in order to attain the effect of the present application more surely, it is more preferable to set the lower limit value of the conditional expression (1-2) to 1.50.

On the other hand, when the value of |f2vr|/f2 is equal to or exceeds the upper limit value of the conditional expression (1-2), refractive power of the movable group becomes small, and refractive power of lenses in the second lens group other than the movable group becomes large so that coma aberration becomes deteriorated. This is not preferable.

Incidentally, in order to attain the effect of the present application more surely, it is preferable to set the upper limit value of the conditional expression (1-2) to 4.00. Further, in order to attain the effect of the present application more surely, it is preferable to set the upper limit value of the conditional expression (1-2) to 3.00. Furthermore, in order to attain the effect of the present application more surely, it is preferable to set the upper limit value of the conditional expression (1-2) to 2.50.

Moreover, in the zoom lens according to the first embodiment of the present application, it is preferable that the following conditional expression (1-3) is satisfied:

$$1.00 < m12/fw < 2.00 \quad (1\text{-}3)$$

where m12 denotes an amount of variation in a distance along the optical axis from the most image side lens surface in the first lens group to the most object side lens surface in the second lens group upon varying magnification from the wide angle end state to the telephoto end state; and fw denotes a focal length of the zoom lens in the wide angle end state.

The conditional expression (1-3) defines an amount of variation of an air distance between the first lens group and the second lens group upon varying magnification from the wide angle end state to the telephoto end state. The zoom lens in the first embodiment of the present application can correct excellently spherical aberration, coma aberration, chromatic aberration and curvature of field, while preventing the entire length of the zoom lens from being increased, by satisfying the conditional expression (1-3).

When the value of m12/fw is equal to or falls below the lower limit value of the conditional expression (1-3), refractive power of each lens group is increased, or an amount of movement of each lens group upon varying magnification is increased. For this reason, decentering susceptibility is increased, and the entire length of the zoom lens according to the first embodiment of the present application becomes large. Moreover, optical performances are deteriorated. In more detail, spherical aberration, coma aberration and chromatic aberration are deteriorated. In particular, refractive power of the third lens group is increased, and thereby curvature of field is deteriorated.

Incidentally, in order to attain the effect of the present application more surely, it is more preferable to set the lower limit value of the conditional expression (1-3) to 1.20. Moreover, in order to attain the effect of the present application more surely, it is more preferable to set the lower limit value of the conditional expression (1-3) to 1.40. Moreover, in order to attain the effect of the present application more surely, it is more preferable to set the lower limit value of the conditional expression (1-3) to 1.45.

On the other hand, when the value of m12/fw is equal to or exceeds the upper limit value of the conditional expression (1-3), the entire length of the zoom lens according to the first embodiment of the present application is increased. For this reason, it becomes difficult to make the entire length or the outer diameter of the zoom lens according to the first embodiment of the present application small and compact. In particular, a distance between the lens group(s) (the third lens group or the fourth lens group) disposed at the image side of the second lens group and the aperture stop in the telephoto end state is increased, so that susceptibility of decentering curvature of field of the said lens group(s)(the third lens group or the fourth lens group) is undesirably increased. Incidentally, in order to attain the effect of the present application more surely, it is preferable to set the upper limit value of the conditional expression (1-3) to 1.80. Further, in order to attain the effect of the present application more surely, it is preferable to set the upper limit value of the conditional expression (1-3) to 1.65.

Moreover, in the zoom lens according to the first embodiment of the present application, it is preferable that, upon varying magnification from the wide angle end state to the telephoto end state, the first lens group, the second lens group and the third lens group are moved along the optical axis and the position of the lens group disposed at the most image side is fixed. With this configuration, the lens group disposed at the most image side is fixed upon varying magnification, and it is possible to reduce susceptibility of decentering coma aberration.

Moreover, in the zoom lens according to the first embodiment of the present application, it is preferable that the front lens group includes at least two lenses and has at least one aspherical surface. It is possible to correct excellently chromatic aberration by the at least two lenses, particularly by combining a positive lens and a negative lens. Further, by the front lens group including at least two lenses and having at least one aspherical surface, spherical aberration and coma aberration can be corrected excellently. Furthermore, the front lens group may be configured to include least number of lenses by the said two lens configuration.

The optical apparatus of the present application is characterized in being equipped with the zoom lens according to the first embodiment having the above mentioned configuration, and thereby it is possible to realize the optical apparatus that can correct well chromatic aberration at both times when vibration reduction is conducted and when no vibration reduction is conducted and that has superb optical performances.

A method for manufacturing a zoom lens according to the first embodiment of the present application which comprises, in order from an object side: a first lens group having negative refractive power; a second lens group having positive refractive power; a third lens group having negative refractive power and a fourth lens group having positive refractive power, being characterized in comprising the steps of:

disposing the second lens group to include, in order from the object side, a front lens group, an aperture stop, and a rear lens group;

disposing the front lens group and the rear lens group such that each includes at least one negative lens;

disposing such that, upon varying magnification, a distance between the first lens group and the second lens group, a distance between the second lens group and the third lens group and a distance between the third lens group and the fourth lens group are varied; and disposing at least a part of the lenses in the second lens group to be moved as a movable group to have a component in a direction perpendicular to the optical axis. With this configuration, it is possible to manufacture a zoom lens which can correct chromatic aberration excellently at both times when vibration reduction is conducted and when no vibration reduction is conducted, and which has excellent optical performances.

Next, a zoom lens, an optical apparatus and a method for manufacturing the zoom lens, according to a second embodiment of the present application will be explained.

A zoom lens according to the second embodiment of the present application comprises, in order from an object side: a first lens group having negative refractive power; a second lens group having positive refractive power; a third lens group having negative refractive power and a fourth lens group having positive refractive power;

upon varying magnification from a wide-angle end state to a telephoto end state, a distance between the first lens group and the second lens group, a distance between the second lens group and the third lens group and a distance between the third lens group and the fourth lens group being varied;

the second lens group including, in order from the object side, a front lens group, an aperture stop, and a rear lens group;

each of the front lens group and the rear lens group including at least one negative lens; and at least a part of the lenses in the rear lens group being moved to have a component in a direction perpendicular to the optical axis.

Here, the front lens group means a lens group consisting of lens element(s) disposed at the object side of the aperture stop in the second lens group, and the rear lens group means a lens group consisting of lens element(s) disposed at the image side of the aperture stop in the second lens group.

In the zoom lens according to the second embodiment of the present application, as described above, at least a part of the lenses in the second lens group is moved as a movable group to have a component in a direction perpendicular to the optical axis, thereby it being possible to conduct correction of image blur caused by camera shake as well as vibration, that is, vibration reduction being conducted.

In the zoom lens according to the second embodiment of the present application, as described above, the second lens group includes, in order from the object side, a front lens group, an aperture stop, and a rear lens group, and each of the front lens group and rear lens group includes at least one negative lens. According to this configuration, corrections of longitudinal chromatic aberration and lateral chromatic aberration upon conducting no vibration reduction and corrections of longitudinal chromatic aberration and lateral chromatic aberration upon conducting vibration reduction may be balanced well.

By the above mentioned configuration, it is possible to realize a zoom lens by which chromatic aberrations can be corrected excellently at both times when vibration reduction is conducted and when vibration reduction is not conducted, and which has superb optical performances.

Moreover, in the zoom lens according to the second embodiment of the present application, it is preferable that the front lens group has positive refractive power. Due to this configuration, it is possible for the second lens group to have positive refractive power.

Moreover, in the zoom lens according to the second embodiment of the present application, it is preferable that the rear lens group has positive refractive power. Due to this configuration, it is possible for the second lens group to have positive refractive power.

Moreover, in the zoom lens according to the second embodiment of the present application, it is preferable that the second lens group comprises, in order from the object side, a front lens group having positive refractive power, an aperture stop and a rear lens group having positive refractive power. Due to this configuration, symmetric arrangement can be made easily by distributing refractive power in the second lens group in front and rear of the aperture stop, thereby correction of spherical aberration and correction of coma aberration may be balanced well and excellent corrections can be made.

Moreover, in the zoom lens according to the second embodiment of the present application, it is preferable that at least one positive lens and at least one negative lens are included in the front lens group and in the rear lens group in the second lens group. Due to this configuration, degree of freedom of correction of chromatic aberration may be secured in comparison with a single lens configuration, so it is possible to set suitably refractive index and Abbe number of each lens composing the front lens group and the rear lens group. Further, since the rear lens group includes at least one positive lens and at least one negative lens, corrections of longitudinal chromatic aberration and lateral chromatic aberration upon conducting no vibration reduction and corrections of longitudinal chromatic aberration and lateral chromatic aberration upon conducting the vibration reduction can be well balanced while making refractive power of the movable group large.

Moreover, in the zoom lens according to the second embodiment of the present application, it is preferable that each of the front lens group and the rear lens group is composed of one positive lens and one negative lens. Further, it is preferable that each of the front lens group and the rear lens group is composed of one cemented lens. Furthermore, it is preferable in symmetric point of view, that the second lens group includes, in order from the object side, a positive lens, a negative lens, an aperture stop, a negative lens and a positive lens, or that the second lens group includes, in order from the object side, a negative lens, a positive lens, an aperture stop, a positive lens and a negative lens.

Moreover, in the zoom lens according to the second embodiment of the present application, it is preferable that the following conditional expression (2-1) is satisfied:

$$1.00 < |f2i|/fw < 4.00 \qquad (2\text{-}1),$$

where f2i denotes a focal length of the rear lens group; and fw denotes a focal length of the zoom lens in the wide angle end state.

The conditional expression (2-1) defines the focal length of the rear lens group in the second lens group. The zoom lens according to the second embodiment of the present application can correct excellently coma aberration and spherical aberration by satisfying the conditional expression (2-1).

When the value of |f2i|/fw is equal to or falls below the lower limit value of the conditional expression (2-1), susceptibility of decentering of the rear lens group is increased, in other words, various aberrations are apt to be generated in the case where decentering is generated in the rear lens group due to manufacturing error or the like, thereby coma aberration being deteriorated. Incidentally, in order to attain the effect of the present application more surely, it is more preferable to set the lower limit value of the conditional expression (2-1) to 1.50. Moreover, in order to attain the effect of the present application more surely, it is more preferable to set the lower limit value of the conditional expression (2-1) to 2.00.

On the other hand, when the value of |f2i|/fw is equal to or exceeds the upper limit value of the conditional expression (2-1), an amount of the movement of the vibration reduction lens group that is at least a part of lenses in the rear lens group, upon conducting the vibration reduction is increased, so that it becomes difficult to make the outer diameter or the entire length of the zoom lens according to the second embodiment of the present application small. Further, refractive power of the rear lens group becomes small. If refractive power of the front lens group is made large in order to secure the refractive power of the second lens group, spherical aberration as well as coma aberration is deteriorated. This is not preferable. Incidentally, in order to attain the effect of the present application more surely, it is preferable to set the upper limit value of the conditional expression (2-1) to 3.50. Further, in order to attain the effect of the present application more surely, it is preferable to set the upper limit value of the conditional expression (2-1) to 3.20.

Moreover, in the zoom lens according to the second embodiment of the present application, it is preferable that the following conditional expression (2-2) is satisfied:

$$0.50 < |f2i|/f2 < 5.00 \qquad (2\text{-}2),$$

where f2i denotes a focal length of the rear lens group; and f2 denotes the focal length of the second lens group.

The conditional expression (2-2) defines the focal length of the rear lens group in the second lens group. The zoom lens in the second embodiment of the present application can correct excellently coma aberration and spherical aberration by satisfying the conditional expression (2-2).

When the value of |f2i|/f2 is equal to or falls below the lower limit value of the conditional expression (2-2), refractive power of the rear lens group becomes large and refractive power of the front lens group become small, so spherical aberration and coma aberration are undesirably deteriorated. Incidentally, in order to attain the effect of the present application more surely, it is more preferable to set the lower limit value of the conditional expression (2-2) to 1.00. Moreover, in order to attain the effect of the present application more surely, it is more preferable to set the lower limit value of the conditional expression (2-2) to 1.50.

On the other hand, when the value of |f2i|/f2 is equal to or exceeds the upper limit value of the conditional expression (2-2), refractive power of the rear lens group becomes small, and refractive power of the front lens group becomes large, so that coma aberration becomes deteriorated. This is not preferable.

Incidentally, in order to attain the effect of the present application more surely, it is preferable to set the upper limit value of the conditional expression (2-2) to 4.00. Further, in order to attain the effect of the present application more surely, it is preferable to set the upper limit value of the conditional expression (2-2) to 3.00. Furthermore, in order to attain the effect of the present application more surely, it is preferable to set the upper limit value of the conditional expression (2-2) to 2.50.

Moreover, in the zoom lens according to the second embodiment of the present application, it is preferable that the following conditional expression (2-3) is satisfied:

$$1.00 < m12/fw < 2.00 \quad (2\text{-}3),$$

where m12 denotes an amount of variation in a distance along the optical axis from the most image side lens surface in the first lens group to the most object side lens surface in the second lens group from the wide angle end state to the telephoto end state; and fw denotes the focal length of the zoom lens in the wide angle end state.

The conditional expression (2-3) defines an amount of variation of an air distance between the first lens group and the second lens group upon varying magnification from the wide angle end state to the telephoto end state.

The zoom lens in the second embodiment of the present application can correct excellently spherical aberration, coma aberration, chromatic aberration and curvature of field, while preventing the entire length of the zoom lens from being increased, by satisfying the conditional expression (2-3).

When the value of m12/fw is equal to or falls below the lower limit value of the conditional expression (2-3), refractive power of each lens group is increased, or amount of movement upon varying magnification is increased, or amount of movement of each lens group upon varying magnification is increased. For this reason, decentering susceptibility is increased, and the entire length of the zoom lens according to the second embodiment of the present application becomes large. Moreover, optical performances are deteriorated. In more detail, spherical aberration, coma aberration and chromatic aberration are deteriorated undesirably. In particular, refractive power of the third lens group is increased, and thereby curvature of field is deteriorated undesirably. Incidentally, in order to attain the effect of the present application more surely, it is more preferable to set the lower limit value of the conditional expression (2-3) to 1.20. Moreover, in order to attain the effect of the present application more surely, it is more preferable to set the lower limit value of the conditional expression (2-3) to 1.40. Moreover, in order to attain the effect of the present application more surely, it is more preferable to set the lower limit value of the conditional expression (2-3) to 1.45.

On the other hand, when the value of m12/fw is equal to or exceeds the upper limit value of the conditional expression (2-3), the entire length of the zoom lens according to the first embodiment of the present application is undesirably increased. For this reason, it becomes difficult to make the entire length or the outer diameter of the zoom lens according to the second embodiment of the present application small and compact. In particular, a distance between the lens group(s) (the third lens group or the fourth lens group) disposed at the image side of the second lens group and the aperture stop in the telephoto end state is increased, so that susceptibility of decentering curvature of field of the said lens group(s) (the third lens group or the fourth lens group) is undesirably increased. Incidentally, in order to attain the effect of the present application more surely, it is preferable to set the upper limit value of the conditional expression (2-3) to 1.80. Further, in order to attain the effect of the present application more surely, it is preferable to set the upper limit value of the conditional expression (2-3) to 1.65.

Moreover, in the zoom lens according to the second embodiment of the present application, it is preferable that, upon varying magnification from the wide angle end state to the telephoto end state, the first lens group, the second lens group and the third lens group are moved along the optical axis and the position of the fourth lens group is fixed. With this configuration, the fourth lens group is fixed upon varying magnification, and it is possible to reduce susceptibility of decentering coma aberration.

Moreover, in the zoom lens according to the second embodiment of the present application, it is preferable that the front lens group includes at least two lenses and has at least one aspherical surface. It is possible to correct excellently chromatic aberration by the at least two lenses, particularly by combining a positive lens and a negative lens. Further, by the front lens group including at least two lenses and having at least one aspherical surface, spherical aberration and coma aberration can be corrected excellently. Furthermore, the front lens group may be configured to include least number of lenses by the said two lens configuration.

The optical apparatus of the present application is characterized in being equipped with the zoom lens according to the second embodiment having the above mentioned configuration, and thereby it is possible to realize the optical apparatus that can correct well chromatic aberration at both times when vibration reduction is conducted and when no vibration reduction is conducted, and that has superb optical performances.

A method for manufacturing the zoom lens according to the second embodiment of the present application which comprises, in order from an object side: a first lens group having negative refractive power; a second lens group having positive refractive power; a third lens group having negative refractive power and a fourth lens group having positive refractive power, being characterized in comprising the steps of:

disposing the second lens group to include, in order from an object side, a front lens group, an aperture stop, and a rear lens group;

disposing the front lens group and the rear lens group such that each includes at least one negative lens;

disposing such that, upon varying magnification from the wide angle state to the telephoto end state, a distance between the first lens group and the second lens group, a distance between the second lens group and the third lens group and a distance between the third lens group and the fourth lens group are varied; and disposing at least a part of the lenses in the rear lens group to be moved to have a component in a direction perpendicular to the optical axis. With this configuration, it is possible to manufacture a zoom lens which can correct chromatic aberration excellently at both times when vibration reduction is conducted and when no vibration reduction is conducted, and which has excellent optical performances.

Next, a zoom lens, an optical apparatus and a method for manufacturing the zoom lens, according to a third embodiment of the present application will be explained.

A zoom lens according to the third embodiment of the present application comprising, in order from an object side: a first lens group having negative refractive power; a second lens group having positive refractive power; a third lens group having negative refractive power and a fourth lens group having positive refractive power;

upon varying magnification from a wide-angle end state to a telephoto end state, the third lens group being moved along the optical axis, a distance between the first lens group and the second lens group, a distance between the second lens group and the third lens group and a distance between the third lens group and the fourth lens group being varied; and the following conditional expression being satisfied:

$$0.50 < m3/fw < 0.80 \quad (3\text{-}1)$$

where m3 denotes an amount of movement of the third lens group upon varying magnification from the wide angle end state to the telephoto end state, and fw denotes a focal length of the zoom lens in the wide angle end state.

The conditional expression (3-1) defines the amount of movement of the third lens group in the third lens group upon varying magnification from a wide-angle end state to a telephoto end state. The zoom lens in the third embodiment of the present application can be downsized and can correct excellently spherical aberration, chromatic aberration, coma aberration and field of curvature, by satisfying the conditional expression (3-1).

Moreover, in the zoom lens according to the third embodiment of the present application, the amount of movement upon varying magnification, which was born by the first lens group and the second lens group in the conventional zoom lens, can be born not only by the first lens group and the second lens group and also by the third lens group disposed at the image side of the second lens group, thereby constitutional elements (such as cam cylinder and the like) used for moving optical elements in a lens barrel being able to be reduced in length so that the entire length of the zoom lens can be reduced.

When the value of m3/fw is equal to or falls below the lower limit value of the conditional expression (3-1), burden of varying magnification born by lens groups other than the third lens group is increased. Therefore, movement amounts of the lens groups other than the third lens group are increased undesirably, and refractive power of each lens group is undesirably increased. As a result, the entire length of the zoom lens according to the third embodiment is undesirably increased. Moreover, optical performances, specifically, spherical aberration, chromatic aberration and coma aberration are deteriorated, and further variation in chromatic aberration upon focusing is caused. Furthermore, decentering susceptibility is increased, in other words, various aberrations are apt to be generated in the case where decentering is generated in the lens groups composing the zoom lens according to the third embodiment of the present application due to manufacturing error or the like. Incidentally, in order to attain the effect of the present application more surely, it is more preferable to set the lower limit value of the conditional expression (3-1) to 0.51.

On the other hand, when the value of m3/fw is equal to or exceeds the upper limit value of the conditional expression (3-1), the entire length of the zoom lens according to the third embodiment of the present application is increased undesirably. Further, optical performance, particularly, curvature of field is undesirably deteriorated. Incidentally, in order to attain the effect of the present application more surely, it is preferable to set the upper limit value of the conditional expression (3-1) to 0.70. Further, in order to attain the effect of the present application more surely, it is preferable to set the upper limit value of the conditional expression (3-1) to 0.68.

Because of the above mentioned configuration, a zoom lens whose entire length is small and which is downsized and has superb performances, can be realized.

Moreover, in the zoom lens according to the third embodiment of the present application, it is preferable that the fourth lens group comprises a meniscus lens having a convex surface facing the image side. By this configuration, it is possible to correct curvature of field and secure flatness of the image plane. The fourth lens group may be configured to comprise a further lens component at the object side or the image side of the meniscus lens. Further, the meniscus lens may be cemented with other lens to form a cemented lens.

Moreover, in the zoom lens according to the third embodiment of the present application, it is preferable that the following conditional expression (3-2) is satisfied:

$$-5.00 < (r42+r41)/(r42-r41) < -1.30 \quad (3\text{-}2),$$

where r41 denotes curvature radius of an object side lens surface of the meniscus lens in the fourth lens group; and r42 denotes curvature radius of an image side lens surface of the meniscus lens in the fourth lens group.

The conditional expression (3-2) defines a shape factor of the meniscus lens in the fourth lens group. The zoom lens in the third embodiment of the present application can correct more excellently curvature of field and secure the flatness of the image plane by satisfying the conditional expression (3-2).

When the value of (r42+r41)/(r42−r41) is equal to or falls below the lower limit value of the conditional expression (3-2), curvature radius of the object side lens surface and curvature radius of the image side lens surface of the meniscus lens in the fourth lens group become too small, thereby spherical aberration and coma aberration becoming deteriorated. Incidentally, in order to attain the effect of the present application more surely, it is more preferable to set the lower limit value of the conditional expression (3-2) to −4.00. Moreover, in order to attain the effect of the present application more surely, it is more preferable to set the lower limit value of the conditional expression (3-2) to −3.80.

On the other hand, when the value of (r42+r41)/(r42-r41) is equal to or exceeds the upper limit value of the conditional expression (3-2), it becomes impossible to correct sufficiently curvature of field. Incidentally, in order to attain the effect of the present application more surely, it is preferable to set the upper limit value of the conditional expression (3-2) to −1.50. Further, in order to attain the effect of the present application more surely, it is preferable to set the upper limit value of the conditional expression (3-2) to −1.80.

Moreover, in the zoom lens according to the third embodiment of the present application, it is preferable that, upon varying magnification from the wide angle end state to the telephoto end state, a distance between the first lens group and the second lens group is decreased, a distance between the second lens group and the third lens group is varied, and a distance between the third lens group and the fourth lens group is increased. With such a configuration, it is possible reduce the entire length of the zoom lens.

Moreover, in the zoom lens according to the third embodiment of the present application, it is preferable that, upon varying magnification from the wide angle end state to the telephoto end state, the third lens group is moved along the optical axis toward the object, and in the case where the third lens group is moved toward the image side upon focusing, the following conditional expression (3-3) is satisfied:

$$0.45 < fst/m3 < 1.00 \quad (3\text{-}3),$$

where fst denotes an amount of movement of the third lens group upon focusing from an infinitely distant object onto a short distant object in the telephoto end state, and m3 denotes an amount of movement of the third lens group upon varying magnification from the wide angle end state to the telephoto end state.

In the zoom lens according to the third embodiment of the present invention, upon varying magnification from the wide angle end state to the telephoto end state as described above, the third lens group is moved along the optical axis toward the object side, and upon focusing from an infinite distance object to the close distance object, the third lens group is moved toward the image side along the optical axis. With such a configuration, it becomes possible for the third lens group to move toward the image side in the telephoto end state by the stroke (inclusive of varying amount of a distance between the third lens group and the fourth lens group) in which stroke the third lens group moves toward the object side upon varying magnification from the wide angle end state to the telephoto end state.

The conditional expression (3-3) defines a relation between the amount of movement of the third lens group upon focusing from an infinite distance object to a close distance object in the telephoto end state and the amount of movement of the third lens group upon varying magnification. The conditional expression (3-3) indicates that a distance generated by the movement of the third lens group toward the object side upon varying magnification, is utilized for the third lens group to be moved toward the image side upon focusing. The zoom lens according to the third embodiment of the present application can effectively dispose the stroke upon varying magnification and the stroke upon focusing, so the entire length of the zoom lens can be reduced.

When the value of fst/m3 is equal to or falls below the lower limit value of the conditional expression (3-3), the amount of movement of the third lens group upon varying magnification becomes large and the entire length is undesirably increased, and optical performance, in particular, curvature of field is deteriorated. Incidentally, in order to attain the effect of the present application more surely, it is more preferable to set the lower limit value of the conditional expression (3-3) to 0.47. Moreover, in order to attain the effect of the present application more surely, it is more preferable to set the lower limit value of the conditional expression (3-3) to 0.50.

On the other hand, when the value of fst/m3 is equal to or exceeds the upper limit value of the conditional expression (3-3), the amount of the movement of the third lens group becomes small, so burden of the other lens groups than the third lens group for varying magnification becomes large. Accordingly, the amount of movement of the other lens groups than the third lens group is undesirably increased, and refractive power of each lens group is undesirably increased. If the amount of movements of the other lens groups than the third lens group is increased, the entire length of the zoom lens according to the third embodiment of the present application is undesirably increased. Further, if refractive power of each lens group is increased, deteriorations of optical performances, in particular, deteriorations of spherical aberration, chromatic aberration and coma aberration are caused, and further variation in chromatic aberration upon focusing is caused, and decentering susceptibility is undesirably increased. Incidentally, in order to attain the effect of the present application more surely, it is preferable to set the upper limit value of the conditional expression (3-3) to 0.90. Further, in order to attain the effect of the present application more surely, it is preferable to set the upper limit value of the conditional expression (3-3) to 0.80.

Moreover, in the zoom lens according to the third embodiment of the present application, it is preferable that the following conditional expression (3-4) is satisfied:

$$1.50 < (-f3)/fw < 4.00 \quad (3\text{-}4),$$

where f3 denotes a focal length of the third lens group; and fw denotes the focal length of the zoom lens in the wide angle end state.

The conditional expression (3-4) defines refractive power of the third lens group. The zoom lens in the third embodiment of the present application can correct excellently spherical aberration, chromatic aberration, coma aberration and curvature of field, while downsizing the zoom lens according to the third embodiment of the present application, by satisfying the conditional expression (3-4).

When the value of (−f3)/fw is equal to or falls below the lower limit value of the conditional expression (3-4), refractive power of the third lens group becomes too large and coma aberration is deteriorated undesirably. Incidentally, in order to attain the effect of the present application more surely, it is more preferable to set the lower limit value of the conditional expression (3-4) to 2.00.

On the other hand, when the value of (−f3)/fw is equal to or exceeds the upper limit value of the conditional expression (3-4), refractive power of the third lens group becomes too small, and burden of varying magnification born by lens groups other than the third lens group upon varying magnification is increased. For this reason, amount of movement of the second lens group is increased, and refractive power of each lens group is increased. As a result, the entire length of the zoom lens according to the third embodiment of the present application becomes increased. Further, optical performances are deteriorated, and in particular, spherical aberration, chromatic aberration and coma aberration are deteriorated. Furthermore, variation in chromatic aberration upon focusing is invited. Furthermore, decentering susceptibility is undesirably increased. Incidentally, in order to attain the effect of the present application more surely, it is preferable to set the upper limit value of the conditional expression (3-4) to 3.00. Further, in order to attain the effect of the present application more surely, it is preferable to set the upper limit value of the conditional expression (3-4) to 2.80.

Moreover, in the zoom lens according to the third embodiment of the present application, it is preferable that the fourth lens group consists of a positive meniscus lens having a convex surface facing the image side. With this configuration, curvature of field is corrected, flatness of the image plane is secured, and the structure of the fourth lens group is simplified.

Moreover, in the zoom lens according to the third embodiment of the present application, it is preferable that, upon varying magnification from the wide angle end state to the telephoto end state, the first lens group and the second lens group are moved along the optical axis, and the position of the fourth lens group is fixed. With this configuration, it becomes possible to suppress generation of aberrations due to decentering error of the fourth lens group whose decentering susceptibility is high.

Moreover, in the zoom lens according to the third embodiment of the present application, it is preferable that the fourth lens group has at least one aspherical surface. With this configuration, it is possible to secure more excellently flatness of the image plane.

The optical apparatus of the present application is characterized in being equipped with the zoom lens according to the third embodiment of the present application, thereby the optical apparatus that is downsized and has excellent optical performances being realized.

A method for manufacturing the zoom lens according to the third embodiment of the present application which comprises, in order from an object side: a first lens group having negative refractive power; a second lens group having positive refractive power; a third lens group having negative refractive power and a fourth lens group having positive refractive power, being characterized in comprising the steps of:

disposing such that, upon varying magnification from the wide angle state to the telephoto end state, the third lens group is moved along the optical axis, and a distance between the first lens group and the second lens group, a distance between the second lens group and the third lens group and a distance between the third lens group and the fourth lens group are varied; and disposing the third lens group to satisfy the following conditional expression (3-1):

$$0.50 < m3/fw < 0.80 \quad (3\text{-}1),$$

where m3 denotes an amount of movement of the third lens group upon varying magnification from the wide angle end state to the telephoto end state; and fw denotes the focal length of the zoom lens in the wide angle end state.

Next, a zoom lens, an optical apparatus and a method for manufacturing the zoom lens, according to a fourth embodiment of the present application will be explained.

A zoom lens according to the fourth embodiment of the present application comprising, in order from an object side: a first lens group having negative refractive power; a second lens group having positive refractive power; a third lens group having negative refractive power and a fourth lens group having positive refractive power;

the second lens group including, in order from an object side, a first segment group having positive refractive power, a second segment group having negative refractive power, an aperture stop and a third segment group;

upon varying magnification, the first lens group, the second lens group and the third lens group being moved along the optical axis, and the position of the fourth lens group being fixed;

upon focusing, at least a part of the third lens group being moved along the optical axis;

the first segment group or the second segment group in the second lens group being moved as a movable group to have a component in a direction perpendicular to the optical axis; and the following conditional expression (4-1) being satisfied:

$$0.15 < |fw/fvr| < 0.50 \quad (4\text{-}1)$$

where fw denotes a focal length of the zoom lens in the wide angle end state, and fvr denotes a focal length of said movable group.

The zoom lens according to the fourth embodiment of the present application comprises, in order from an object side, a first lens group having negative refractive power, a second lens group having positive refractive power, a third lens group having negative refractive power and a fourth lens group having positive refractive power, and the second lens group including, in order from the object side, a first segment group having positive refractive power, a second segment group having negative refractive power, an aperture stop and a third segment group. With this configuration, the zoom lens according to the fourth embodiment of the present application can attain superb optical performances, while having high variable magnification ratio and long focal length.

In the zoom lens according to the fourth embodiment of the present application, the first segment group or the second segment group in the second lens group is moved as the movable group to have a component in a direction perpendicular to the optical axis, thereby correction of image blur caused by camera shake or the like, in other words, vibration reduction, being able to be conducted.

The conditional expression (4-1) defines refractive power of the movable group. The zoom lens in the fourth embodiment of the present application, while being downsized, can suppress excellently optical performances by satisfying the conditional expression (4-1).

When the value of |fw/fvr| is equal to or falls below the lower limit value of the conditional expression (4-1), Movement amount of the movable group upon conducting vibration reduction becomes too large. Accordingly, the zoom lens in the fourth embodiment of the present application becomes too large in size, so it is not preferable. Incidentally, in order to attain the effect of the present application more surely, it is more preferable to set the lower limit value of the conditional expression (4-1) to 0.20.

On the other hand, when the value of |fw/fvr| is equal to or exceeds the upper limit value of the conditional expression (4-1), refractive power of the movable group becomes too large, thereby upon conducting vibration reduction decentering coma aberration, lateral chromatic aberration and curvature of field being deteriorated. Incidentally, in order to attain the effect of the present application more surely, it is preferable to set the upper limit value of the conditional expression (4-1) to 0.40.

By the above configuration, a zoom lens that is downsized and has superb optical performances can be realized.

Moreover, in the zoom lens according to the fourth embodiment of the present application, it is preferable that the third segment group has positive refractive power. With this configuration, refractive power of the positive second lens group is mainly born by the third segment group, so that excellent aberration corrections can be realized.

Moreover, in the zoom lens according to the fourth embodiment of the present application, it is preferable that the following conditional expression (4-2) is satisfied:

$$0.50 < fw/f2 < 0.90 \quad (4\text{-}2),$$

where fw denotes a focal length of the zoom lens in the wide angle end state; and f2 denotes a focal length of the second lens group.

The conditional expression (4-2) defines refractive power of the second lens group. The zoom lens according to the fourth embodiment of the present application can correct excellently aberrations and be downsized, by satisfying the conditional expression (4-2).

When the value of fw/f2 is equal to or falls below the lower limit value of the conditional expression (4-2) of the zoom lens according to the fourth embodiment of the present application, refractive power of the second lens group becomes too small and amount of movement for carrying out desired zooming becomes too large, thereby the zoom lens becoming large in size undesirably. Incidentally, in order to attain the effect of the present application more surely, it is more preferable to set the lower limit value of the conditional expression (4-2) to 0.60.

On the other hand, when the value of fw/f2 is equal to or exceeds the upper limit value of the conditional expression (4-2), refractive power of the second lens group becomes too large, and this is advantageous for downsizing but undesirably increases generation of spherical aberration and susceptibility due to decentering. Incidentally, in order to attain the effect of the present application more surely, it is preferable to set the upper limit value of the conditional expression (4-2) to 0.80.

Moreover, in the zoom lens according to the fourth embodiment of the present application, it is preferable that the following conditional expression (4-3) is satisfied:

$$0.20 < |f2/fvr| < 0.60 \quad (4\text{-}3),$$

where f2 denotes a focal length of the second lens group; and fvr denotes a focal length of the variable group.

The conditional expression (4-3) defines a ratio between refractive power of the second lens group and refractive power of the variable group. The zoom lens in the fourth embodiment of the present application can suppress superbly deterioration of optical performances upon conducting vibration reduction while being downsized, by satisfying the conditional expression (4-3).

When the value of |f2/fvr| is equal to or falls below the lower limit value of the conditional expression (4-3), amount of movement of the movable group upon carrying out vibration reduction becomes too large. This is undesirable since the zoom lens according to the fourth embodiment of the present application becomes too large in size. Incidentally, in order to attain the effect of the present application more surely, it is more preferable to set the lower limit value of the conditional expression (4-3) to 0.30.

On the other hand, when the value of |f2/fvr| is equal to or exceeds the upper limit value of the conditional expression (4-3), refractive power of the movable group becomes too large, and decentering coma aberration, lateral chromatic aberration and curvature of field are deteriorated. This is undesirable. Incidentally, in order to attain the effect of the present application more surely, it is preferable to set the upper limit value of the conditional expression (4-3) to 0.50.

Moreover, in the zoom lens according to the fourth embodiment of the present application, it is preferable that each of the first lens group, the second lens group, the third lens group and the fourth lens group, has at least one aspherical surface. With this configuration, spherical aberration and curvature of field are superbly corrected.

The optical apparatus of the present application is characterized in being equipped with the zoom lens according to the fourth embodiment of the present application, thereby the optical apparatus that is downsized and has excellent optical performances upon carrying out vibration reduction, being realized.

A method for manufacturing the zoom lens according to the fourth embodiment of the present application which comprises, in order from an object side: a first lens group having negative refractive power; a second lens group having positive refractive power; a third lens group having negative refractive power and a fourth lens group having positive refractive power, being characterized in comprising the steps of:

disposing the second lens group to include, in order from an object side, a first segment group having positive refractive power, a second segment group having negative refractive power, an aperture stop and a third segment group;

disposing such that, upon varying magnification, the position of the fourth lens group is fixed, and the first lens group, the second lens group and the third lens group are moved along the optical axis;

upon focusing, at least a part of the third lens group being moved along the optical axis; the first segment group or the second segment group in the second lens group being moved as a movable group to have a component in a direction perpendicular to the optical axis; and the following conditional expression (4-1) being satisfied:

$$0.15 < |fw/fvr| < 0.50 \quad (4\text{-}1)$$

where fw denotes a focal length of the zoom lens in the wide angle end state, and fvr denotes a focal length of said movable group.

Hereinafter, a zoom lens according to each numerical example of the first and second embodiments of the present application will be explained with reference to the accompanying drawings. The first to seventh examples are common to the first and second embodiments, and the eighth and ninth examples are examples of the first embodiment.

First Example

Figure 1B:
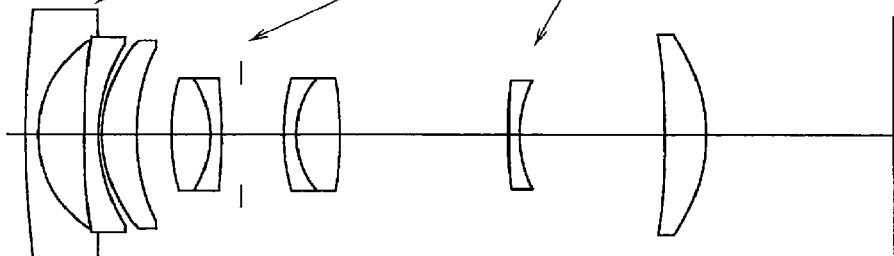

FIGS. 1A and 1B are respectively sectional views showing a zoom lens in a wide angle end state and in a telephoto end state, according to a first Example that is common to the first and second embodiments of the present application. Incidentally, in FIG. 1 and FIGS. 4, 7, 10, 13, 16, 19, 22, 25, 28, 30, 32, 34, 36, and 40 described hereinafter, arrows show a moving trajectories of each lens group upon varying magnification from a wide angle end state to a telephoto end state.

The zoom lens according to the present example is composed of a first lens group G1 having negative refractive power, a second lens group G2 having positive refractive power, a third lens group G3 having negative refractive power and a fourth lens group G4 having positive refractive power.

The first lens group G1 consists of, in order from the object side, a negative meniscus lens L11 having a convex surface facing an object side, a negative meniscus lens L12 having a convex surface facing the object side, and a positive meniscus lens L13 having a convex surface facing the object side. The negative meniscus lens L12 is a glass mold type aspherical lens whose object side and image side lens surfaces are aspherically shaped The second lens group G2 consists of, in order from the object side, a front lens group G2F having positive refractive power, an aperture stop S, and a rear lens group G2R having positive refractive power.

The front lens group G2F consists of, in order from the object side, a cemented lens constructed by a positive lens L21 having a double convex shape cemented with a negative meniscus lens L22 having a concave surface facing the object side. The positive lens L21 is a glass mold type aspherical lens whose object side lens surface is aspherically shaped.

The rear lens group G2R consists of, in order from the object side, a cemented lens constructed by a negative lens L23 having a convex surface facing the object side cemented with a double convex positive lens L24.

The third lens group G3 consists of a negative meniscus lens L31 having a convex surface facing the object side. The negative meniscus lens L31 is a glass mold type aspherical lens whose object side lens surface and image side lens surface are aspherically shaped.

The fourth lens group G4 consists of a positive meniscus lens L41 having a convex surface facing the image side. The positive meniscus lens L41 is a glass mold type aspherical lens whose object side lens surface and image side lens surface are aspherically shaped.

In the zoom lens of the present example being constructed as above, upon varying magnification from a wide-angle end state to a telephoto end state, the first lens group G1 is moved along the optical axis and the second lens group G2 and the third lens group G3 are moved along the optical axis toward the object side such that an air distance between the first lens group G1 and the second lens group G2 is decreased, an air distance between the second lens group G2 and the third lens group G3 is increased, and an air distance between the third lens group G3 and the fourth lens group G4 is increased. Incidentally, the position of the fourth lens group G4 is fixed upon varying magnification. The front lens group G2F, the aperture stop S and the rear lens group G2R of the second lens group G2 are moved in a body upon varying magnification.

In the zoom lens of the present example, focusing from an infinite distance object to a close distance object is carried out by moving the third lens group G3 along the optical axis toward the image side.

In the zoom lens of the present example having constructed as above, vibration reduction is carried out by moving the rear lens group G2R of the second lens group G2 as a movable group to have a component in a direction perpendicular to the optical axis.

Table 1 below shows various values associated with the zoom lens according to the present example.

In Table 1, f denotes a focal length, and BF denotes a back focal length, that is, denotes a distance between the most image side lens surface and the image plane I on the optical axis.

In [Surface Data], m denotes an order of an optical surface counted from the object side, r denotes a radius of curvature, d denotes a surface-to-surface distance (an interval from an n-th surface to an (n+1)-th surface, where n is an integer.), nd denotes a refractive index to d-line (wavelength=587.6 nm), and vd denotes an Abbe number to d-line (wavelength=587.6). OP denotes an object plane, Variable denotes a variable surface-to-surface distance, S denotes an aperture stop S, and I denotes the image plane. The radius of curvature r=∞ indicates a plane surface. "*" mark is attached to a surface number of each aspherical surface, and a value of each paraxial radius of curvature is listed in the column of the radius of curvature r. The refractive index of air nd=1.000 is omitted.

[Aspherical Data] shows aspherical surface coefficients and conic constants in the case when the shape of each aspherical surface shown in [Surface Data] is expressed by the following expression:

$$x=(h^2/r)/[1+\{1-\kappa(h/r)^2\}^{1/2}]+A4h^4+A6h^6+A8h^8+A10h^{10}$$

Here, h is made to be a height vertical to the optical axis, x is made to be a sag amount that is the distance between a tangent plane of the vertex of each aspherical surface in the height h to each aspherical surface along the optical axis, κ is made to be a conic constant, A4, A6, A8, A10 are made to be aspherical surface coefficients, and r is made to be a paraxial radius of curvature that is a radius of curvature of reference sphere. "E-n" (n is an integer) represents "×10$^{-n}$". For example, "1.234E-05" represents "1.234×10$^{-5}$". The aspherical surface coefficient A2 of second order is 0 and is omitted.

In [Various Data], FNO denotes an F number, 2ω denotes an angle of view (unit is "°"), Y denotes an image height, TL denotes an entire length of the zoom lens, that is, the distance between a first surface and the image plane I along the optical axis, and do denotes a variable distance between an n-th surface and an (n+1)-th surface. W denotes the wide-angle end state, M denotes the intermediate focal length state and T denotes the telephoto end state.

[Lens Group Data] shows a starting surface ST of each lens group and a focal length f.

In [Vibration Reduction Data], Z denotes shifting amount of the movable group, that is, amount of movement of the movable group in a direction perpendicular to the optical axis, and θ denotes angle "°" of rotational camera shake of the zoom lens according to the present example, and K denotes a vibration reduction coefficient.

[Values for Conditional Expressions] show corresponding values for conditional expressions of the zoom lens according to the example.

"mm" is used as the unit for various lengths such as the focal length f, the radius of curvature r and the like. However, even when the optical system is proportionally enlarged or proportionally reduced, the same optical performance can be obtained, the unit is not necessarily limited to "mm".

Note that the same symbols as those in the Table 1 are applied to the Tables in the respective Examples that will be given below.

TABLE 1

First Example

[Surface Data]

| m | r | d | nd | νd |
|---|---|---|---|---|
| OP | ∞ | | | |
| 1 | 72.401 | 0.800 | 1.603 | 65.440 |
| 2 | 8.933 | 3.247 | | |
| *3 | 81.430 | 1.000 | 1.623 | 58.163 |
| *4 | 14.381 | 0.217 | | |
| 5 | 11.610 | 2.300 | 2.001 | 25.455 |
| 6 | 16.466 | Variable | | |
| *7 | 17.188 | 2.688 | 1.623 | 58.163 |
| 8 | −8.884 | 0.800 | 1.603 | 38.028 |
| 9 | −46.602 | 1.500 | | |
| 10(S) | ∞ | 2.989 | | |
| 11 | 18.062 | 0.800 | 1.583 | 46.422 |
| 12 | 6.945 | 3.024 | 1.498 | 82.570 |
| 13 | −30.319 | Variable | | |
| *14 | 95.105 | 0.800 | 1.623 | 58.163 |
| *15 | 11.725 | Variable | | |
| *16 | −30.246 | 2.900 | 1.583 | 59.460 |
| *17 | −11.506 | BF | | |
| I | ∞ | | | |

[Aspherical Surface Data]

| m | κ | A4 | A6 | A8 | A10 |
|---|---|---|---|---|---|
| 3 | 1.000E+00 | −1.341E−04 | 4.946E−06 | −2.851E−08 | 0.000E+00 |
| 4 | 1.000E+00 | −1.733E−04 | 4.608E−06 | −2.877E−09 | −4.422E−10 |
| 7 | 1.000E+00 | −6.445E−05 | −1.030E−06 | 3.176E−08 | 1.259E−11 |
| 14 | 1.000E+00 | 5.106E−04 | −1.420E−05 | −1.448E−07 | 1.178E−08 |
| 15 | 1.000E+00 | 7.701E−04 | −1.866E−05 | 1.925E−07 | 0.000E+00 |
| 16 | 1.000E+00 | 1.161E−04 | 1.252E−06 | −3.371E−08 | 1.439E−10 |
| 17 | 1.000E+00 | 1.152E−04 | 1.558E−06 | −2.620E−08 | 8.016E−11 |

[Various Data]
Variable magnification ratio 2.83

| | W | T |
|---|---|---|
| f | 10.3 | 29.1 |
| FNO | 3.56 | 5.66 |
| 2ω | 77.0° | 31.4° |
| Y | 8.19 | 8.19 |

| | W | M | T |
|---|---|---|---|
| (Upon Focusing on an infinitely distant Object) | | | |
| f | 10.300 | 18.383 | 29.100 |
| d6 | 17.948 | 7.230 | 2.253 |
| d13 | 1.600 | 6.325 | 11.865 |
| d15 | 5.138 | 7.347 | 10.568 |
| BF | 13.299 | 13.299 | 13.299 |
| TL | 47.750 | 43.966 | 47.750 |
| (Upon Focusing on a close distance Object) | | | |
| D | 200.000 | 200.000 | 200.000 |
| d6 | 17.948 | 7.230 | 2.253 |
| d13 | 2.070 | 7.693 | 15.083 |
| d15 | 4.668 | 5.979 | 7.349 |
| BF | 13.299 | 13.299 | 13.299 |
| TL | 47.750 | 43.966 | 47.750 |

[Lens Group Data]

| | ST | f |
|---|---|---|
| G1 | 1 | −14.141 |
| G2 | 7 | 13.652 |
| G3 | 14 | −21.559 |
| G4 | 16 | 30.130 |

TABLE 1-continued

First Example

[Vibration Reduction Data]

|   | W | M | T |
|---|---|---|---|
| f | 10.300 | 18.383 | 29.100 |
| Z | 0.142 | 0.148 | 0.171 |
| θ | 0.624 | 0.500 | 0.500 |
| K | 0.789 | 1.087 | 1.485 |

[Values for Conditional Expressions]

(1-1) |f2vr|/fw = 2.718
(1-2) |f2vr|/f2 = 2.051
(1-3) m12/fw = 1.524
(2-1) |f2i|/fw = 2.718
(2-2) |f2i|/f2 = 2.051
(2-3) m12/fw = 1.524

Figure 2A:
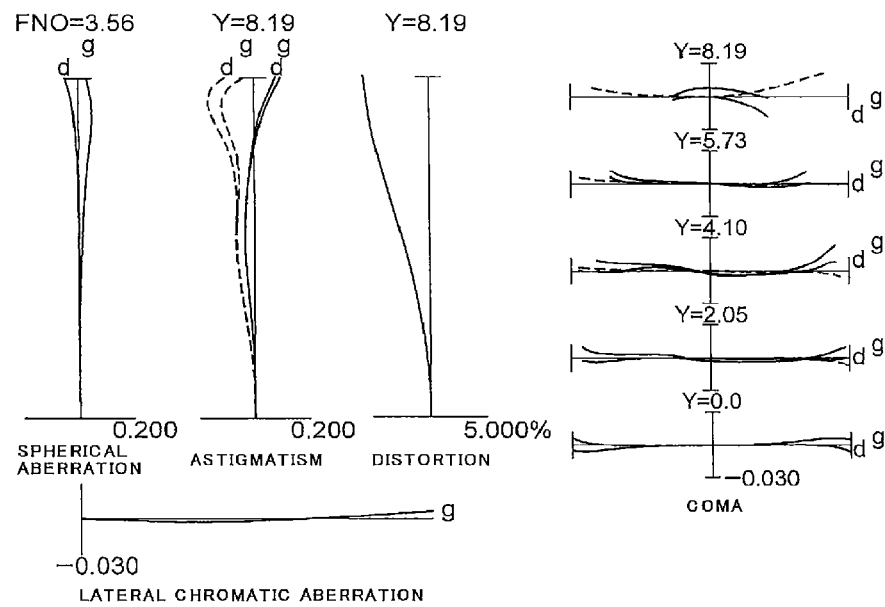
FIGS. 2A and 2B are respectively graphs showing various aberrations of the zoom op lens tical system according to the first Example of the present application in a wide angle state and in a telephoto end state, upon focusing on an infinitely distant object.
Figure 2B:
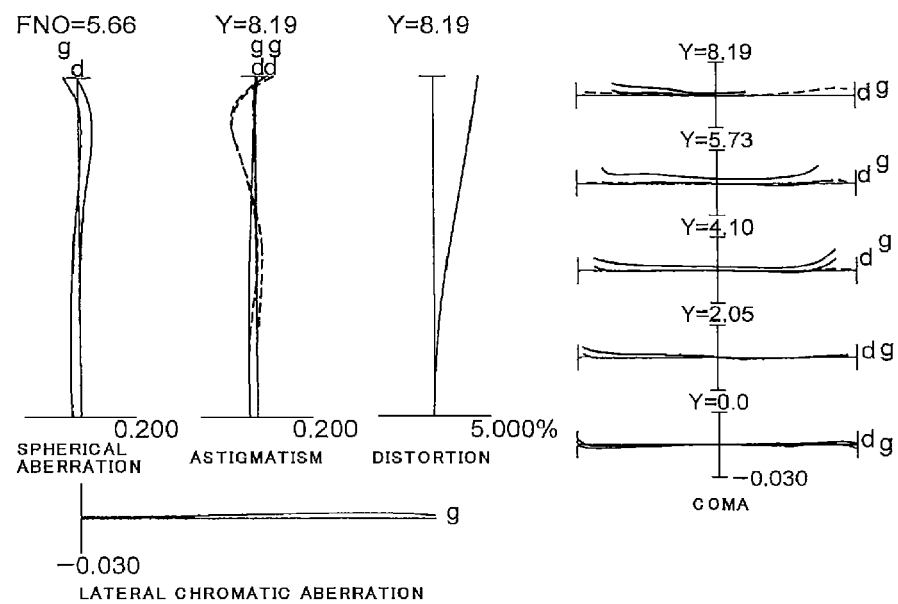

FIGS. 2A and 2B are graphs showing various aberrations upon focusing on an infinitely distant object in the wide-angle end state and in the telephoto end state of the zoom lens according to the first example of the present application.

Figure 3A:
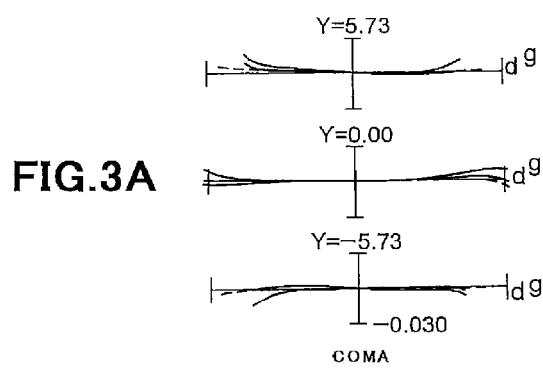
FIGS. 3A and 3B are respectively graphs showing coma aberration upon conducting vibration reduction of the zoom lens according to the first Example of the present application in a wide angle end state and in a telephoto end state, upon focusing on an infinitely distant object.
Figure 3B:
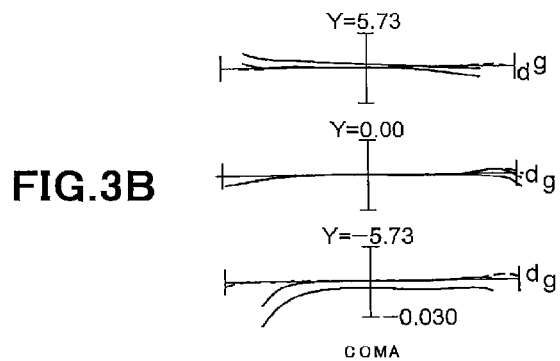

FIGS. 3A and 3B are respectively graphs showing coma aberrations at the time when vibration reduction is carried out against rotational camera shake of 0.624° upon focusing on the infinitely distant object in the wide-angle end state of the zoom lens and against rotational camera shake of 0.500° upon focusing on the infinitely distant object in the telephoto end state of the zoom lens according to the first example of the present application.

In the individual aberration diagrams, FNO represents the F-number, and Y denotes an image height. Further, the symbol d represents an aberration curve in the d-line ($\lambda$=587.6 nm), g stands for an aberration curve in the g-line ($\lambda$=435.8 nm), and what is not marked with d or g represents an aberration curve in the d-line. In a diagram showing an astigmatism, a solid line indicates a saggital image plane, and a broken line indicates a meridional image plane. An aberration diagram of a coma shows coma aberration at each image height Y. Note that the same symbols as those in the first Example are applied to the various aberration diagrams in the respective Examples that will be given below.

As apparent from the respective aberration diagrams, it is understood that the zooming lens system according to the present Example corrects well the various aberrations from the wide-angle end state to the telephoto end state throughout, and further exhibits the high optical performances even upon conducting vibration reduction.

Second Example

Figure 4A:
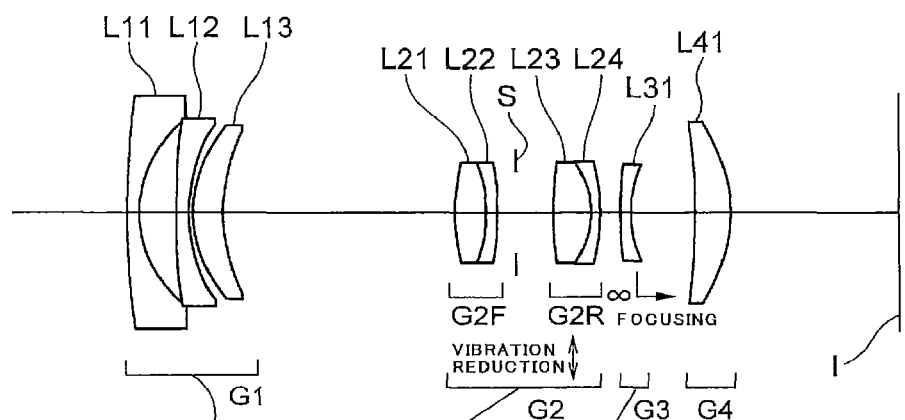
FIGS. 4A and 4B are respectively sectional views showing a zoom lens in a wide angle end state and a telephoto end state, according to a second Example that is common to the first and second embodiments of the present application.
Figure 4B:
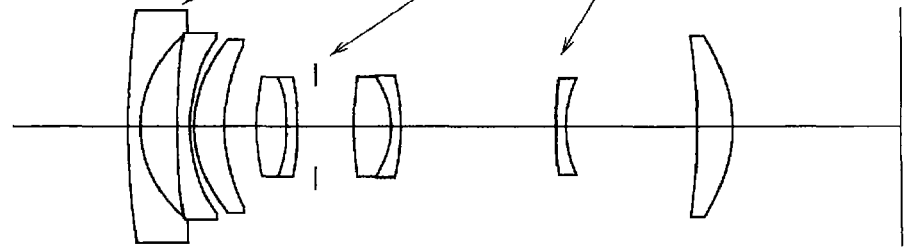

FIGS. 4A and 4B are respectively sectional views showing a zoom optical system in a wide angle end state and in a telephoto end state, according to a second Example that is common to the first and second embodiments of the present application.

The zoom lens according to the present example is composed of a first lens group G1 having negative refractive power, a second lens group G2 having positive refractive power, a third lens group G3 having negative refractive power and a fourth lens group G4 having positive refractive power.

The first lens group G1 consists of, in order from the object side, a negative meniscus lens L11 having a convex surface facing an object side, a negative meniscus lens L12 having a convex surface facing the object side, and a positive meniscus lens L13 having a convex surface facing the object side. The negative meniscus lens L12 is a glass mold type aspherical lens whose object side and image side lens surfaces are aspherically shaped.

The second lens group G2 is composed of, in order from the object side, a front lens group G2F having positive refractive power, an aperture stop S, and a rear lens group G2R having positive refractive power.

The front lens group G2F consists of, in order from the object side, a cemented lens constructed by a positive lens L21 having a double convex shape cemented with a negative meniscus lens L22 having a concave surface facing the object side. The positive lens L21 is a glass mold type aspherical lens whose object side lens surface is aspherically shaped.

The rear lens group G2R consists of, in order from the object side, a cemented lens constructed by a positive lens L23 having a double convex shape cemented with a negative meniscus lens L24 having a concave surface facing the object side.

The third lens group G3 consists of a negative meniscus lens L31 having a convex surface facing the object side. The negative meniscus lens L31 is a glass mold type aspherical lens whose object side lens surface and image side lens surface are aspherically shaped.

The fourth lens group G4 consists of a positive meniscus lens L41 having a convex surface facing the image side. The positive meniscus lens L41 is a glass mold type aspherical lens whose object side lens surface and image side lens surface are aspherically shaped.

In the zoom lens of the present example having constructed as above, upon varying magnification from a wide-angle end state to a telephoto end state, the first lens group G1 is moved along the optical axis and the second lens group G2 and the third lens group G3 are moved along the optical axis toward the object side such that an air distance between the first lens group G1 and the second lens group G2 is decreased, an air distance between the second lens group G2 and the third lens group G3 is increased, and an air distance between the third lens group G3 and the fourth lens group G4 is increased. Incidentally, the position of the fourth lens group G4 is fixed upon varying magnification. The front lens group G2F, the aperture stop S and the rear lens group G2R of the second lens group G2 are moved in a body upon varying magnification.

In the zoom lens of the present example, focusing from an infinite distance object to a close distance object is carried out by moving the third lens group G3 along the optical axis toward the image side.

In the zoom lens of the present example having constructed as above, vibration reduction is carried out by moving the rear lens group G2R in the second lens group G2 as a movable group to have a component in a direction perpendicular to the optical axis.

Table 2 below shows various values associated with the zoom lens according to the present example.

TABLE 2

Second Example

[Surface Data]

| m | r | d | nd | νd |
|---|---|---|---|---|
| OP | ∞ | | | |
| 1 | 78.484 | 0.800 | 1.603 | 65.440 |
| 2 | 9.640 | 3.089 | | |
| *3 | 240.283 | 1.000 | 1.623 | 58.163 |
| *4 | 14.940 | 0.286 | | |
| 5 | 11.133 | 2.300 | 2.001 | 25.455 |
| 6 | 15.568 | Variable | | |
| *7 | 17.287 | 2.475 | 1.619 | 63.854 |
| 8 | −11.064 | 0.800 | 1.648 | 33.723 |
| 9 | −29.967 | 1.500 | | |
| 10(S) | ∞ | 3.054 | | |
| 11 | 41.552 | 2.920 | 1.498 | 82.570 |
| 12 | −7.477 | 0.800 | 1.583 | 46.422 |
| 13 | −18.335 | Variable | | |
| *14 | 63.143 | 0.800 | 1.623 | 58.163 |
| *15 | 11.500 | Variable | | |
| *16 | −29.401 | 2.900 | 1.583 | 59.460 |
| *17 | −11.497 | BF | | |
| I | ∞ | | | |

[Aspherical Surface Data]

| m | κ | A4 | A6 | A8 | A10 |
|---|---|---|---|---|---|
| 3 | 1.000E+00 | 4.841E−06 | 3.023E−06 | −1.926E−08 | 0.000E+00 |
| 4 | 1.000E+00 | −3.973E−06 | 3.373E−06 | −2.350E−09 | −2.653E−10 |
| 7 | 1.000E+00 | −7.145E−05 | −2.026E−07 | 1.193E−08 | 1.831E−10 |
| 14 | 1.000E+00 | 5.024E−04 | −1.733E−05 | 4.606E−07 | −1.011E−08 |
| 15 | 1.000E+00 | 7.291E−04 | −1.452E−05 | 1.487E−07 | 0.000E+00 |
| 16 | 1.000E+00 | 1.438E−04 | 1.228E−06 | −4.055E−08 | 1.768E−10 |
| 17 | 1.000E+00 | 1.467E−04 | 1.368E−06 | −2.735E−08 | 5.125E−11 |

[Various Data]
Variable magnification ratio 2.83

| | W | T |
|---|---|---|
| f | 10.3 | 29.1 |
| FNO | 3.56 | 5.66 |
| 2ω | 77.0° | 31.4° |
| Y | 8.19 | 8.19 |

| | W | M | T |
|---|---|---|---|
| (Upon Focusing on an infinitely distant Object) | | | |
| f | 10.300 | 18.720 | 29.100 |
| d6 | 18.251 | 7.166 | 2.405 |
| d13 | 1.600 | 6.619 | 12.046 |
| d15 | 5.176 | 7.408 | 10.576 |
| BF | 13.299 | 13.299 | 13.299 |
| TL | 47.750 | 43.916 | 47.750 |
| (Upon Focusing on a close distance Object) | | | |
| D | 200.000 | 200.000 | 200.000 |
| d6 | 18.251 | 7.166 | 2.405 |
| d13 | 2.100 | 8.132 | 15.490 |
| d15 | 4.676 | 5.895 | 7.133 |
| BF | 13.299 | 13.299 | 13.299 |
| TL | 47.750 | 43.916 | 47.750 |

TABLE 2-continued

Second Example

[Lens Group Data]

|  | ST | f |
|---|---|---|
| G1 | 1 | −14.400 |
| G2 | 7 | 13.831 |
| G3 | 14 | −22.718 |
| G4 | 16 | 30.553 |

[Vibration Reduction Data]

|  | W | M | T |
|---|---|---|---|
| f | 10.300 | 18.720 | 29.100 |
| Z | 0.168 | 0.174 | 0.198 |
| θ | 0.624 | 0.500 | 0.500 |
| K | 0.668 | 0.941 | 1.281 |

[Values for Conditional Expressions]

(1-1) |f2vr|/fw = 3.042
(1-2) |f2vr|/f2 = 2.265
(1-3) m12/fw = 1.538
(2-1) |f2i|/fw = 3.042
(2-2) |f2i|/f2 = 2.265
(2-3) m12/fw = 1.538

Figure 5A:
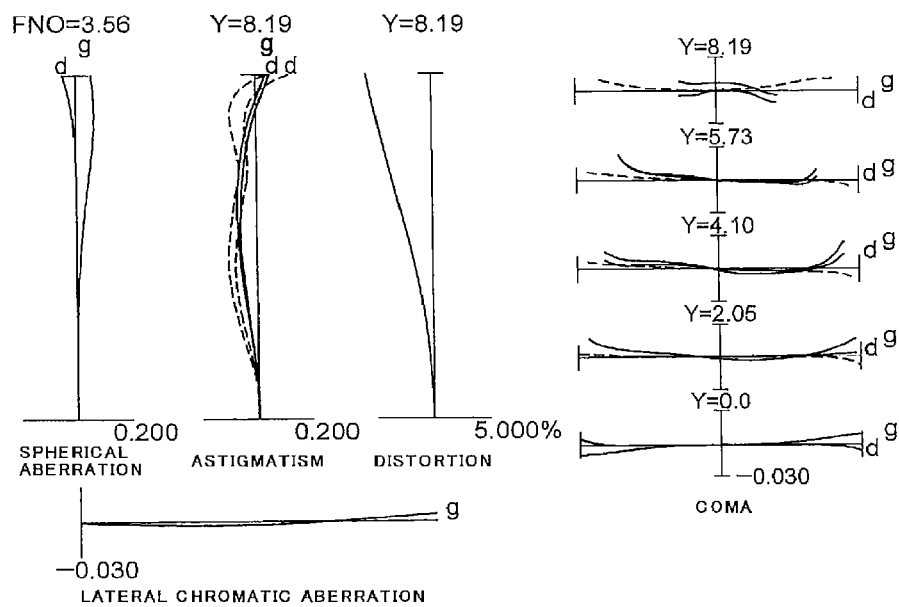
FIGS. 5A and 5B are respectively graphs showing various aberrations of the zoom lens according to the second Example of the present application in a wide angle state and in a telephoto end state, upon focusing on an infinitely distant object.
Figure 5B:
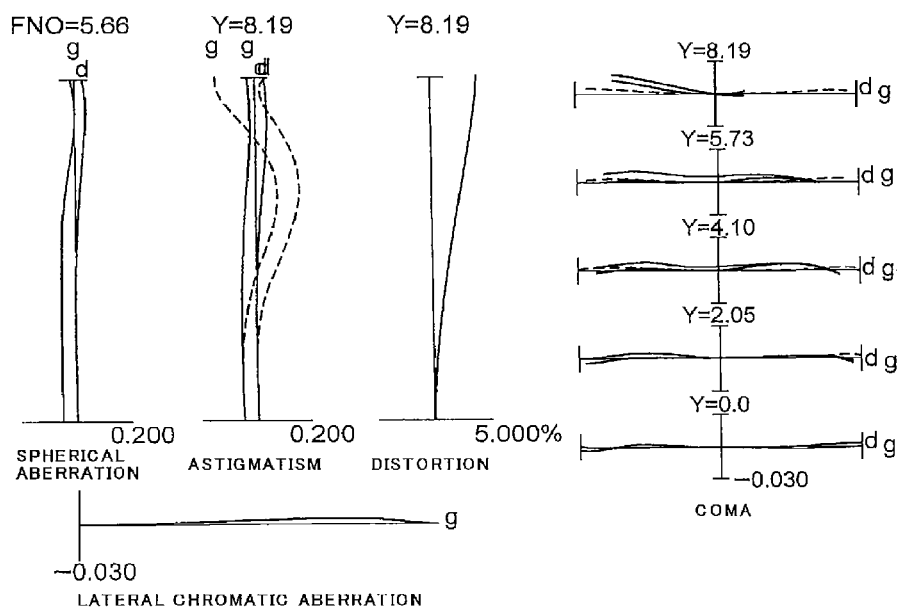

FIGS. 5A and 5B are graphs showing various aberrations upon focusing on an infinitely distant object in the wide-angle end state and in the telephoto end state of the zoom lens according to the second example of the present application.

Figure 6A:
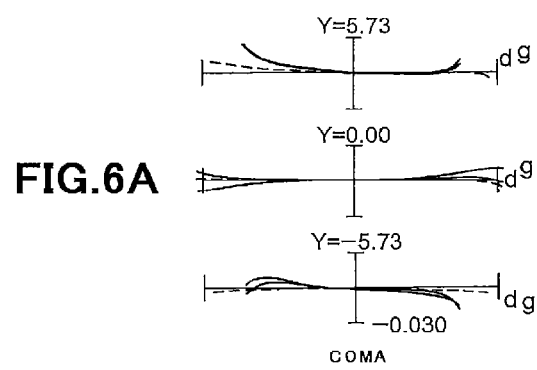
FIGS. 6A and 6B are respectively graphs showing coma aberration upon conducting vibration reduction of the zoom lens according to the second Example of the present application in a wide angle end state and in a telephoto end state, upon focusing on an infinitely distant object.
Figure 6B:
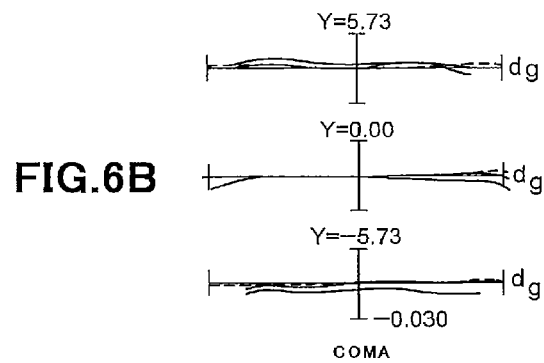

FIGS. 6A and 6B are respectively graphs showing coma aberrations at the time when vibration reduction is carried out against rotational camera shake of 0.624° upon focusing on the infinitely distant object in the wide-angle end state of the zoom lens and against rotational camera shake of 0.500° upon focusing on the infinitely distant object in the telephoto end state of the zoom lens according to the second example of the present application.

As apparent from the respective aberration diagrams, it is understood that the zooming lens system according to the present example corrects well the various aberrations from the wide-angle end state to the telephoto end state throughout, and further exhibits the high optical performances even upon conducting vibration reduction.

Third Example

Figure 7A:
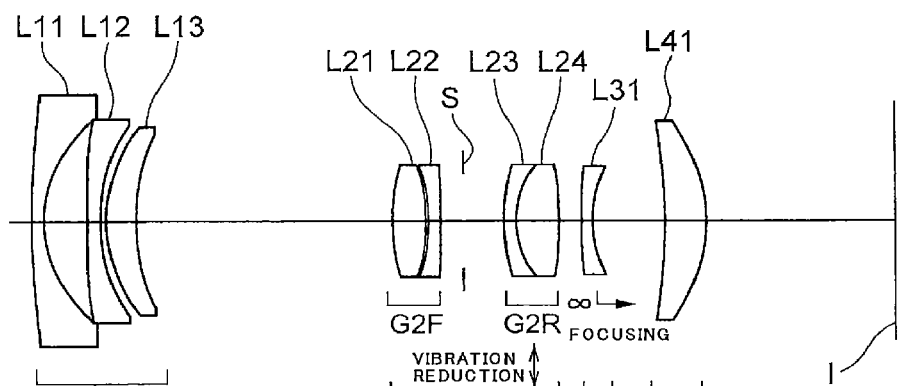
FIGS. 7A and 7B are respectively sectional views showing a zoom lens in a wide angle end state and a telephoto end state, according to a third Example that is common to the first and second embodiments of the present application.
Figure 7B:
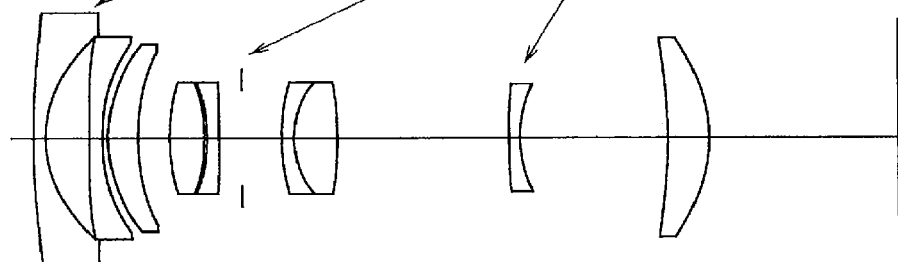

FIGS. 7A and 7B are respectively sectional views showing a zoom optical system in a wide angle end state and in a telephoto end state, according to a third example that is common to the first and second embodiments of the present application.

The zoom lens according to the present example is composed of a first lens group G1 having negative refractive power, a second lens group G2 having positive refractive power, a third lens group G3 having negative refractive power and a fourth lens group G4 having positive refractive power.

The first lens group G1 consists of, in order from an object side, a negative meniscus lens L11 having a convex surface facing the object side, a negative meniscus lens L12 having a convex surface facing the object side, and a positive meniscus lens L13 having a convex surface facing the object side. The negative meniscus lens L12 is a glass mold type aspherical lens whose object side and image side lens surfaces are aspherically shaped.

The second lens group G2 is composed of, in order from the object side, a front lens group G2F having positive refractive power, an aperture stop S, and a rear lens group G2R having positive refractive power.

The front lens group G2F consists of, in order from the object side, a positive lens L21 having a double convex shape and a negative meniscus lens L22 having a concave surface facing the object side. The positive lens L21 is a glass mold type aspherical lens whose object side lens surface is aspherically shaped.

The rear lens group G2R consists of, in order from the object side, a cemented lens constructed by a negative meniscus lens L23 having a convex surface facing the object side cemented with a positive lens L24 having a double convex shape.

The third lens group G3 consists of a negative meniscus lens L31 having a convex surface facing the object side. The negative meniscus lens L31 is a glass mold type aspherical lens whose object side lens surface and image side lens surface are aspherically shaped.

The fourth lens group G4 consists of a positive meniscus lens L41 having a convex surface facing the image side. The positive meniscus lens L41 is a glass mold type aspherical lens whose object side lens surface and image side lens surface are aspherically shaped.

In the zoom lens of the present example being constructed as above, upon varying magnification from a wide-angle end state to a telephoto end state, the first lens group G1 is moved along the optical axis and the second lens group G2 and the third lens group G3 are moved along the optical axis toward the object side such that an air distance between the first lens group G1 and the second lens group G2 is decreased, an air distance between the second lens group G2 and the third lens group G3 is increased, and an air distance between the third lens group G3 and the fourth lens group G4 is increased. Incidentally, the position of the fourth lens group G4 is fixed upon varying magnification. The front lens group G2F, the aperture stop S and the rear lens group G2R of the second lens group G2 are moved in a body upon varying magnification.

In the zoom lens of the present example, focusing from an infinite distance object to a close distance object is carried out by moving the third lens group G3 along the optical axis toward the image side.

In the zoom lens of the present example being constructed as above, vibration reduction is carried out by moving the rear lens group G2R in the second lens group G2 as a movable group to have a component in a direction perpendicular to the optical axis.

Table 3 below shows various values associated with the zoom lens according to the present example.

TABLE 3

Third Example

[Surface Data]

| m | r | d | nd | vd |
|---|---|---|---|---|
| OP | ∞ | | | |
| 1 | 81.550 | 0.800 | 1.603 | 65.440 |
| 2 | 9.681 | 3.069 | | |
| *3 | 328.483 | 1.000 | 1.623 | 58.163 |
| *4 | 14.895 | 0.345 | | |
| 5 | 11.373 | 2.200 | 2.001 | 25.455 |
| 6 | 16.225 | Variable | | |
| *7 | 17.158 | 2.493 | 1.619 | 63.854 |
| 8 | −13.864 | 0.157 | | |
| 9 | −13.612 | 0.800 | 1.648 | 33.723 |
| 10 | −40.184 | 1.500 | | |
| 11(S) | ∞ | 2.911 | | |
| 12 | 17.888 | 0.800 | 1.583 | 46.422 |
| 13 | 6.850 | 3.050 | 1.498 | 82.570 |
| 14 | −29.219 | Variable | | |
| *15 | 62.039 | 0.800 | 1.623 | 58.163 |
| *16 | 11.500 | Variable | | |
| *17 | −26.508 | 2.900 | 1.583 | 59.460 |
| *18 | −11.123 | BF | | |
| I | ∞ | | | |

[Aspherical Surface Data]

| m | κ | A4 | A6 | A8 | A10 |
|---|---|---|---|---|---|
| 3 | 1.000E+00 | −1.154E−06 | 3.285E−06 | −2.143E−08 | 0.000E+00 |
| 4 | 1.000E+00 | −3.977E−06 | 3.056E−06 | 9.547E−09 | −4.065E−10 |
| 7 | 1.000E+00 | −5.971E−05 | −1.038E−06 | 6.985E−08 | −1.544E−09 |
| 15 | 1.000E+00 | 5.899E−04 | −2.242E−05 | 3.797E−07 | −1.428E−09 |
| 16 | 1.000E+00 | 8.486E−04 | −2.240E−05 | 2.918E−07 | 0.000E+00 |
| 17 | 1.000E+00 | 9.517E−05 | 3.227E−06 | −6.273E−08 | 2.917E−10 |
| 18 | 1.000E+00 | 9.730E−05 | 2.655E−06 | −3.199E−08 | 6.854E−11 |

[Various Data]
Variable magnification ratio 2.83

| | W | T |
|---|---|---|
| f | 10.3 | 29.1 |
| FNO | 3.56 | 5.66 |
| 2ω | 77.0° | 31.4° |
| Y | 8.19 | 8.19 |

| | W | M | T |
|---|---|---|---|
| (Upon focusing on an infinitely distant Object) | | | |
| f | 10.300 | 18.663 | 29.100 |
| d6 | 18.137 | 7.139 | 2.319 |
| d14 | 1.600 | 6.535 | 12.018 |
| d16 | 5.189 | 7.498 | 10.589 |
| BF | 13.299 | 13.299 | 13.299 |
| TL | 47.750 | 43.997 | 47.750 |
| (Upon focusing on a close distance Object) | | | |
| D | 200.000 | 200.000 | 200.000 |
| d6 | 18.137 | 7.139 | 2.319 |
| d14 | 2.100 | 8.032 | 15.454 |
| d16 | 4.689 | 6.001 | 7.152 |
| BF | 13.299 | 13.299 | 13.299 |
| TL | 47.750 | 43.997 | 47.750 |

TABLE 3-continued

Third Example

[Lens Group Data]

| | ST | f |
|---|---|---|
| G1 | 1 | −14.356 |
| G2 | 7 | 13.818 |
| G3 | 15 | −22.812 |
| G4 | 17 | 30.732 |

[Vibration Reduction Data]

| | W | M | T |
|---|---|---|---|
| f | 10.300 | 18.663 | 29.100 |
| Z | 0.139 | 0.146 | 0.168 |
| θ | 0.624 | 0.500 | 0.500 |
| K | 0.804 | 1.118 | 1.511 |

[Values for Conditional Expressions]

(1-1) |f2vr|/fw = 2.664
(1-2) |f2vr|/f2 = 1.986
(1-3) m12/fw = 1.536
(2-1) |f2i|/fw = 2.664
(2-2) |f2i|/f2 = 1.986
(2-3) m12/fw = 1.536

Figure 8A:
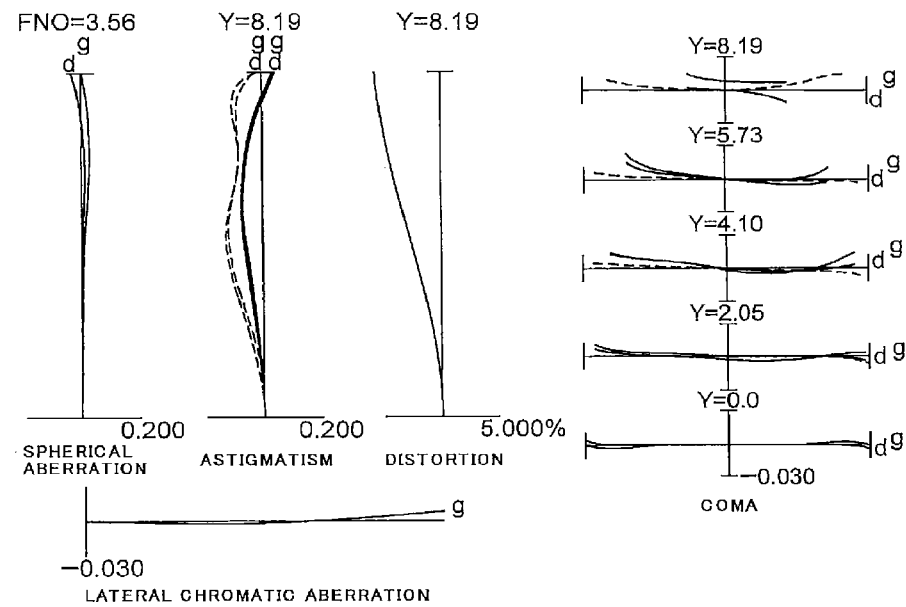
FIGS. 8A and 8B are respectively graphs showing various aberrations of the zoom lens according to the third Example of the present application in a wide angle state and in a telephoto end state, upon focusing on an infinitely distant object.
Figure 8B:
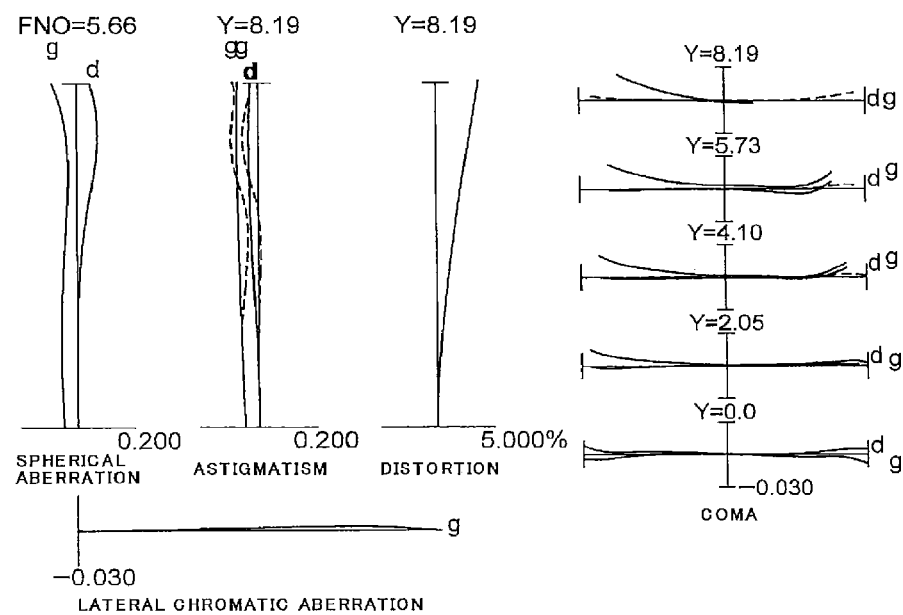

FIGS. 8A and 8B are graphs showing various aberrations upon focusing on an infinitely distant object in the wide-angle end state and in the telephoto end state of the zoom lens according to the third example of the present application.

Figure 9A:
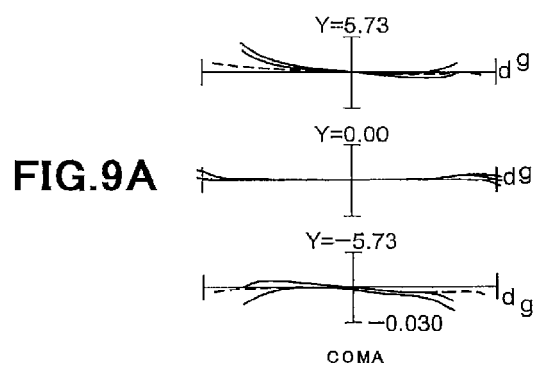
FIGS. 9A and 9B are respectively graphs showing coma aberration upon conducting vibration reduction of the zoom lens according to the third Example of the present application in a wide angle end state and in a telephoto end state, upon focusing on an infinitely distant object.
Figure 9B:
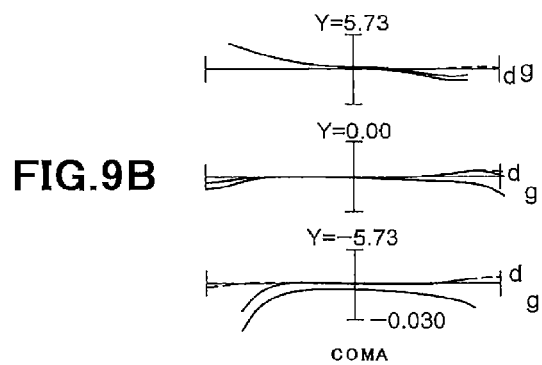

FIGS. 9A and 9B are respectively graphs showing coma aberrations at the time when vibration reduction is carried out against rotational camera shake of 0.624° upon focusing on the infinitely distant object in the wide-angle end state of the zoom lens and against rotational camera shake of 0.500° upon focusing on the infinitely distant object in the telephoto end state of the zoom lens according to the third example of the present application.

As apparent from the respective aberration diagrams, it is understood that the zooming lens system according to the present example corrects well the various aberrations from the wide-angle end state to the telephoto end state throughout, and further exhibits the high optical performances even upon conducting vibration reduction.

Fourth Example

Figure 10A:
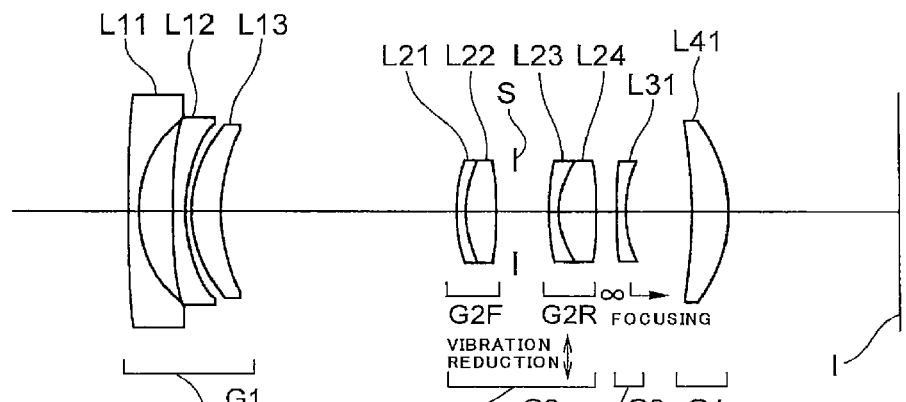
FIGS. 10A and 10B are respectively sectional views showing a zoom lens in a wide angle end state and in a telephoto end state, according to a fourth Example that is common to the first and second embodiments of the present application.
Figure 10B:
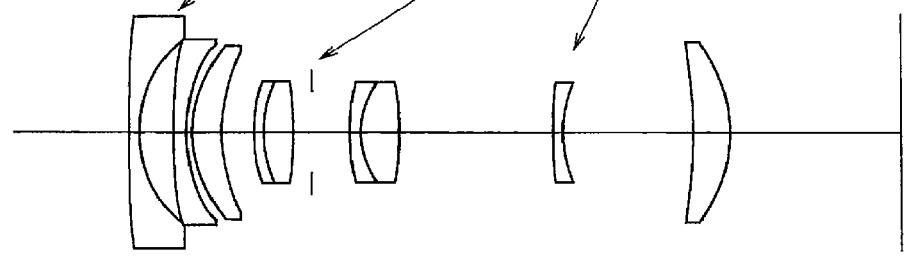

FIGS. 10A and 10B are respectively sectional views showing a zoom optical system in a wide angle end state and in a telephoto end state, according to a fourth example that is common to the first and second embodiments of the present application.

The zoom lens according to the present example is composed of a first lens group G1 having negative refractive power, a second lens group G2 having positive refractive power, a third lens group G3 having negative refractive power and a fourth lens group G4 having positive refractive power.

The first lens group G1 consists of, in order from an object side, a negative meniscus lens L11 having a convex surface facing the object side, a negative meniscus lens L12 having a convex surface facing the object side, and a positive meniscus lens L13 having a convex surface facing the object side. The negative meniscus lens L12 is a glass mold type aspherical lens whose object side and image side lens surfaces are aspherically shaped.

The second lens group G2 consists of, in order from the object side, a front lens group G2F having positive refractive power, an aperture stop S, and a rear lens group G2R having positive refractive power.

The front lens group G2F consists of, in order from the object side, a cemented lens constructed by a negative meniscus lens L21 having a convex surface facing the object side cemented with a positive lens L22 having a double convex shape. The negative meniscus lens L21 is a glass mold type aspherical lens whose object side lens surface is aspherically shaped.

The rear lens group G2R consists of, in order from the object side, a cemented lens constructed by a negative meniscus lens L23 having a convex surface facing the object side cemented with a positive lens L24 having a double convex shape.

The third lens group G3 consists of a negative meniscus lens L31 having a convex surface facing the object side. The negative meniscus lens L31 is a glass mold type aspherical lens whose object side lens surface and image side lens surface are spherically shaped.

The fourth lens group G4 consists of a positive meniscus lens L41 having a convex surface facing the image side. The positive meniscus lens L41 is a glass mold type aspherical lens whose object side lens surface and image side lens surface are spherically shaped.

In the zoom lens of the present example being constructed as above, upon varying magnification from a wide-angle end state to a telephoto end state, the first lens group G1 is moved along the optical axis and the second lens group G2 and the third lens group G3 are moved along the optical axis toward the object side such that an air distance between the first lens group G1 and the second lens group G2 is decreased, an air distance between the second lens group G2 and the third lens group G3 is increased, and an air distance between the third lens group G3 and the fourth lens group G4 is increased. Incidentally, the position of the fourth lens group G4 is fixed upon varying magnification. The front lens group G2F, the aperture stop S and the rear lens group G2R of the second lens group G2 are moved in a body upon varying magnification.

In the zoom lens of the present example, focusing from an infinite distance object to a close distance object is carried out by moving the third lens group G3 along the optical axis toward the image side.

In the zoom lens of the present example being constructed as above, vibration reduction is carried out by moving the rear lens group G2R in the second lens group G2 as a movable group to have a component in a direction perpendicular to the optical axis.

Table 4 below shows various values associated with the zoom lens according to the present example.

TABLE 4

Fourth Example

[Surface Data]

| m | r | d | nd | vd |
|---|---|---|---|---|
| OP | ∞ | | | |
| 1 | 106.318 | 0.800 | 1.603 | 65.440 |
| 2 | 10.056 | 2.861 | | |
| *3 | 143.575 | 1.000 | 1.623 | 58.163 |
| *4 | 14.071 | 0.423 | | |
| 5 | 11.120 | 2.300 | 2.001 | 25.455 |
| 6 | 15.538 | Variable | | |
| *7 | 13.167 | 0.800 | 1.689 | 31.160 |
| 8 | 10.273 | 2.367 | 1.498 | 82.570 |
| 9 | −30.189 | 1.500 | | |
| 10 (S) | ∞ | 2.779 | | |
| 11 | 18.410 | 0.800 | 1.583 | 46.422 |
| 12 | 7.012 | 3.193 | 1.498 | 82.570 |
| 13 | −30.652 | Variable | | |
| *14 | 63.684 | 0.800 | 1.623 | 58.163 |
| *15 | 11.500 | Variable | | |
| *16 | −27.536 | 2.900 | 1.583 | 59.460 |
| *17 | −11.202 | BF | | |
| I | ∞ | | | |

[Aspherical Surface Data]

| m | κ | A4 | A6 | A8 | A10 |
|---|---|---|---|---|---|
| 3 | 1.000E+00 | −8.371E−07 | 3.721E−06 | −2.590E−08 | 0.000E+00 |
| 4 | 1.000E+00 | −4.169E−06 | 3.663E−06 | 6.939E−09 | −4.421E−10 |
| 7 | 1.000E+00 | −7.051E−05 | −5.833E−07 | 3.934E−08 | −8.656E−10 |
| 14 | 1.000E+00 | 5.363E−04 | −1.981E−05 | 3.911E−07 | −5.635E−09 |
| 15 | 1.000E+00 | 7.643E−04 | −1.714E−05 | 1.457E−07 | 0.000E+00 |
| 16 | 1.000E+00 | 7.120E−05 | 3.106E−06 | −5.397E−08 | 2.399E−10 |
| 17 | 1.000E+00 | 9.425E−05 | 2.054E−06 | −2.025E−08 | 1.922E−11 |

[Various Data]
Variable magnification ratio 2.83

| | W | T |
|---|---|---|
| f | 10.3 | 29.1 |
| FNO | 3.56 | 5.66 |
| 2ω | 77.0° | 31.4° |
| Y | 8.19 | 8.19 |

| | W | M | T |
|---|---|---|---|
| (Upon focusing on an infinitely distant Object) | | | |
| f | 10.300 | 18.719 | 29.100 |
| d6 | 18.449 | 7.402 | 2.629 |
| d13 | 1.600 | 6.578 | 12.020 |
| d15 | 5.178 | 7.477 | 10.578 |
| BF | 13.299 | 13.299 | 13.299 |
| TL | 47.750 | 43.980 | 47.750 |
| (Upon focusing on a close Object) | | | |
| D | 200.000 | 200.000 | 200.000 |
| d6 | 18.449 | 7.402 | 2.629 |
| d13 | 2.100 | 8.086 | 15.463 |
| d15 | 4.678 | 5.969 | 7.136 |
| BF | 13.299 | 13.299 | 13.299 |
| TL | 47.750 | 43.980 | 47.750 |

TABLE 4-continued

Fourth Example

[Lens Group Data]

|     | ST | f       |
|-----|----|---------|
| G1  | 1  | −14.399 |
| G2  | 7  | 13.808  |
| G3  | 14 | −22.674 |
| G4  | 16 | 30.395  |

[Vibration Reduction Data]

|   | W     | M      | T      |
|---|-------|--------|--------|
| f | 10.300| 18.719 | 29.100 |
| Z | 0.145 | 0.152  | 0.175  |
| θ | 0.624 | 0.500  | 0.500  |
| K | 0.775 | 1.077  | 1.452  |

[Values for Conditional Expressions]

(1-1) |f2vr|/fw = 2.771
(1-2) |f2vr|/f2 = 2.067
(1-3) m12/fw = 1.536
(2-1) |f2i|/fw = 2.771
(2-2) |f2i|/f2 = 2.067
(2-3) m12/fw = 1.536

Figure 11A:
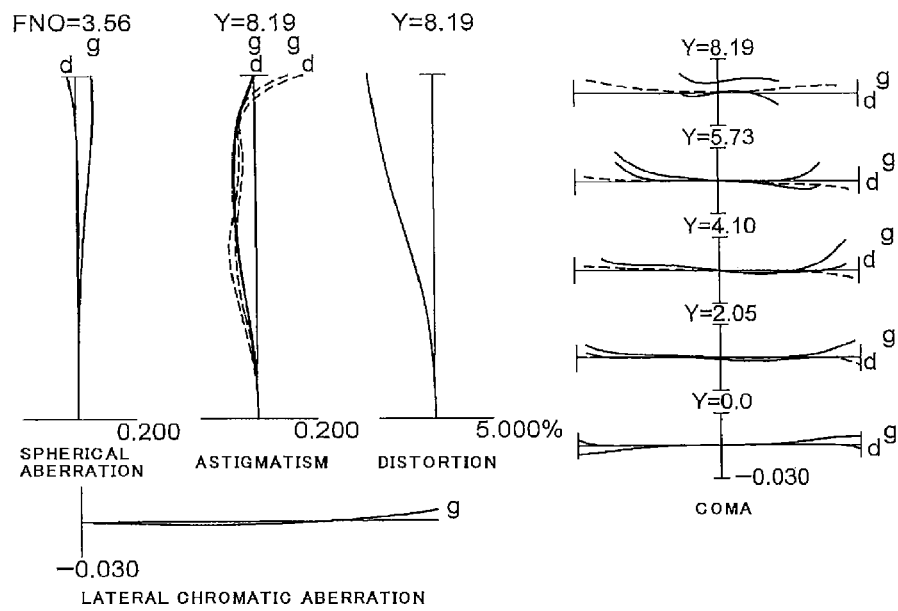
FIGS. 11A and 11B are respectively graphs showing various aberrations of the zoom lens according to the fourth Example of the present application in a wide angle state and in a telephoto end state, upon focusing on an infinitely distant object.
Figure 11B:
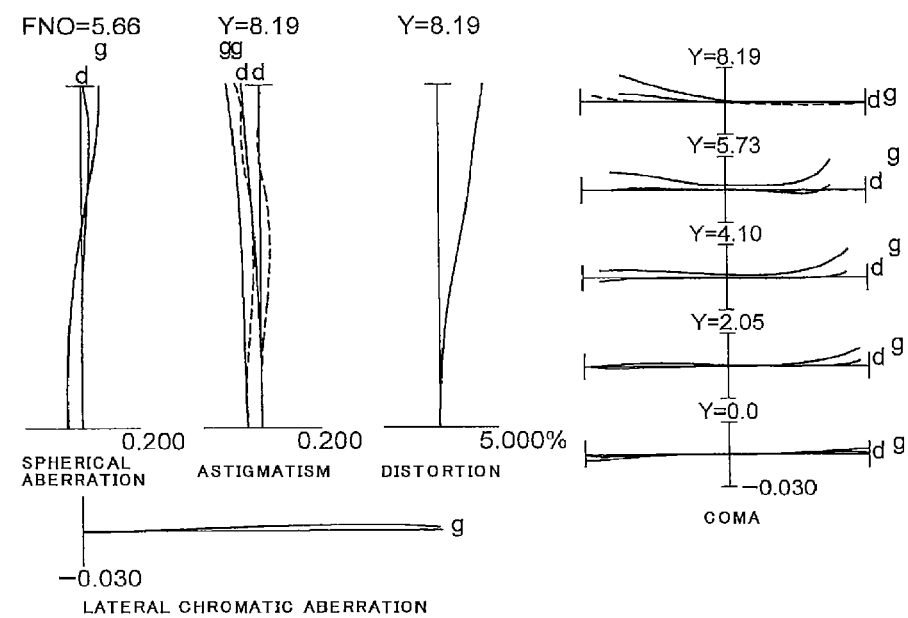

FIGS. 11A and 11B are graphs showing various aberrations upon focusing on an infinitely distant object in the wide-angle end state and in the telephoto end state of the zoom lens according to the fourth example of the present application.

Figure 12A:
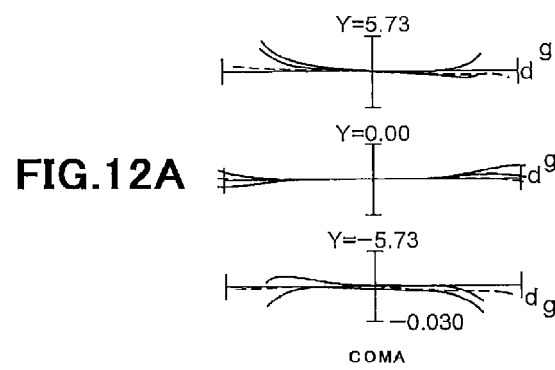
FIGS. 12A and 12B are respectively graphs showing coma aberration upon conducting vibration reduction of the zoom lens according to the fourth Example of the present application in a wide angle end state and in a telephoto end state, upon focusing on an infinitely distant object.
Figure 12B:
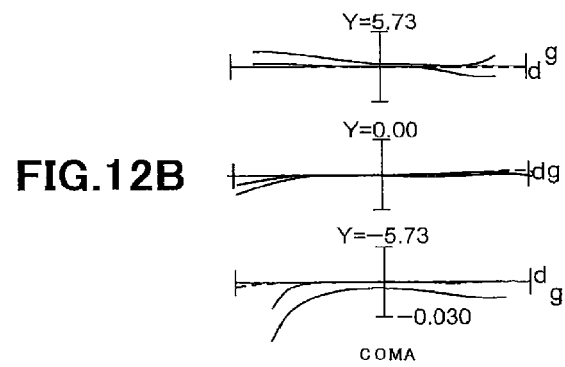

FIGS. 12A and 12B are respectively graphs showing coma aberrations at the time when vibration reduction is carried out against rotational camera shake of 0.624° upon focusing on the infinitely distant object in the wide-angle end state of the zoom lens and against rotational camera shake of 0.500° upon focusing on the infinitely distant object in the telephoto end state of the zoom lens according to the fourth example of the present application.

As apparent from the respective aberration diagrams, it is understood that the zooming lens system according to the present example corrects well the various aberrations from the wide-angle end state to the telephoto end state throughout, and further exhibits the high optical performances even upon conducting vibration reduction.

Fifth Example

Figure 13A:
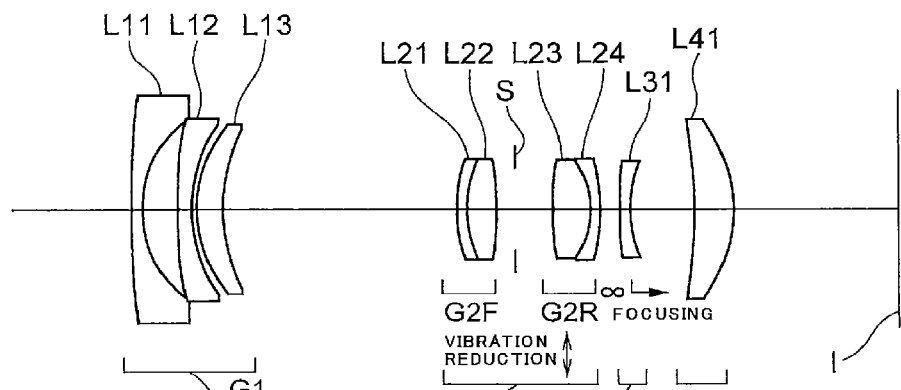
FIGS. 13A and 13B are respectively sectional views showing a zoom lens in a wide angle end state and in a telephoto end state, according to a fifth Example that is common to the first and second embodiments of the present application.
Figure 13B:
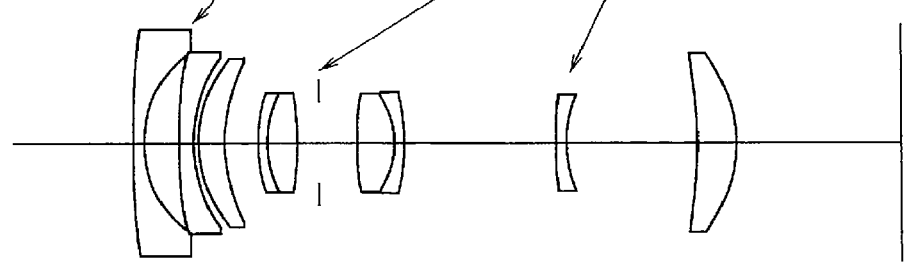

FIGS. 13A and 13B are respectively sectional views showing a zoom lens in a wide angle end state and in a telephoto end state, according to a fifth example that is common to the first and second embodiments of the present application.

The zoom lens according to the present example is composed of a first lens group G1 having negative refractive power, a second lens group G2 having positive refractive power, a third lens group G3 having negative refractive power and a fourth lens group G4 having positive refractive power.

The first lens group G1 consists of, in order from an object side, a negative meniscus lens L11 having a convex surface facing the object side, a negative meniscus lens L12 having a convex surface facing the object side, and a positive meniscus lens L13 having a convex surface facing the object side. The negative meniscus lens L12 is a glass mold type aspherical lens whose object side and image side lens surfaces are aspherically shaped.

The second lens group G2 is composed of, in order from the object side, a front lens group G2F having positive refractive power, an aperture stop S, and a rear lens group G2R having positive refractive power.

The front lens group G2F consists of, in order from the object side, a cemented lens constructed by a negative meniscus lens L21 having a convex surface facing the object side cemented with a positive lens L22 having a double convex shape. The negative meniscus lens L21 is a glass mold type aspherical lens whose object side lens surface is aspherically shaped.

The rear lens group G2R consists of, in order from the object side, a cemented lens constructed by a positive lens L23 having a double convex shape cemented with a negative meniscus lens L24 having a concave surface facing the object side.

The third lens group G3 consists of a negative meniscus lens L31 having a convex surface facing the object side. The negative meniscus lens L31 is a glass mold type aspherical lens whose object side lens surface and image side lens surface are spherically shaped.

The fourth lens group G4 consists of a positive meniscus lens L41 having a convex surface facing the image side. The positive meniscus lens L41 is a glass mold type aspherical lens whose object side lens surface and image side lens surface are aspherically shaped.

In the zoom lens of the present example being constructed as above, upon varying magnification from a wide-angle end state to a telephoto end state, the first lens group G1 is moved along the optical axis and the second lens group G2 and the third lens group G3 are moved along the optical axis toward the object side such that an air distance between the first lens group G1 and the second lens group G2 is decreased, an air distance between the second lens group G2 and the third lens group G3 is increased, and an air distance between the third lens group G3 and the fourth lens group G4 is increased. Incidentally, the position of the fourth lens group G4 is fixed upon varying magnification. The front lens group G2F, the aperture stop S and the rear lens group G2R of the second lens group G2 are moved in a body upon varying magnification.

In the zoom lens of the present example, focusing from an infinite distance object to a close distance object is carried out by moving the third lens group G3 along the optical axis toward the image side.

In the zoom lens of the present example being constructed as above, vibration reduction is carried out by moving the rear lens group G2R in the second lens group G2 as a movable group to have a component in a direction perpendicular to the optical axis.

Table 5 below shows various values associated with the zoom lens according to the present example.

TABLE 5

Fifth Example

[Surface Data]

| m | r | d | nd | vd |
|---|---|---|---|---|
| OP | ∞ | | | |
| 1 | 88.142 | 0.800 | 1.603 | 65.440 |
| 2 | 9.905 | 2.982 | | |
| *3 | 210.317 | 1.000 | 1.623 | 58.163 |
| *4 | 14.471 | 0.351 | | |
| 5 | 11.109 | 2.232 | 2.001 | 25.455 |
| 6 | 15.535 | Variable | | |
| *7 | 12.853 | 0.800 | 1.689 | 31.160 |
| 8 | 9.651 | 2.483 | 1.498 | 82.570 |
| 9 | −25.272 | 1.500 | | |
| 10 (S) | ∞ | 2.982 | | |
| 11 | 38.663 | 2.959 | 1.498 | 82.570 |
| 12 | −7.387 | 0.800 | 1.583 | 46.422 |
| 13 | −18.053 | Variable | | |
| *14 | 62.590 | 0.800 | 1.623 | 58.163 |
| *15 | 11.500 | Variable | | |
| *16 | −30.304 | 2.900 | 1.583 | 59.460 |
| *17 | −11.634 | BF | | |
| I | ∞ | | | |

[Aspherical Surface Data]

| m | κ | A4 | A6 | A8 | A10 |
|---|---|---|---|---|---|
| 3 | 1.000E+00 | 5.701E−06 | 3.172E−06 | −2.105E−08 | 0.000E+00 |
| 4 | 1.000E+00 | −3.719E−06 | 3.592E−06 | −2.523E−09 | −2.835E−10 |
| 7 | 1.000E+00 | −8.356E−05 | −4.804E−08 | 3.953E−08 | −1.452E−09 |
| 14 | 1.000E+00 | 5.370E−04 | −1.971E−05 | 5.561E−07 | −1.276E−08 |
| 15 | 1.000E+00 | 7.313E−04 | −1.349E−05 | 7.835E−08 | 0.000E+00 |
| 16 | 1.000E+00 | 9.440E−05 | 2.643E−06 | −5.709E−08 | 2.373E−10 |
| 17 | 1.000E+00 | 1.188E−04 | 1.670E−06 | −2.423E−08 | −1.067E−11 |

[Various Data]
Variable magnification ratio 2.83

| | W | T |
|---|---|---|
| f | 10.3 | 29.1 |
| FNO | 3.56 | 5.66 |
| 2ω | 77.0° | 31.4° |
| Y | 8.19 | 8.19 |

| | W | M | T |
|---|---|---|---|
| (Upon focusing on an infinitely distant Object) | | | |
| f | 10.300 | 18.707 | 29.100 |
| d6 | 18.352 | 7.209 | 2.442 |
| d13 | 1.600 | 6.675 | 12.110 |
| d15 | 5.209 | 7.356 | 10.609 |
| BF | 13.299 | 13.299 | 13.298 |
| TL | 47.750 | 43.831 | 47.750 |
| (Upon focusing on a close distance Object) | | | |
| D | 200.000 | 200.000 | 200.000 |
| d6 | 18.352 | 7.209 | 2.442 |
| d13 | 2.100 | 8.191 | 15.553 |
| d15 | 4.709 | 5.841 | 7.165 |
| BF | 13.299 | 13.299 | 13.298 |
| TL | 47.750 | 43.831 | 47.750 |

TABLE 5-continued

Fifth Example

[Lens Group Data]

|  | ST | f |
|---|---|---|
| G1 | 1 | −14.390 |
| G2 | 7 | 13.895 |
| G3 | 14 | −22.764 |
| G4 | 16 | 30.631 |

[Vibration Reduction Data]

|  | W | M | T |
|---|---|---|---|
| f | 10.300 | 18.707 | 29.100 |
| Z | 0.161 | 0.167 | 0.190 |
| θ | 0.624 | 0.500 | 0.500 |
| K | 0.696 | 0.980 | 1.336 |

[Values for Conditional Expressions]

(1-1) |f2vr|/fw = 2.932
(1-2) |f2vr|/f2 = 2.174
(1-3) m12/fw = 1.545
(2-1) |f2i|/fw = 2.932
(2-2) |f2i|/f2 = 2.174
(2-3) m12/fw = 1.545

Figure 14A:
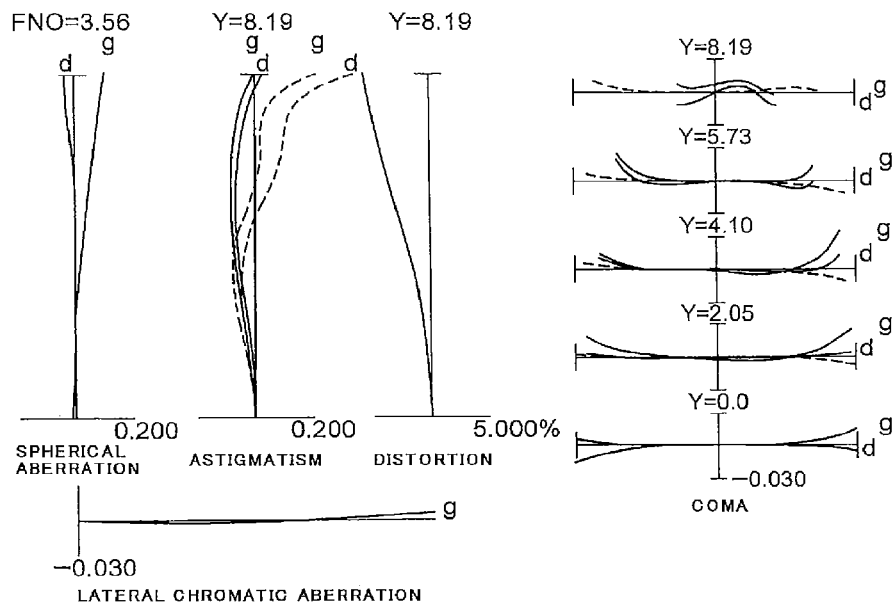
FIGS. 14A and 14B are respectively various aberrations of the zoom lens according to the fifth Example of the present application in a wide angle state and in a telephoto end state, upon focusing on an infinitely distant object.
Figure 14B:
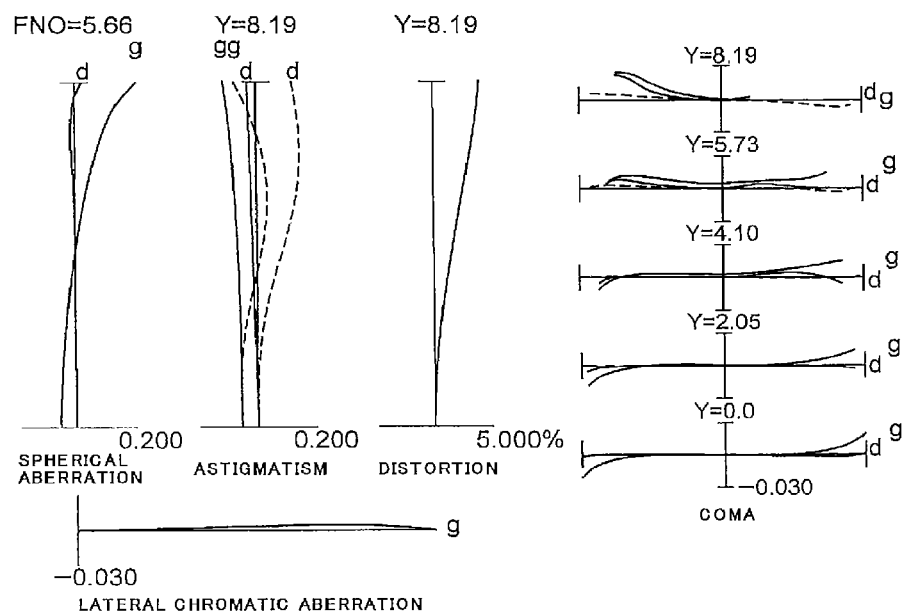

FIGS. 14A and 14B are graphs showing various aberrations upon focusing on an infinitely distant object in the wide-angle end state and in the telephoto end state of the zoom lens according to the fifth example of the present application.

Figure 15A:
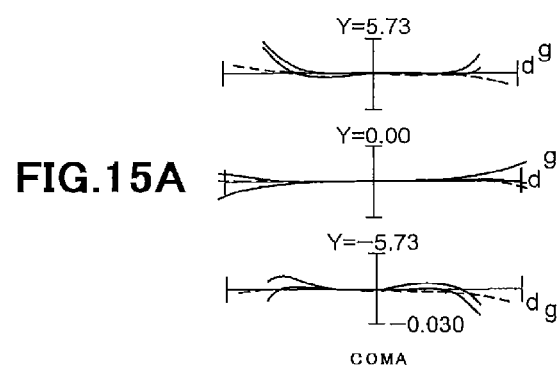
FIGS. 15A and 15B are respectively graphs showing coma aberration upon conducting vibration reduction of the zoom lens according to the fifth Example of the present application in a wide angle end state and in a telephoto end state, upon focusing on an infinitely distant object.
Figure 15B:
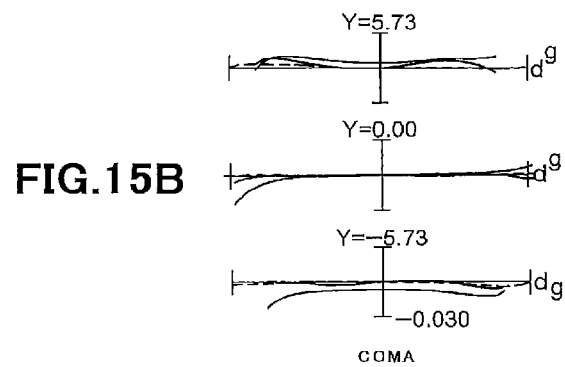

FIGS. 15A and 15B are respectively graphs showing coma aberrations at the time when vibration reduction is carried out against rotational camera shake of 0.624° upon focusing on the infinitely distant object in the wide-angle end state and against rotational camera shake of 0.500° upon focusing on the infinitely distant object in the telephoto end state of the zoom lens according to the fifth example of the present application.

As apparent from the respective aberration diagrams, it is understood that the zooming lens system according to the present example corrects well the various aberrations from the wide-angle end state to the telephoto end state throughout, and further exhibits the high optical performances even upon conducting vibration reduction.

Sixth Example

Figure 16A:
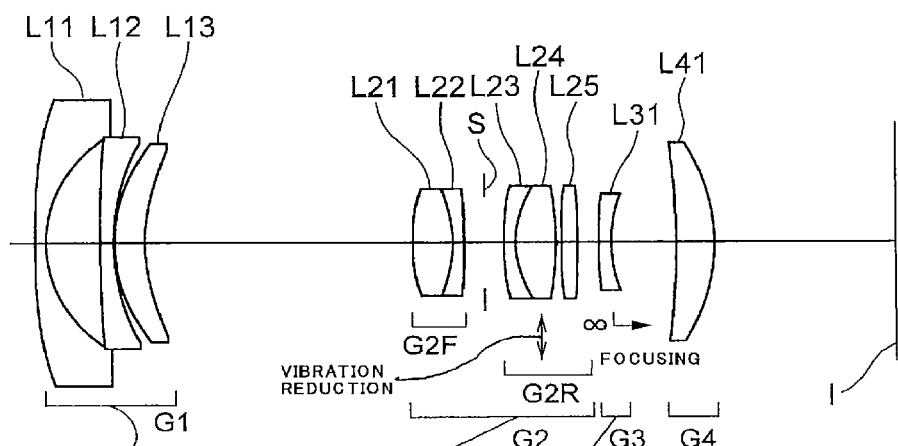
FIGS. 16A and 16B are respectively sectional views showing a zoom lens in a wide angle end state and a telephoto end state, according to a sixth Example that is common to the first and second embodiments of the present application.
Figure 16B:
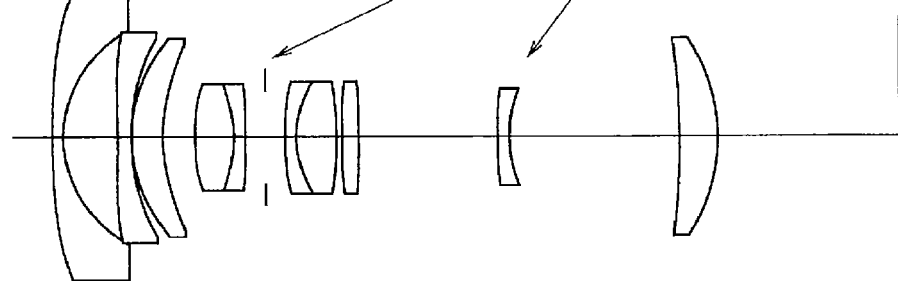

FIGS. 16A and 16B are respectively sectional views showing a zoom optical system in a wide angle end state and in a telephoto end state, according to a sixth example that is common to the first and second embodiments of the present application.

The zoom lens according to the present example is composed of a first lens group G1 having negative refractive power, a second lens group G2 having positive refractive power, a third lens group G3 having negative refractive power and a fourth lens group G4 having positive refractive power.

The first lens group G1 consists of, in order from an object side, a negative meniscus lens L11 having a convex surface facing the object side, a negative meniscus lens L12 having a convex surface facing the object side, and a positive meniscus lens L13 having a convex surface facing the object side. The negative meniscus lens L12 is a glass mold type aspherical lens whose object side and image side lens surfaces are aspherically shaped.

The second lens group G2 is composed of, in order from the object side, a front lens group G2F having positive refractive power, an aperture stop S, and a rear lens group G2R having positive refractive power.

The front lens group G2F consists of, in order from the object side, a cemented lens constructed by a positive lens L21 having a double convex shape cemented with a negative meniscus lens L22 having a concave surface facing the object side. The positive lens L21 is a glass mold type aspherical lens whose object side lens surface is aspherically shaped.

The rear lens group G2R consists of, in order from the object side, a cemented lens constructed by a negative meniscus lens L23 having a convex surface facing the object side cemented with a positive lens L24 having a double convex shape.

The third lens group G3 consists of a negative meniscus lens L31 having a convex surface facing the object side. The negative meniscus lens L31 is a glass mold type aspherical lens whose object side lens surface and image side lens surface are aspherically shaped.

The fourth lens group G4 consists of a positive meniscus lens L41 having a convex surface facing the image side. The positive meniscus lens L41 is a glass mold type aspherical lens whose object side lens surface and image side lens surface are aspherically shaped.

In the zoom lens of the present example being constructed as above, upon varying magnification from a wide-angle end state to a telephoto end state, the first lens group G1 is moved along the optical axis and the second lens group G2 and the third lens group G3 are moved along the optical axis toward the object side such that an air distance between the first lens group G1 and the second lens group G2 is decreased, an air distance between the second lens group G2 and the third lens group G3 is increased, and an air distance between the third lens group G3 and the fourth lens group G4 is increased. Incidentally, the position of the fourth lens group G4 is fixed upon varying magnification. Further, the front lens group G2F, the aperture stop S and the rear lens group G2R of the second lens group G2 are moved in a body upon varying magnification.

In the zoom lens of the present example, focusing from an infinite distance object to a close distance object is carried out by moving the third lens group G3 along the optical axis toward the image side.

In the zoom lens of the present example being constructed as above, vibration reduction is carried out by moving the cemented lens constructed by the negative meniscus lens L23 cemented with the positive lens L24, as a movable lens, to have a component in a direction perpendicular to the optical axis.

Table 6 below shows various values associated with the zoom lens according to the present example.

TABLE 6

Sixth Example

[Surface Data]

| m | r | d | nd | vd |
|---|---|---|---|---|
| OP | ∞ | | | |
| 1 | 45.595 | 0.800 | 1.603 | 65.440 |
| 2 | 9.305 | 3.897 | | |
| *3 | 105.000 | 1.000 | 1.623 | 58.163 |
| *4 | 14.940 | 0.100 | | |
| 5 | 12.251 | 2.300 | 2.001 | 25.455 |
| 6 | 17.488 | Variable | | |
| *7 | 17.546 | 2.764 | 1.623 | 58.163 |
| 8 | −11.264 | 0.800 | 1.603 | 38.028 |
| 9 | −98.822 | 1.500 | | |
| 10 (S) | ∞ | 1.387 | | |
| 11 | 19.920 | 0.800 | 1.583 | 46.422 |
| 12 | 7.418 | 2.957 | 1.498 | 82.570 |
| 13 | −30.797 | 0.418 | | |
| 14 | 69.148 | 1.200 | 1.498 | 82.570 |
| 15 | −235.478 | Variable | | |
| *16 | 84.505 | 0.800 | 1.623 | 58.163 |
| *17 | 11.200 | Variable | | |
| *18 | −48.331 | 2.762 | 1.583 | 59.460 |
| *19 | −13.370 | BF | | |
| I | ∞ | | | |

[Aspherical Surface Data]

| m | κ | A4 | A6 | A8 | A10 |
|---|---|---|---|---|---|
| 3 | 1.000E+00 | −1.989E−04 | 4.989E−06 | −2.793E−08 | 0.000E+00 |
| 4 | 1.000E+00 | −2.392E−04 | 5.104E−06 | −1.433E−08 | −2.533E−10 |
| 7 | 1.000E+00 | −6.515E−05 | −2.091E−07 | −5.039E−09 | 5.126E−10 |
| 16 | 1.000E+00 | 2.128E−04 | 3.675E−06 | −3.902E−07 | 6.158E−09 |
| 17 | 1.000E+00 | 3.722E−04 | 1.473E−06 | −2.115E−07 | 0.000E+00 |
| 18 | 1.000E+00 | 2.156E−05 | 2.295E−06 | −5.042E−08 | 2.351E−10 |
| 19 | 1.000E+00 | 5.297E−05 | 1.731E−06 | −3.031E−08 | 5.877E−11 |

[Various Data]
Variable magnification ratio 2.83

| | W | T |
|---|---|---|
| f | 10.3 | 29.1 |
| FNO | 3.56 | 5.66 |
| 2ω | 77.0° | 31.4° |
| Y | 8.19 | 8.19 |

| | W | M | T |
|---|---|---|---|
| (Upon focusing on an infinitely distant Object) | | | |
| f | 10.300 | 20.160 | 29.100 |
| d6 | 19.196 | 6.353 | 2.334 |
| d15 | 1.600 | 6.308 | 9.827 |
| d17 | 4.618 | 8.326 | 12.191 |
| BF | 13.300 | 13.297 | 13.299 |
| TL | 48.900 | 44.472 | 47.837 |
| (Upon focusing on a close distance Object) | | | |
| D | 200.000 | 200.000 | 200.000 |
| d6 | 19.196 | 6.353 | 2.334 |
| d15 | 2.058 | 7.811 | 12.661 |

TABLE 6-continued

Sixth Example

| | | | |
|---|---|---|---|
| d17 | 4.161 | 6.823 | 9.357 |
| BF | 13.300 | 13.296 | 13.299 |
| TL | 48.900 | 44.472 | 47.837 |

[Lens Group Data]

| | ST | f |
|---|---|---|
| G1 | 1 | −15.508 |
| G2 | 7 | 13.604 |
| G3 | 16 | −20.824 |
| G4 | 18 | 30.800 |

[Vibration Reduction Data]

| | W | M | T |
|---|---|---|---|
| f | 10.300 | 20.160 | 29.100 |
| Z | 0.145 | 0.162 | 0.184 |
| θ | 0.624 | 0.500 | 0.500 |
| K | 0.771 | 1.089 | 1.383 |

[Values for Conditional Expressions]

(1-1) |f2vr|/fw = 2.313
(1-2) |f2vr|/f2 = 1.751
(1-3) m12/fw = 1.637
(2-1) |f2i|/fw = 2.313
(2-2) |f2i|/f2 = 1.751
(2-3) m12/fw = 1.637

Figure 17A:
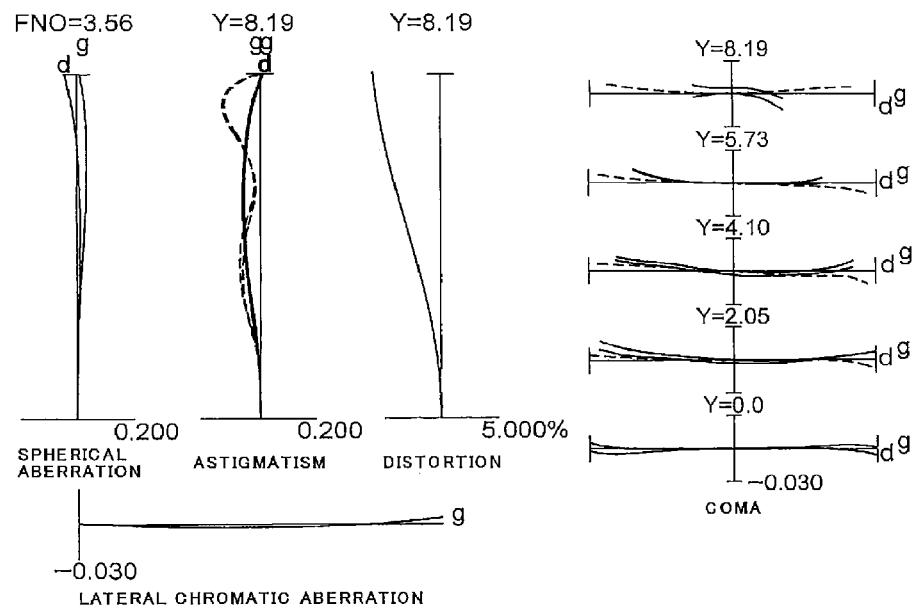
FIGS. 17A and 17B are respectively graphs showing various aberrations of the zoom lens according to the sixth Example of the present application in a wide angle state and in a telephoto end state, upon focusing on an infinitely distant object.
Figure 17B:
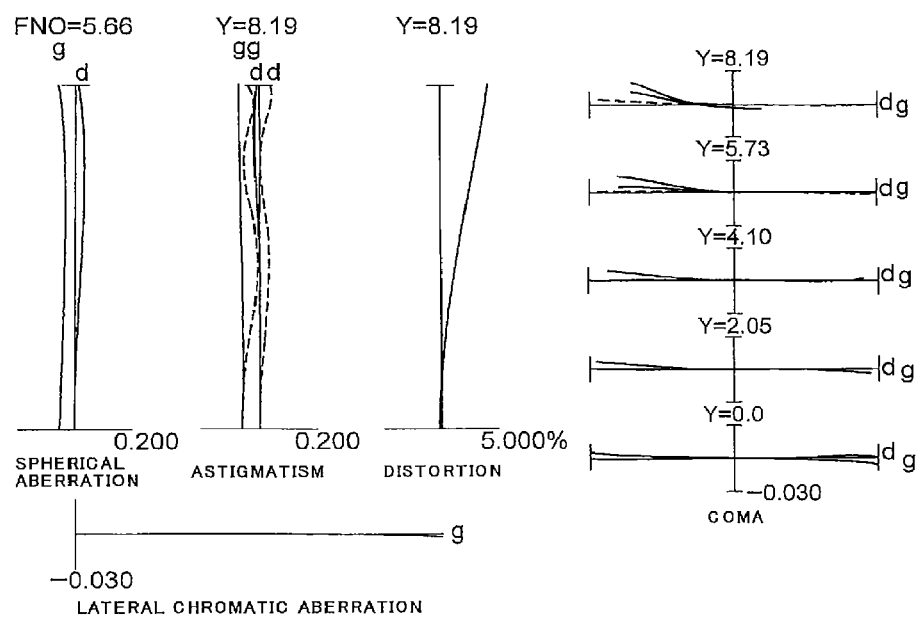

FIGS. 17A and 17B are graphs showing various aberrations upon focusing on an infinitely distant object in the wide-angle end state and in the telephoto end state of the zoom lens according to the sixth example of the present application.

Figure 18A:
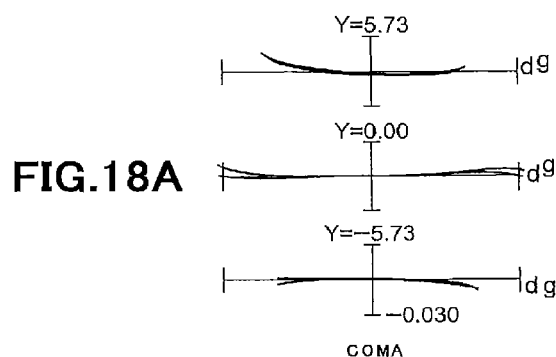
FIGS. 18A and 18B are respectively graphs showing coma aberration upon conducting vibration reduction of the zoom lens according to the sixth Example of the present application in a wide angle end state and in a telephoto end state, upon focusing on an infinitely distant object.
Figure 18B:
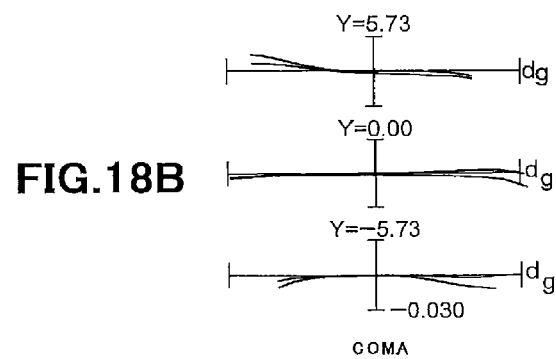

FIGS. 18A and 18B are respectively graphs showing coma aberrations at the time when vibration reduction is carried out against rotational camera shake of 0.624° upon focusing on the infinitely distant object in the wide-angle end state and against rotational camera shake of 0.500° upon focusing on the infinitely distant object in the telephoto end state of the zoom lens according to the sixth example of the present application.

As apparent from the respective aberration diagrams, it is understood that the zooming lens system according to the present example corrects well the various aberrations from the wide-angle end state to the telephoto end state throughout, and further exhibits the high optical performances upon conducting vibration reduction.

Seventh Example

Figure 19A:
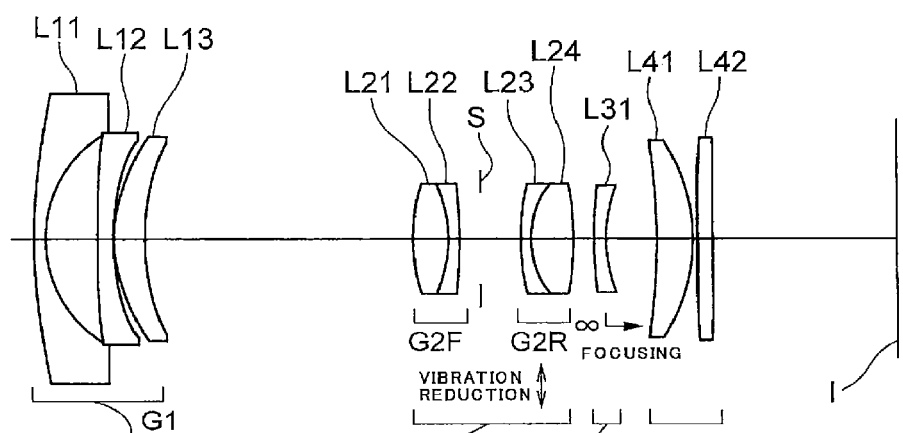
FIGS. 19A and 19B are respectively sectional views showing a zoom lens in a wide angle end state and a telephoto end state, according to a seventh Example that is common to the first and second embodiments of the present application.
Figure 19B:
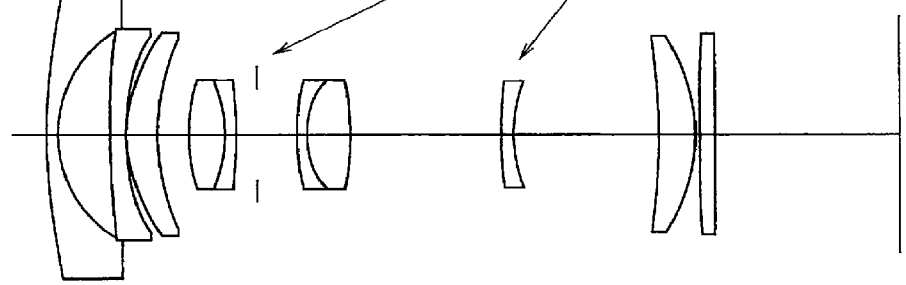

FIGS. 19A and 19B are respectively sectional views showing a zoom optical system in a wide angle end state and in a telephoto end state, according to a seventh example that is common to the first and second embodiments of the present application.

The zoom lens according to the present example is composed of a first lens group G1 having negative refractive power, a second lens group G2 having positive refractive power, a third lens group G3 having negative refractive power and a fourth lens group G4 having positive refractive power.

The first lens group G1 consists of, in order from an object side, a negative meniscus lens L11 having a convex surface facing the object side, a negative meniscus lens L12 having a convex surface facing the object side, and a positive meniscus lens L13 having a convex surface facing the object side. The negative meniscus lens L12 is a glass mold type aspherical lens whose object side and image side lens surfaces are aspherically shaped.

The second lens group G2 is composed of, in order from the object side, a front lens group G2F having positive refractive power, an aperture stop S, and a rear lens group G2R having positive refractive power.

The front lens group G2F consists of, in order from the object side, a cemented lens constructed by a positive lens L21 having a double convex shape cemented with a negative meniscus lens L22 having a concave surface facing the object side. The positive lens L21 is a glass mold type aspherical lens whose object side lens surface is aspherically shaped.

The rear lens group G2R consists of, in order from the object side, a cemented lens constructed by a negative meniscus lens L23 having a convex surface facing the object side cemented with a positive lens L24 having a double convex shape.

The third lens group G3 consists of a negative meniscus lens L31 having a convex surface facing the object side.

The fourth lens group G4 consists of, in order from the object side, a positive meniscus lens L41 having a convex surface facing the image side and a positive lens L42 having a double convex shape. Each of the positive meniscus lens L41 and the positive lens L42 is a glass mold type aspherical lens whose object side lens surface and image side lens surface are spherically shaped.

In the zoom lens of the present example being constructed as above, upon varying magnification from a wide-angle end state to a telephoto end state, the first lens group G1 is moved along the optical axis, and the second lens group G2 and the third lens group G3 are moved along the optical axis toward the object side such that an air distance between the first lens group G1 and the second lens group G2 is decreased, an air distance between the second lens group G2 and the third lens group G3 is increased, and an air distance between the third lens group G3 and the fourth lens group G4 is increased. Incidentally, the position of the fourth lens group G4 is fixed upon varying magnification. Further, the front lens group G2F, the aperture stop S and the rear lens group G2R of the second lens group G2 are moved in a body upon varying magnification.

In the zoom lens of the present example, focusing from an infinite distance object to a close distance object is carried out by moving the third lens group G3 along the optical axis toward the image side.

In the zoom lens of the present example being constructed as above, vibration reduction is carried out by moving the rear lens group G2R in the second lens group G2 as a movable group to have a component in a direction perpendicular to the optical axis.

Table 7 below shows various values associated with the zoom lens according to the present example.

TABLE 7

Seventh Example

[Surface Data]

| m | r | d | nd | νd |
|---|---|---|---|---|
| OP | ∞ | | | |
| 1 | 49.983 | 0.800 | 1.603 | 65.440 |
| 2 | 9.505 | 3.797 | | |
| *3 | 105.000 | 1.000 | 1.623 | 58.163 |
| *4 | 15.558 | 0.100 | | |
| 5 | 12.387 | 2.300 | 2.001 | 25.455 |
| 6 | 17.350 | Variable | | |
| *7 | 17.524 | 2.569 | 1.623 | 58.163 |
| 8 | −10.281 | 0.800 | 1.603 | 38.028 |
| 9 | −57.158 | 1.500 | | |
| 10 (S) | ∞ | 2.772 | | |
| 11 | 18.079 | 0.800 | 1.583 | 46.422 |
| 12 | 6.987 | 3.000 | 1.498 | 82.570 |
| 13 | −30.422 | Variable | | |
| 14 | 67.175 | 0.800 | 1.623 | 58.163 |
| 15 | 11.200 | Variable | | |
| *16 | −36.612 | 2.616 | 1.583 | 59.460 |
| *17 | −12.977 | 0.300 | | |
| *18 | 1000.000 | 1.115 | 1.583 | 59.460 |
| *19 | −210.703 | BF | | |
| I | ∞ | | | |

[Aspherical Surface Data]

| m | κ | A4 | A6 | A8 | A10 |
|---|---|---|---|---|---|
| 3 | 1.000E+00 | −1.815E−04 | 4.949E−06 | −2.802E−08 | 0.000E+00 |
| 4 | 1.000E+00 | −2.152E−04 | 4.869E−06 | −9.757E−09 | −2.834E−10 |
| 7 | 1.000E+00 | −5.840E−05 | −1.272E−06 | 8.962E−08 | −2.229E−09 |
| 16 | 1.000E+00 | 2.682E−06 | 4.729E−06 | −1.432E−07 | 1.899E−09 |
| 17 | 1.000E+00 | 1.508E−04 | 2.729E−06 | −7.215E−08 | 0.000E+00 |
| 18 | 1.000E+00 | 7.330E−05 | 1.194E−06 | −2.778E−08 | 2.807E−11 |
| 19 | 1.000E+00 | 7.834E−05 | 1.005E−06 | −1.240E−08 | −1.054E−10 |

[Various Data]
Variable magnification ratio 2.83

| | W | T |
|---|---|---|
| f | 10.3 | 29.1 |
| FNO | 3.56 | 5.66 |
| 2ω | 77.0° | 31.4° |
| Y | 8.19 | 8.19 |

| | W | M | T |
|---|---|---|---|
| (Upon focusing on an infinitely distant Object) | | | |
| f | 10.300 | 20.356 | 29.100 |
| d6 | 19.255 | 6.343 | 2.342 |
| d13 | 1.600 | 6.867 | 10.960 |

TABLE 7-continued

Seventh Example

| | | | |
|---|---|---|---|
| d15 | 3.777 | 7.568 | 10.723 |
| BF | 13.299 | 13.299 | 13.299 |
| TL | 48.900 | 45.046 | 48.293 |
| (Upon focusing on a close distance Object) | | | |
| D | 200.000 | 200.000 | 200.000 |
| d6 | 19.255 | 6.343 | 2.342 |
| d13 | 2.102 | 8.572 | 14.245 |
| d15 | 3.275 | 5.863 | 7.438 |
| BF | 13.299 | 13.299 | 13.299 |
| TL | 48.900 | 45.046 | 48.293 |

[Lens Group Data]

| | ST | f |
|---|---|---|
| G1 | 1 | −15.658 |
| G2 | 7 | 14.031 |
| G3 | 14 | −21.707 |
| G4 | 16 | 29.815 |

[Vibration Reduction Data]

| | W | M | T |
|---|---|---|---|
| f | 10.300 | 20.356 | 29.100 |
| Z | 0.144 | 0.157 | 0.176 |
| θ | 0.624 | 0.500 | 0.500 |
| K | 0.779 | 1.134 | 1.441 |

[Values for Conditional Expressions]

(1-1) $|f2vr|/fw = 2.718$
(1-2) $|f2vr|/f2 = 1.996$
(1-3) $m12/fw = 1.642$
(2-1) $|f2i|/fw = 2.718$
(2-2) $|f2i|/f2 = 1.996$
(2-3) $m12/fw = 1.642$

Figure 20A:
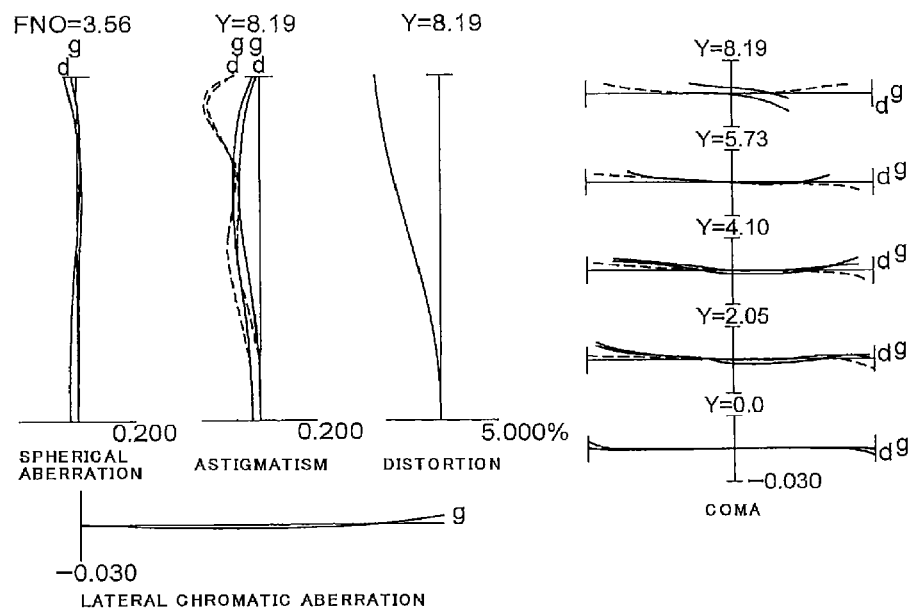
FIGS. 20A and 20B are respectively graphs showing various aberrations of the zoom lens according to the seventh Example of the present application in a wide angle state and in a telephoto end state, upon focusing on an infinitely distant object.
Figure 20B:
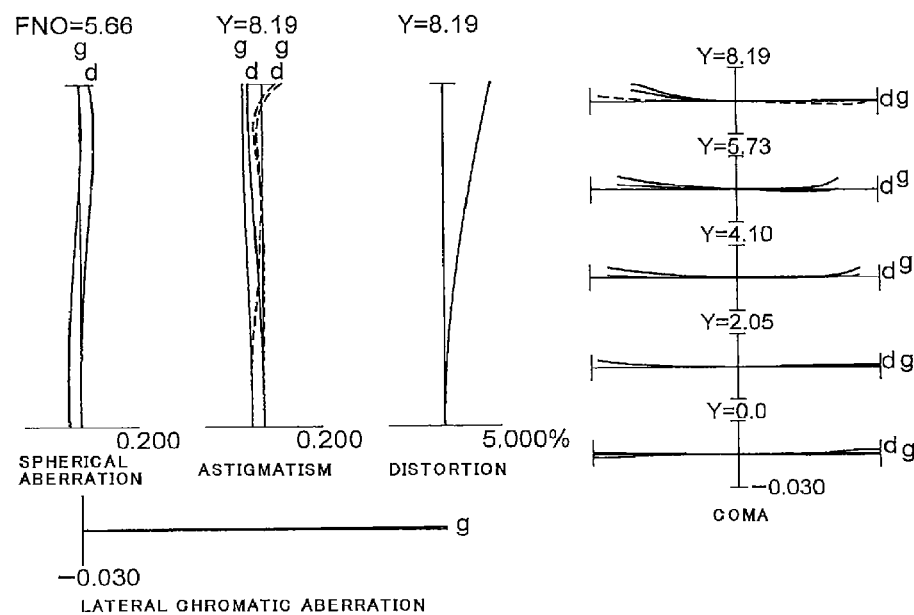

FIGS. 20A and 20B are graphs showing various aberrations upon focusing on an infinitely distant object in the wide-angle end state and in the telephoto end state of the zoom lens according to the seventh example of the present application.

Figure 21A:
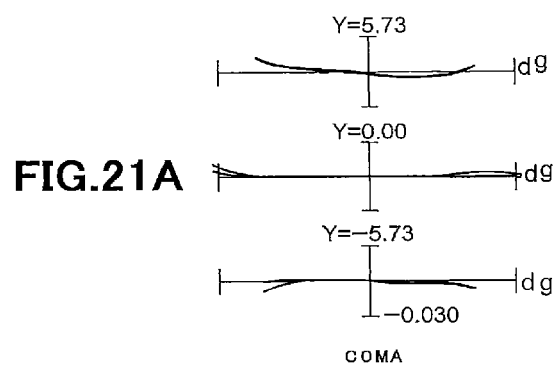
FIGS. 21A and 21B are respectively graphs showing coma aberration upon conducting vibration reduction of the zoom lens according to the seventh Example of the present application in a wide angle end state and in a telephoto end state, upon focusing on an infinitely distant object.
Figure 21B:
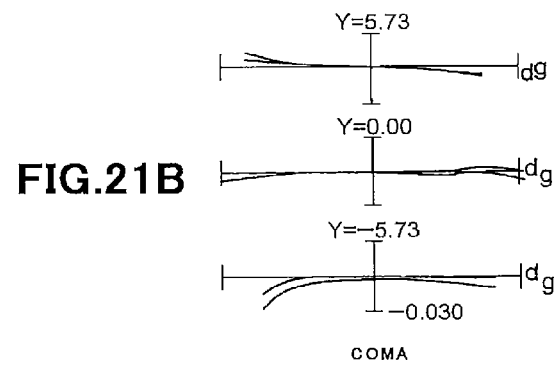

FIGS. 21A and 21B are respectively graphs showing coma aberrations at the time when vibration reduction is carried out against rotational camera shake of 0.624° upon focusing on the infinitely distant object in the wide-angle end state and against rotational camera shake of 0.500° upon focusing on the infinitely distant object in the telephoto end state of the zoom lens according to the seventh example of the present application.

As apparent from the respective aberration diagrams, it is understood that the zooming lens system according to the present example corrects well the various aberrations from the wide-angle end state to the telephoto end state throughout, and further exhibits the high optical performances even upon conducting vibration reduction.

Eighth Example

Figure 22A:
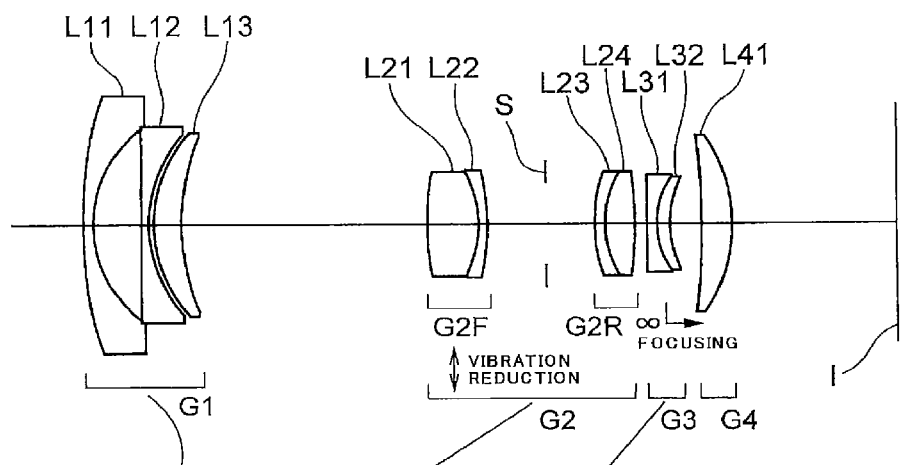
FIGS. 22A and 22B are respectively sectional views showing a zoom lens in a wide angle end state and a telephoto end state, according to an eighth Example of the first embodiment of the present application.
Figure 22B:
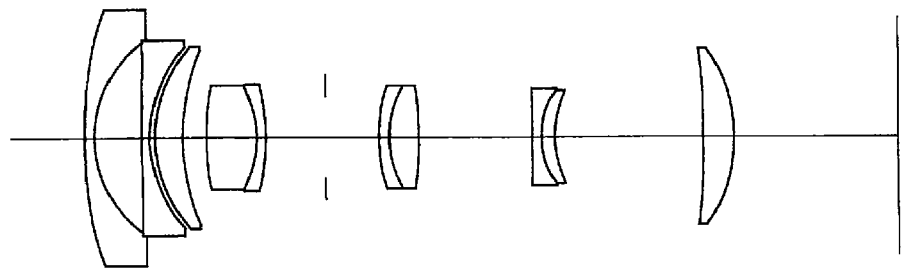

FIGS. 22A and 22B are respectively sectional views showing a zoom lens in a wide angle end state and in a telephoto end state, according to an eighth example of the first embodiment of the present application.

The zoom lens according to the present example is composed of a first lens group G1 having negative refractive power, a second lens group G2 having positive refractive power, a third lens group G3 having negative refractive power and a fourth lens group G4 having positive refractive power.

The first lens group G1 consists of, in order from an object side, a negative meniscus lens L11 having a convex surface facing the object side, a negative meniscus lens L12 having a convex surface facing the object side, and a positive meniscus lens L13 having a convex surface facing the object side. The negative meniscus lenses L11 and L12 each is a glass mold type aspherical lens whose object side and image side lens surfaces are aspherically shaped.

The second lens group G2 is composed of, in order from the object side, a front lens group G2F having positive refractive power, an aperture stop S, and a rear lens group G2R having positive refractive power.

The front lens group G2F consists of, in order from the object side, a cemented lens constructed by a positive lens L21 having a double convex shape cemented with a negative meniscus lens L22 having a concave surface facing the object side. The positive meniscus lens L21 is a glass mold type aspherical lens whose object side lens surface is aspherically shaped.

The rear lens group G2R consists of, in order from the object side, a cemented lens constructed by a negative meniscus lens L23 having a convex surface facing the object side cemented with a positive lens L24 having a double convex shape.

The third lens group G3 consists of, in order from the object side, a cemented lens constructed by a negative lens L31 having a double concave shape cemented with a positive meniscus lens L32 having a convex surface facing the object side. The positive meniscus lens L32 is a glass mold type aspherical lens whose image side lens surface is aspherically shaped.

The fourth lens group G4 consists of a positive meniscus lens L41 having a convex surface facing the image side. The positive meniscus lens L41 is a glass mold type aspherical lens whose image side lens surface is aspherically shaped.

In the zoom lens of the present example being constructed as above, upon varying magnification from a wide-angle end state to a telephoto end state, the first lens group G1 is moved along the optical axis, and the second lens group G2 and the third lens group G3 are moved along the optical axis toward the object side, such that an air distance between the first lens group G1 and the second lens group G2 is decreased, an air distance between the second lens group G2 and the third lens group G3 is increased, and an air distance between the third lens group G3 and the fourth lens group G4 is increased.

Incidentally, the position of the fourth lens group G4 is fixed upon varying magnification. The front lens group G2F, the aperture stop S and the rear lens group G2R of the second lens group G2 are moved in a body upon varying magnification.

In the zoom lens of the present example, focusing from an infinite distance object to a close distance object is carried out by moving the third lens group G3 along the optical axis toward the image side.

In the zoom lens of the present example being constructed as above, vibration reduction is carried out by moving the front lens group G2F in the second lens group G2 as a movable group to have a component in a direction perpendicular to the optical axis.

Table 8 below shows various values associated with the zoom lens according to the present example.

TABLE 8

Eighth Example

[Surface Data]

| m | r | d | nd | νd |
|---|---|---|---|---|
| OP | ∞ | | | |
| *1 | 41.364 | 0.800 | 1.697 | 55.460 |
| *2 | 10.676 | 3.644 | | |
| *3 | 92.728 | 0.800 | 1.623 | 58.163 |
| *4 | 11.362 | 0.300 | | |
| 5 | 11.589 | 2.116 | 2.001 | 25.458 |
| 6 | 17.859 | Variable | | |
| *7 | 19.709 | 4.000 | 1.498 | 82.570 |
| 8 | −10.373 | 0.800 | 1.593 | 35.271 |
| 9 | −17.799 | 4.717 | | |
| 10 (S) | ∞ | 3.881 | | |
| 11 | 14.096 | 0.800 | 1.702 | 41.018 |
| 12 | 8.189 | 2.400 | 1.498 | 82.570 |
| 13 | −29.442 | Variable | | |
| 14 | −173.316 | 0.800 | 1.532 | 48.779 |
| 15 | 6.986 | 1.000 | 1.689 | 31.160 |
| *16 | 9.416 | Variable | | |
| 17 | −65.070 | 2.430 | 1.497 | 81.558 |
| *18 | −13.885 | BF | | |
| I | ∞ | | | |

[Aspherical Surface Data]

| m | κ | A4 | A6 | A8 | A10 |
|---|---|---|---|---|---|
| 1 | 1.000E+00 | 1.895E−05 | −8.057E−08 | 1.203E−09 | 0.000E+00 |
| 2 | 1.000E+00 | 1.352E−04 | −2.937E−07 | −1.567E−08 | 0.000E+00 |
| 3 | 1.000E+00 | −9.934E−05 | 8.829E−07 | −4.475E−09 | 0.000E+00 |
| 4 | 1.000E+00 | −2.433E−04 | 2.518E−06 | 1.027E−08 | 0.000E+00 |
| 7 | 1.000E+00 | −7.257E−05 | −3.785E−07 | 1.817E−08 | 0.000E+00 |
| 16 | 1.000E+00 | 1.393E−04 | −4.903E−07 | −1.723E−08 | 0.000E+00 |
| 18 | 1.000E+00 | −1.372E−05 | 4.080E−08 | −1.307E−09 | 0.000E+00 |

[Various Data]
Variable magnification ratio 2.83

| | W | T |
|---|---|---|
| f | 10.3 | 29.1 |
| FNO | 3.56 | 5.66 |
| 2ω | 77.0° | 31.4° |
| Y | 8.19 | 8.19 |

| | W | M | T |
|---|---|---|---|
| (Upon focusing on an infinitely distant Object) | | | |
| f | 10.300 | 19.073 | 29.100 |
| d6 | 19.180 | 7.156 | 1.819 |
| d13 | 1.002 | 4.723 | 8.893 |
| d16 | 2.530 | 7.777 | 11.898 |

TABLE 8-continued

Eighth Example

| | | | |
|---|---|---|---|
| BF | 13.800 | 13.800 | 13.800 |
| TL | 51.200 | 48.144 | 51.097 |

(Upon focusing on a close distance Object)

| | | | |
|---|---|---|---|
| D | 200.000 | 200.000 | 200.000 |
| d6 | 19.180 | 7.156 | 1.819 |
| d13 | 1.424 | 5.840 | 11.184 |
| d16 | 2.108 | 6.660 | 9.607 |
| BF | 13.800 | 13.800 | 13.800 |
| TL | 51.200 | 48.144 | 51.097 |

[Lens Group Data]

| | ST | f |
|---|---|---|
| G1 | 1 | −14.672 |
| G2 | 7 | 14.776 |
| G3 | 14 | −18.879 |
| G4 | 17 | 34.956 |

[Vibration Reduction Data]

| | W | M | T |
|---|---|---|---|
| f | 10.300 | 19.073 | 29.100 |
| Z | 0.087 | 0.101 | 0.126 |
| θ | 0.624 | 0.500 | 0.500 |
| K | 1.293 | 1.651 | 2.017 |

[Values for Conditional Expressions]

(1-1) |f2vr|/fw = 2.044
(1-2) |f2vr|/f2 = 1.425
(1-3) m12/fw = 1.686

Figure 23A:
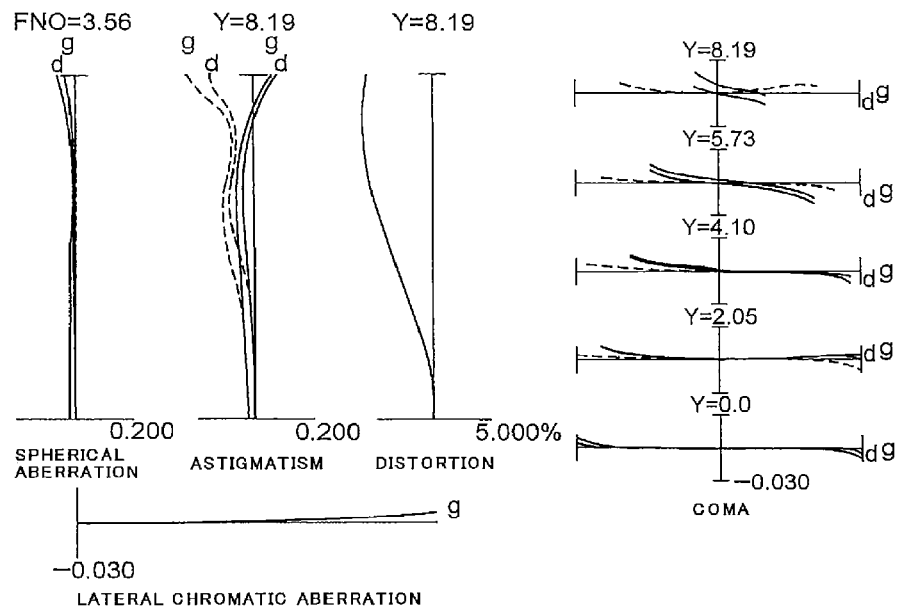
FIGS. 23A and 23B are respectively graphs showing various aberrations of the zoom lens according to the eighth Example of the present application in a wide angle state and in a telephoto end state, upon focusing on an infinitely distant object.
Figure 23B:
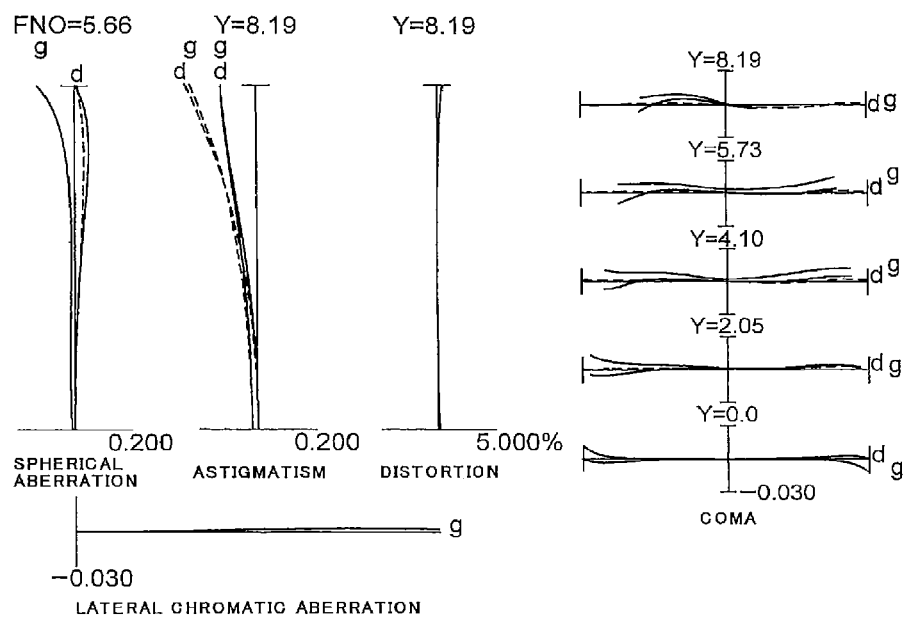

FIGS. 23A and 23B are graphs showing various aberrations upon focusing on an infinitely distant object in the wide-angle end state and in the telephoto end state of the zoom lens according to the eighth example of the present application.

Figure 24A:
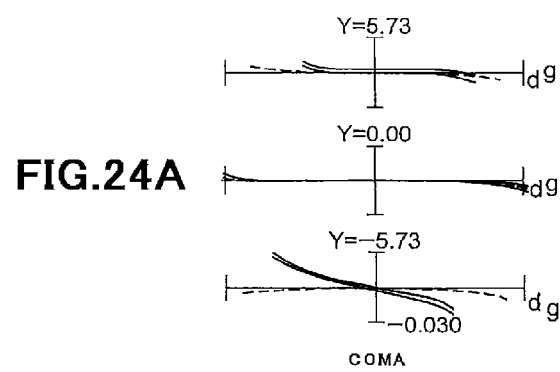
FIGS. 24A and 24B are respectively graphs showing coma aberration upon conducting vibration reduction of the zoom lens according to the eighth Example of the present application in a wide angle end state and in a telephoto end state, upon focusing on an infinitely distant object.
Figure 24B:
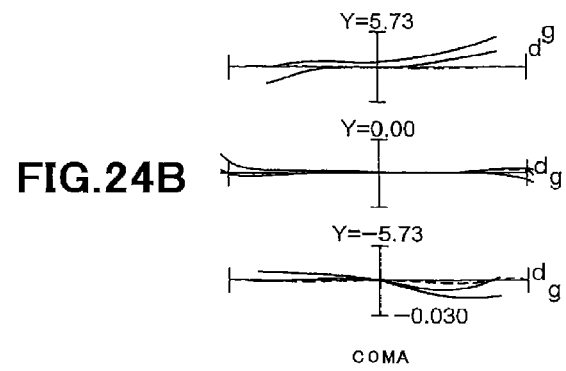

FIGS. 24A and 24B are respectively graphs showing coma aberrations at the time when vibration reduction is carried out against rotational camera shake of 0.624° upon focusing on the infinitely distant object in the wide-angle end state and against rotational camera shake of 0.500° upon focusing on the infinitely distant object in the telephoto end state of the zoom lens according to the eighth example of the present application.

As apparent from the respective aberration diagrams, it is understood that the zooming lens system according to the present example corrects well the various aberrations from the wide-angle end state to the telephoto end state throughout, and further exhibits the high optical performances even upon conducting vibration reduction.

Ninth Example

Figure 25A:
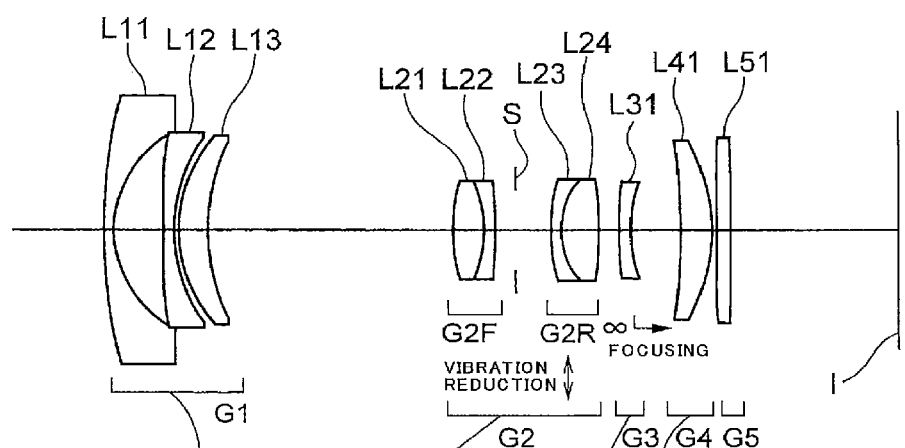
FIGS. 25A and 25B are respectively sectional views showing a zoom lens in a wide angle end state and a telephoto end state, according to a ninth Example of the first embodiment of the present application.
Figure 25B:
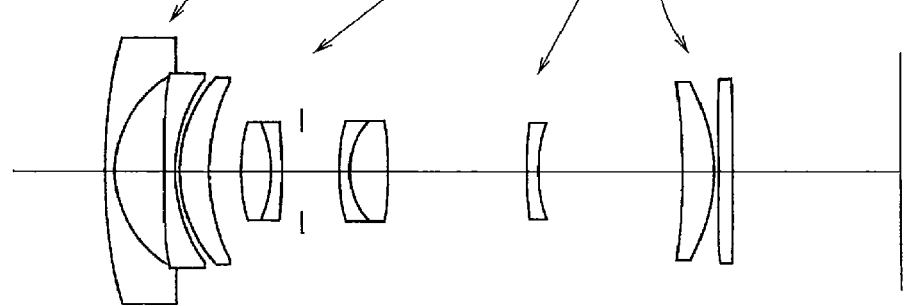

FIGS. 25A and 25B are respectively sectional views showing a zoom lens in a wide angle end state and in a telephoto end state, according to a ninth example of the first embodiment of the present application.

The zoom lens according to the present example is composed of a first lens group G1 having negative refractive power, a second lens group G2 having positive refractive power, a third lens group G3 having negative refractive power, a fourth lens group G4 having positive refractive power and a fifth lens group G5 having positive refractive power.

The first lens group G1 consists of, in order from an object side, a negative meniscus lens L11 having a convex surface facing the object side, a negative meniscus lens L12 having a convex surface facing the object side, and a positive meniscus lens L13 having a convex surface facing the object side. The negative meniscus lens L12 is a glass mold type aspherical lens whose object side and image side lens surfaces are aspherically shaped.

The second lens group G2 is composed of, in order from the object side, a front lens group G2F having positive refractive power, an aperture stop S, and a rear lens group G2R having positive refractive power.

The front lens group G2F consists of, in order from the object side, a cemented lens constructed by a positive lens L21 having a double convex shape cemented with a negative meniscus lens L22 having a concave surface facing the object side. The positive meniscus lens L21 is a glass mold type aspherical lens whose object side lens surface is aspherically shaped.

The rear lens group G2R consists of, in order from the object side, a cemented lens constructed by a negative meniscus lens L23 having a convex surface facing the object side cemented with a positive lens L24 having a double convex shape.

The third lens group G3 consists of a negative meniscus lens L31 having a convex surface facing the object side. The negative meniscus lens L31 is a glass mold type aspherical lens whose object side lens surface and image side lens surface are aspherically shaped.

The fourth lens group G4 consists of a positive meniscus lens L41 having a convex surface facing the image side. The positive meniscus lens L41 is a glass mold type aspherical lens whose object side lens surface and image side lens surface are aspherically shaped.

The fifth lens group G5 consists of a positive lens 51 having a double convex shape.

In the zoom lens of the present example being constructed as above, upon varying magnification from a wide-angle end state to a telephoto end state, the first lens group G1 and the fourth lens group G4 are moved along the optical axis, and the second lens group G2 and the third lens group G3 are moved along the optical axis toward the object side, such that an air distance between the first lens group G1 and the second lens group G2 is decreased, an air distance between the second lens group G2 and the third lens group G3 is increased, an air distance between the third lens group G3 and the fourth lens group G4 is increased and an air distance between the fourth lens group G4 and the fifth lens group G5 is varied. Incidentally, the position of the fifth lens group G5 is fixed upon varying magnification. Further, the front lens group G2F, the aperture stop S and the rear lens group G2R of the second lens group G2 are moved in a body upon varying magnification.

In the zoom lens of the present example, focusing from an infinite distance object to a close distance object is carried out by moving the third lens group G3 along the optical axis toward the image side.

In the zoom lens of the present example, vibration reduction is carried out by moving the rear lens group G2R in the second lens group G2 as a movable group to have a component in a direction perpendicular to the optical axis.

Table 9 below shows various values associated with the zoom lens according to the present example.

TABLE 9

Ninth Example

[Surface Data]

| m | r | d | nd | νd |
|---|---|---|---|---|
| OP | ∞ | | | |
| 1 | 46.214 | 0.800 | 1.603 | 65.440 |
| 2 | 9.455 | 3.704 | | |
| *3 | 66.876 | 1.000 | 1.623 | 58.163 |
| *4 | 13.627 | 0.251 | | |
| 5 | 11.862 | 2.300 | 2.001 | 25.455 |
| 6 | 16.694 | Variable | | |
| *7 | 17.515 | 2.406 | 1.623 | 58.163 |
| 8 | −9.943 | 0.800 | 1.603 | 38.028 |
| 9 | −66.732 | 1.500 | | |
| 10 (S) | ∞ | 2.920 | | |
| 11 | 17.632 | 0.800 | 1.583 | 46.422 |
| 12 | 7.009 | 2.942 | 1.498 | 82.570 |
| 13 | −32.172 | Variable | | |
| *14 | 50.543 | 0.800 | 1.623 | 58.163 |
| *15 | 11.200 | Variable | | |
| *16 | −39.592 | 2.522 | 1.583 | 59.460 |
| *17 | −13.816 | Variable | | |
| 18 | 1000.000 | 1.138 | 1.583 | 59.460 |
| 19 | −185.156 | BF | | |
| I | ∞ | | | |

[Aspherical Surface Data]

| m | κ | A4 | A6 | A8 | A10 |
|---|---|---|---|---|---|
| 3 | 1.000E+00 | −1.574E−04 | 4.358E−06 | −2.353E−08 | 0.000E+00 |
| 4 | 1.000E+00 | −2.003E−04 | 4.247E−06 | −1.333E−09 | −3.237E−10 |
| 7 | 1.000E+00 | −5.432E−05 | −7.941E−07 | 4.408E−08 | −9.972E−10 |
| 14 | 1.000E+00 | −1.087E−04 | 1.017E−05 | −2.054E−07 | 2.789E−10 |
| 15 | 1.000E+00 | 2.298E−05 | 9.118E−06 | −1.945E−07 | 0.000E+00 |
| 16 | 1.000E+00 | 1.332E−04 | −2.972E−07 | −1.673E−08 | 1.213E−11 |
| 17 | 1.000E+00 | 1.279E−04 | 1.508E−07 | −1.498E−08 | −3.985E−11 |

[Various Data]
Variable magnification ratio 2.83

| | W | T |
|---|---|---|
| f | 10.3 | 29.1 |
| FNO | 3.56 | 5.66 |
| 2ω | 77.0° | 31.4° |
| Y | 8.19 | 8.19 |

| | W | M | T |
|---|---|---|---|
| (Upon focusing on an infinitely distant Object) | | | |
| f | 10.300 | 20.399 | 29.100 |
| d6 | 19.238 | 6.325 | 2.465 |
| d13 | 1.600 | 7.004 | 11.124 |
| d15 | 3.879 | 7.526 | 11.128 |
| d17 | 0.300 | 0.525 | 0.300 |

TABLE 9-continued

Ninth Example

| | | | | |
|---|---|---|---|---|
| | BF | 14.250 | 14.250 | 14.250 |
| | TL | 48.900 | 45.263 | 48.900 |

(Upon focusing on a close distance Object)

| | | | |
|---|---|---|---|
| D | 200.000 | 200.000 | 200.000 |
| d6 | 19.238 | 6.325 | 2.465 |
| d13 | 2.138 | 8.847 | 14.624 |
| d15 | 3.341 | 5.682 | 7.627 |
| d17 | 0.300 | 0.525 | 0.300 |
| BF | 14.250 | 14.250 | 14.250 |
| TL | 48.900 | 45.263 | 48.900 |

[Lens Group Data]

| | ST | f |
|---|---|---|
| G1 | 1 | −15.692 |
| G2 | 7 | 14.237 |
| G3 | 14 | −23.291 |
| G4 | 16 | 35.128 |
| G5 | 18 | 268.010 |

[Vibration Reduction Data]

| | W | M | T |
|---|---|---|---|
| f | 10.300 | 20.399 | 29.100 |
| Z | 0.143 | 0.156 | 0.175 |
| θ | 0.624 | 0.500 | 0.500 |
| K | 0.784 | 1.142 | 1.455 |

[Values for Conditional Expressions]

(1-1) |f2vr|/fw = 2.718
(1-2) |f2vr|/f2 = 1.967
(1-3) m12/fw = 1.628

Figure 26A:
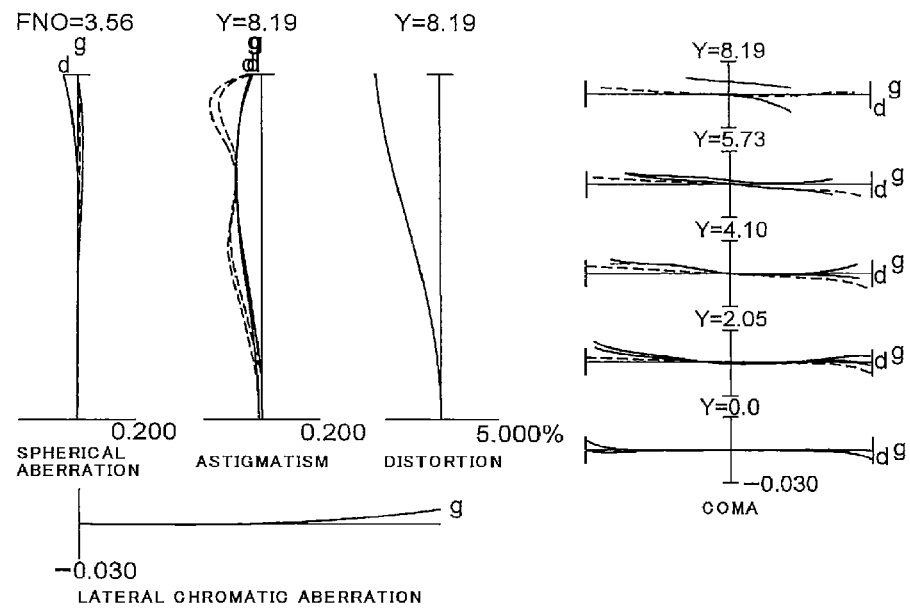
FIGS. 26A and 26B are respectively graphs showing various aberrations of the zoom lens according to the ninth Example of the present application in a wide angle state and in a telephoto end state, upon focusing on an infinitely distant object.
Figure 26B:
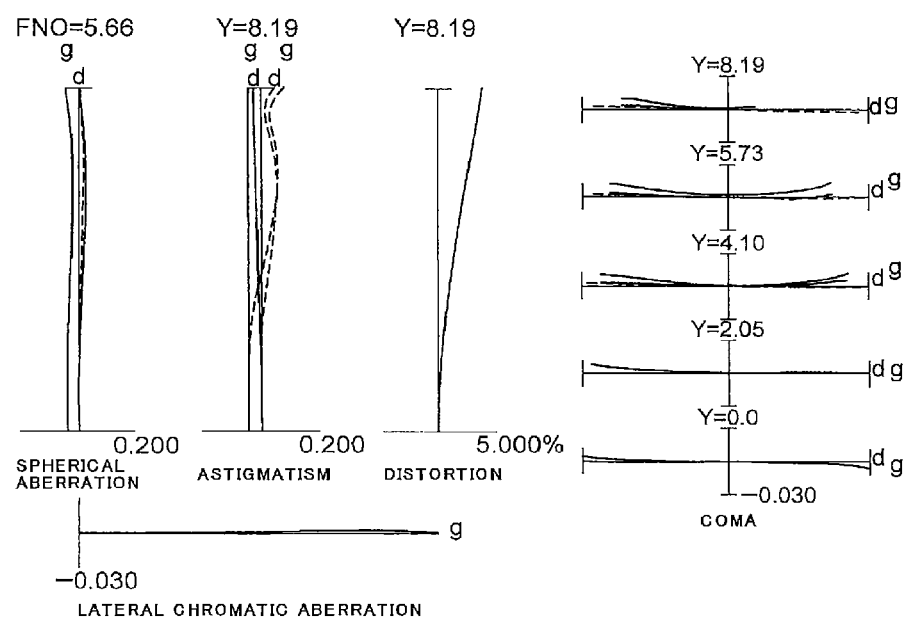

FIGS. 26A and 26B are graphs showing various aberrations upon focusing on an infinitely distant object in the wide-angle end state and in the telephoto end state of the zoom lens according to the ninth example of the present application.

Figure 27A:
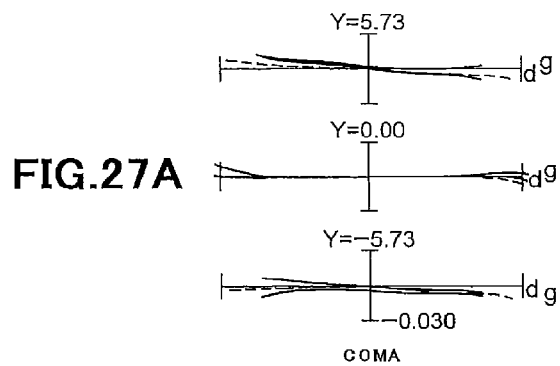
FIGS. 27A and 27B are respectively graphs showing coma aberration upon conducting vibration reduction of the zoom lens according to the ninth Example of the present application in a wide angle end state and in a telephoto end state, upon focusing on an infinitely distant object.
Figure 27B:
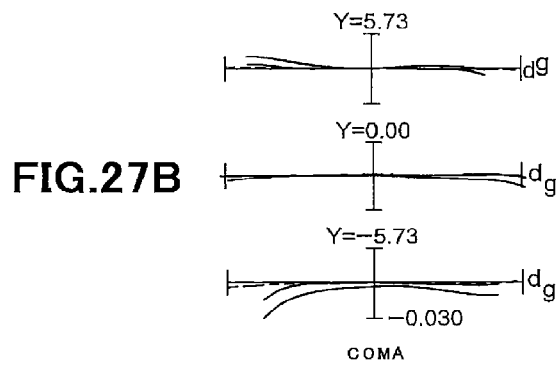

FIGS. 27A and 27B are respectively graphs showing coma aberrations at the time when vibration reduction is carried out against rotational camera shake of 0.624° upon focusing on the infinitely distant object in the wide-angle end state and against rotational camera shake of 0.500° upon focusing on the infinitely distant object in the telephoto end state of the zoom lens according to the ninth example of the present application.

As apparent from the respective aberration diagrams, it is understood that the zooming lens system according to the present example corrects well the various aberrations from the wide-angle end state to the telephoto end state throughout, and further exhibits the high optical performances even upon conducting vibration reduction.

According to the said first to ninth examples, it is possible to realize a zoom lens which is short in the entire length, downsized and light in weight, which can correct superbly chromatic aberration at both times when vibration reduction is conducted and no vibration reduction is conducted, and which has excellent optical performances.

Hereinafter, a zoom lens according to numerical examples of the third embodiment of the present application will be explained with reference to the accompanying drawings.

Tenth Example

Figure 28A:
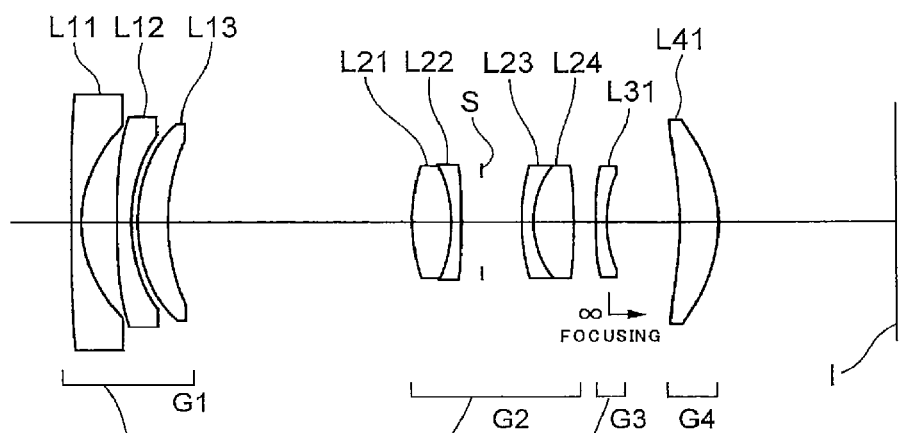
FIGS. 28A and 28B are respectively sectional views showing a zoom lens in a wide angle end state and in a telephoto end state, according to a tenth Example of a third embodiment of the present application.
Figure 28B:
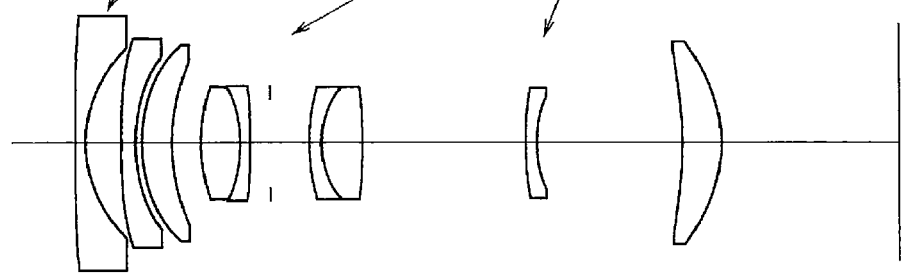

FIGS. 28A and 28B are respectively sectional views showing a zoom lens in a wide angle end state and in a telephoto end state, according to a tenth example of the third embodiment of the present application.

The zoom lens according to the present example is composed of, in order from an object side, a first lens group G1 having negative refractive power, a second lens group G2 having positive refractive power, a third lens group G3 having negative refractive power and a fourth lens group G4 having positive refractive power.

The first lens group G1 consists of, in order from the object side, a negative meniscus lens L11 having a convex surface facing the object side, a negative meniscus lens L12 having a convex surface facing the object side, and a positive meniscus lens L13 having a convex surface facing the object side. The negative meniscus lens L12 is a glass mold type aspherical lens whose object side and image side lens surfaces are aspherically shaped.

The second lens group G2 consists of, in order from the object side, a cemented lens constructed by a positive lens L21 having a double convex shape cemented with a negative meniscus lens L22 having a concave surface facing the object side, an aperture stop S and a cemented lens constructed by a negative meniscus lens L23 having a convex surface facing the object side cemented with a positive lens L24 having a double convex shape. The positive lens L21 is a glass mold type aspherical lens whose object side lens surface is aspherically shaped.

The third lens group G3 consists of a negative meniscus lens L31 having a convex surface facing the object side. The negative meniscus lens L31 is a glass mold type aspherical lens whose object side lens surface and image side lens surface are aspherically shaped.

The fourth lens group G4 consists of a positive meniscus lens L41 having a convex surface facing the image side. The positive meniscus lens L41 is a glass mold type aspherical lens whose object side lens surface and image side lens surface are aspherically shaped.

In the zoom lens of the present example being constructed as above, upon varying magnification from a wide-angle end state to a telephoto end state, the first lens group G1 is moved along the optical axis and the second lens group G2 and the third lens group G3 are moved along the optical axis toward the object side, such that an air distance between the first lens group G1 and the second lens group G2 is decreased, an air distance between the second lens group G2 and the third lens group G3 is increased, and an air distance between the third lens group G3 and the fourth lens group G4 is increased.

Incidentally, the position of the fourth lens group G4 is fixed upon varying magnification.

In the zoom lens of the present example, focusing from an infinite distance object to a close distance object is carried out by moving the third lens group G3 along the optical axis toward the image side.

Table 10 below shows various values associated with the zoom lens according to the present example.

TABLE 10

Tenth Example

[Surface Data]

| m | r | d | nd | νd |
|---|---|---|---|---|
| OP | ∞ | | | |
| 1 | 234.198 | 0.800 | 1.618 | 63.3 |
| 2 | 10.139 | 2.598 | | |
| *3 | 104.171 | 1.000 | 1.623 | 58.2 |
| *4 | 13.875 | 0.489 | | |
| 5 | 11.360 | 2.222 | 2.001 | 25.5 |
| 6 | 16.191 | Variable | | |
| *7 | 16.228 | 2.724 | 1.619 | 63.9 |
| 8 | −10.495 | 0.800 | 1.603 | 38.0 |
| 9 | −35.530 | 1.500 | | |
| 10 (S) | ∞ | 2.919 | | |
| 11 | 17.997 | 0.800 | 1.583 | 46.5 |
| 12 | 6.891 | 3.028 | 1.498 | 82.6 |
| 13 | −30.452 | Variable | | |
| *14 | 70.323 | 0.800 | 1.619 | 63.9 |
| *15 | 11.725 | Variable | | |
| *16 | −23.210 | 2.893 | 1.517 | 63.9 |
| *17 | −10.545 | BF | | |
| I | ∞ | | | |

[Aspherical Surface Data]

| m | κ | A4 | A6 | A8 | A10 |
|---|---|---|---|---|---|
| 3 | 1.000E+00 | 5.896E−05 | 2.075E−06 | −1.269E−08 | 0.000E+00 |
| 4 | 1.000E+00 | 4.789E−05 | 1.866E−06 | 8.533E−09 | −2.754E−10 |
| 7 | 1.000E+00 | −6.693E−05 | −2.872E−07 | −1.175E−08 | 1.194E−09 |
| 14 | 1.000E+00 | 7.428E−04 | −3.644E−05 | 1.001E−06 | −1.552E−08 |
| 15 | 1.000E+00 | 1.000E−03 | −3.068E−05 | 4.236E−07 | 0.000E+00 |
| 16 | 1.000E+00 | 7.202E−05 | 4.723E−06 | −7.472E−08 | 3.145E−10 |
| 17 | 1.000E+00 | 9.722E−05 | 3.060E−06 | −1.991E−08 | −3.234E−11 |

[Various Data]
Variable magnification ratio 2.83

| | W | T |
|---|---|---|
| f | 10.3 | 29.1 |
| FNO | 3.6 | 5.7 |
| 2ω | 75.7° | 30.7° |
| Y | 8.19 | 8.19 |
| TL | 63.1 | 59.9 |

| | W | M | T |
|---|---|---|---|
| (Upon focusing on an infinitely distant Object) | | | |
| f | 10.30 | 18.53 | 29.10 |
| d6 | 17.92 | 7.24 | 2.29 |
| d13 | 1.60 | 6.29 | 11.95 |
| d15 | 5.21 | 7.80 | 10.64 |
| BF | 13.30 | 13.30 | 13.30 |
| (Upon focusing on a close distance Object) | | | |
| D | 200.00 | 200.00 | 200.00 |
| d6 | 17.92 | 7.24 | 2.29 |

TABLE 10-continued

| | | | |
|---|---|---|---|
| d13 | 2.07 | 7.72 | 15.32 |
| d15 | 4.74 | 6.37 | 7.26 |
| BF | 13.30 | 13.30 | 13.30 |

[Lens Group Data]

| | ST | f |
|---|---|---|
| G1 | 1 | −14.25 |
| G2 | 7 | 13.72 |
| G3 | 14 | −22.72 |
| G4 | 16 | 30.57 |

[Values for Conditional Expressions]

m3 = 5.43
fst = 3.38
(3-1) m3/fw = 0.53
(3-2) (r42 + r41)/(r42 − r41) = −2.67
(3-3) fst/m3 = 0.62
(3-4) (−f3)/fw = 2.21

Figure 29A:
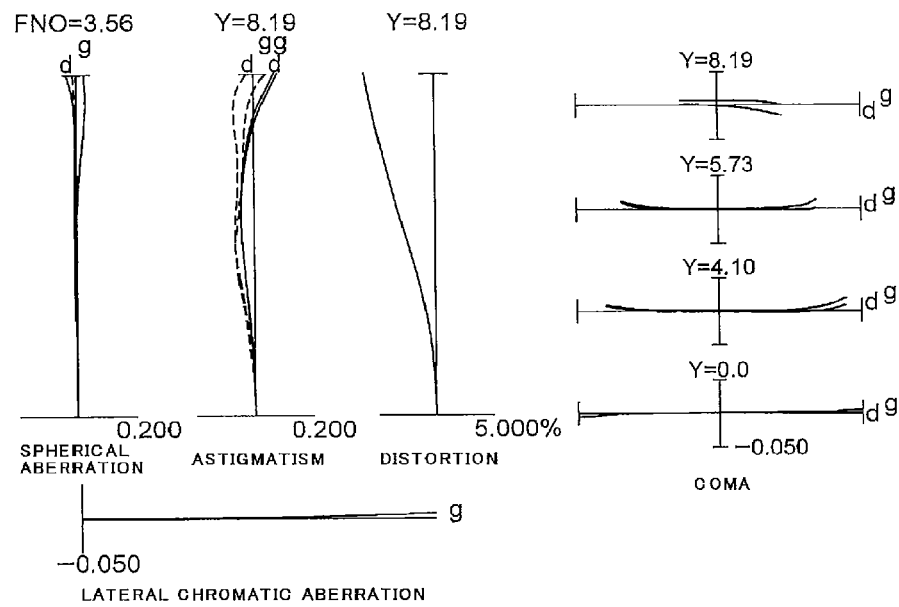
FIGS. 29A and 29B are respectively graphs showing various aberrations of the zoom lens according to the tenth Example of the present application in a wide angle state and in a telephoto end state, upon focusing on an infinitely distant object.
Figure 29B:
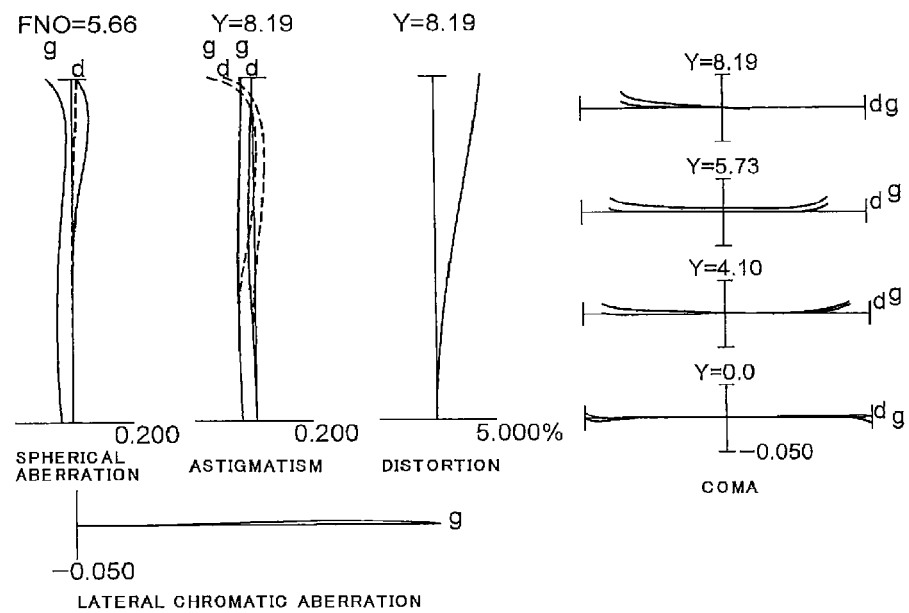

FIGS. 29A and 29B are graphs showing various aberrations upon focusing on an infinitely distant object in the wide-angle end state and in the telephoto end state of the zoom lens according to the tenth example of the present application.

As apparent from the respective aberration diagrams, it is understood that the zooming lens system according to the present example corrects well the various aberrations from the wide-angle end state to the telephoto end state throughout, and further exhibits the high optical performances.

Eleventh Example

Figure 30A:
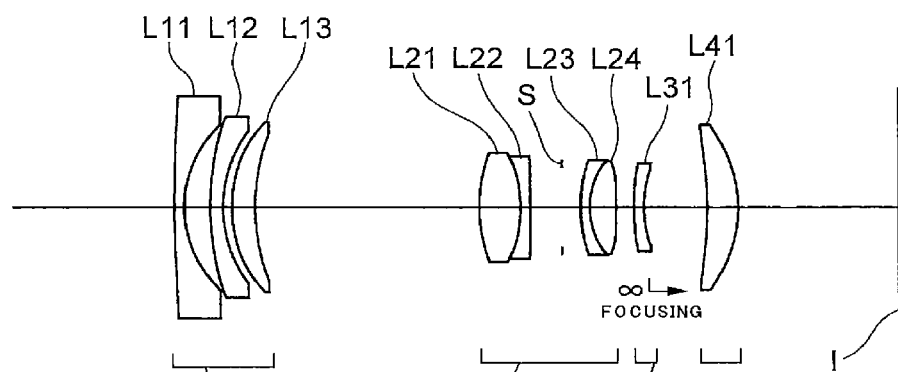
FIGS. 30A and 30B are respectively sectional views showing a zoom lens in a wide angle end state and in a telephoto end state, according to an eleventh Example of the third embodiment of the present application.
Figure 30B:
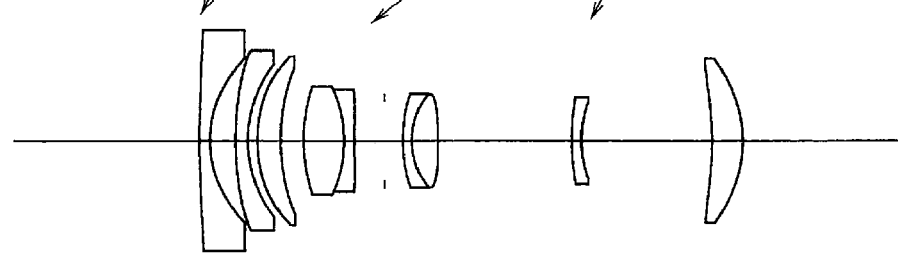

FIGS. 30A and 30B are respectively sectional views showing a zoom lens in a wide angle end state and in a telephoto end state according to an 11-th example of the third embodiment of the present application.

The zoom lens according to the present example is composed of, in order from an object side, a first lens group G1 having negative refractive power, a second lens group G2 having positive refractive power, a third lens group G3 having negative refractive power and a fourth lens group G4 having positive refractive power.

The first lens group G1 consists of, in order from the object side, a negative meniscus lens L11 having a convex surface facing the object side, a negative meniscus lens L12 having a convex surface facing the object side, and a positive meniscus lens L13 having a convex surface facing the object side. The negative meniscus lens L12 is a glass mold type aspherical lens whose object side and image side lens surfaces are aspherically shaped.

The second lens group G2 consists of, in order from the object side, a cemented lens constructed by a positive lens L21 having a double convex shape cemented with a negative meniscus lens L22 having a concave surface facing the object side, an aperture stop S and a cemented lens constructed by a negative meniscus lens L23 having a convex surface facing the object side cemented with a positive lens L24 having a double convex shape. The positive lens L21 is a glass mold type aspherical lens whose object side lens surface is aspherically shaped.

The third lens group G3 consists of a negative meniscus lens L31 having a convex surface facing the object side. The negative meniscus lens L31 is a glass mold type aspherical lens whose object side lens surface and image side lens surface are aspherically shaped.

The fourth lens group G4 consists of a positive meniscus lens L41 having a convex surface facing the image side. The positive meniscus lens L41 is a glass mold type aspherical lens whose object side lens surface and image side lens surface are aspherically shaped.

In the zoom lens of the present example being constructed as above, upon varying magnification from a wide-angle end state to a telephoto end state, the first lens group G1 is moved along the optical axis and the second lens group G2 and the third lens group G3 are moved along the optical axis toward the object side, such that an air distance between the first lens group G1 and the second lens group G2 is decreased, an air distance between the second lens group G2 and the third lens group G3 is increased, and an air distance between the third lens group G3 and the fourth lens group G4 is increased.

Incidentally, the position of the fourth lens group G4 is fixed upon varying magnification.

In the zoom lens of the present example, focusing from an infinite distance object to a close distance object is carried out by moving the third lens group G3 along the optical axis toward the image side.

Table 11 below shows various values associated with the zoom lens according to the present example.

TABLE 11

| Eleventh Example |
|---|

[Surface Data]

| m | r | d | nd | νd |
|---|---|---|---|---|
| OP | ∞ | | | |
| 1 | 131.926 | 0.800 | 1.618 | 63.3 |
| 2 | 9.887 | 2.207 | | |
| *3 | 22.899 | 1.000 | 1.623 | 58.2 |
| *4 | 9.089 | 0.862 | | |
| 5 | 11.594 | 1.892 | 2.001 | 25.5 |
| 6 | 17.515 | Variable | | |
| *7 | 15.735 | 3.218 | 1.619 | 63.9 |
| 8 | −10.904 | 0.800 | 1.603 | 38.0 |
| 9 | −75.326 | 2.678 | | |
| 10 (S) | ∞ | 1.500 | | |
| 11 | 16.112 | 0.800 | 1.583 | 46.5 |
| 12 | 6.544 | 2.114 | 1.498 | 82.6 |
| 13 | −31.376 | Variable | | |
| *14 | 39.745 | 0.800 | 1.619 | 63.9 |
| *15 | 10.560 | Variable | | |
| *16 | −23.030 | 2.584 | 1.517 | 63.9 |
| *17 | −10.518 | BF | | |
| I | ∞ | | | |

[Aspherical Surface Data]

| m | κ | A4 | A6 | A8 | A10 |
|---|---|---|---|---|---|
| 3 | 1.000E+00 | −3.833E−04 | 9.067E−06 | −6.487E−08 | 7.866E−11 |
| 4 | 1.000E+00 | −5.554E−04 | 8.416E−06 | −3.144E−08 | −7.595E−10 |
| 7 | 1.000E+00 | −6.517E−05 | −1.259E−06 | 3.629E−08 | 8.838E−11 |
| 14 | 1.000E+00 | 8.336E−04 | −3.542E−05 | 1.312E−07 | 3.038E−08 |
| 15 | 1.000E+00 | 1.164E−03 | −4.103E−05 | 8.025E−07 | −4.760E−09 |
| 16 | 1.000E+00 | 1.801E−04 | 1.181E−06 | −3.912E−08 | 1.795E−11 |
| 17 | 1.000E+00 | 1.621E−04 | 1.593E−06 | −2.352E−08 | −1.206E−10 |

[Various Data]
Variable magnification ratio 2.88

| | W | T |
|---|---|---|
| f | 10.2 | 29.4 |
| FNO | 3.6 | 6.4 |
| 2ω | 76.2° | 30.4° |
| Y | 8.19 | 8.19 |
| TL | 63.0 | 59.2 |

| | W | M | T |
|---|---|---|---|
| (Upon focusing on an infinitely distant Object) | | | |
| f | 10.20 | 20.00 | 29.40 |
| d6 | 18.51 | 6.32 | 2.14 |
| d13 | 1.57 | 6.56 | 11.21 |
| d15 | 5.36 | 8.74 | 11.31 |
| BF | 13.30 | 13.30 | 13.30 |
| (Upon focusing on a close distance Object) | | | |
| D | 200.00 | 200.00 | 200.00 |
| d6 | 18.51 | 6.32 | 2.14 |
| d13 | 1.98 | 8.15 | 14.40 |
| d15 | 4.95 | 7.16 | 8.12 |
| BF | 13.30 | 13.30 | 13.30 |

[Lens Group Data]

| | ST | f |
|---|---|---|
| G1 | 1 | −14.43 |
| G2 | 7 | 13.57 |
| G3 | 14 | −23.49 |
| G4 | 16 | 35.00 |

[Values for Conditional Expressions]

m3 = 5.95
fst = 3.19
(3-1) m3/fw = 0.58

TABLE 11-continued

Eleventh Example (3-2) (r42 + r41)/(r42 − r41) = −2.68
(3-3) fst/m3 = 0.54
(3-4) (−f3)/fw = 2.30

Figure 31A:
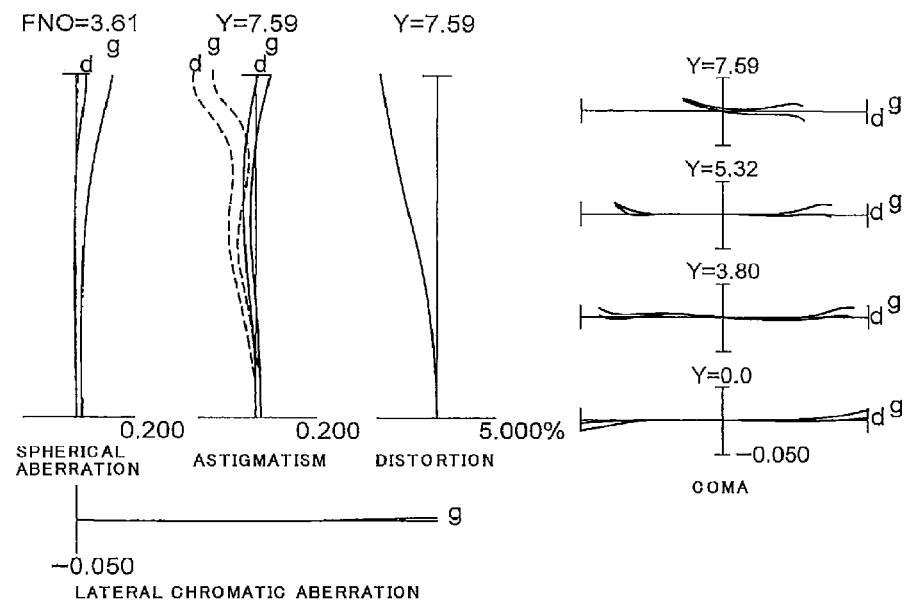
FIGS. 31A and 31B are respectively graphs showing various aberrations of the zoom lens according to the eleventh Example of the present application in a wide angle state, and in a telephoto end state, upon focusing on an infinitely distance object.
Figure 31B:
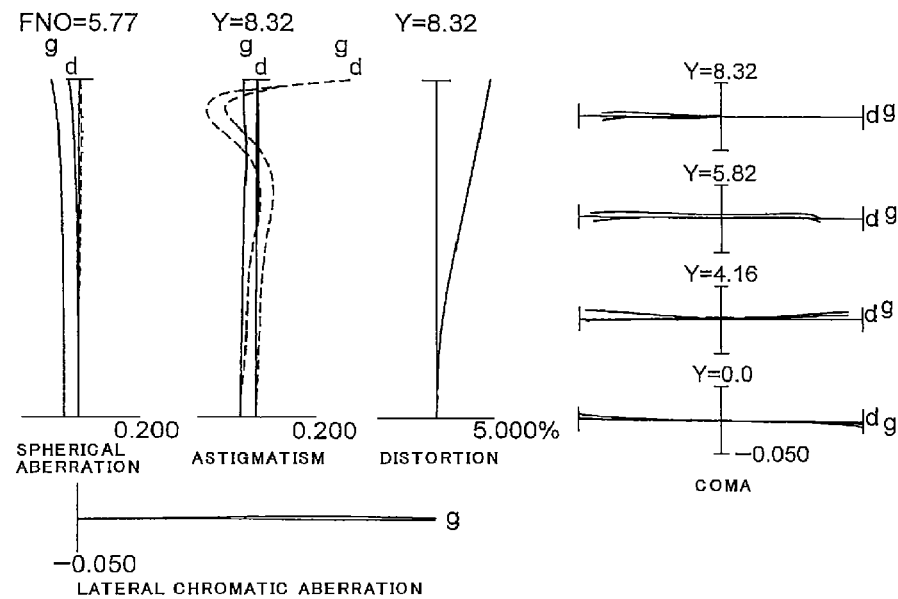

FIGS. 31A and 31B are graphs showing various aberrations upon focusing on an infinitely distant object in the wide-angle end state and in the telephoto end state of the zoom lens according to the 11-th example of the present application.

As apparent from the respective aberration diagrams, it is understood that the zooming lens system according to the present example corrects well the various aberrations from the wide-angle end state to the telephoto end state throughout, and further exhibits the high optical performances.

Twelfth Example

Figure 32A:
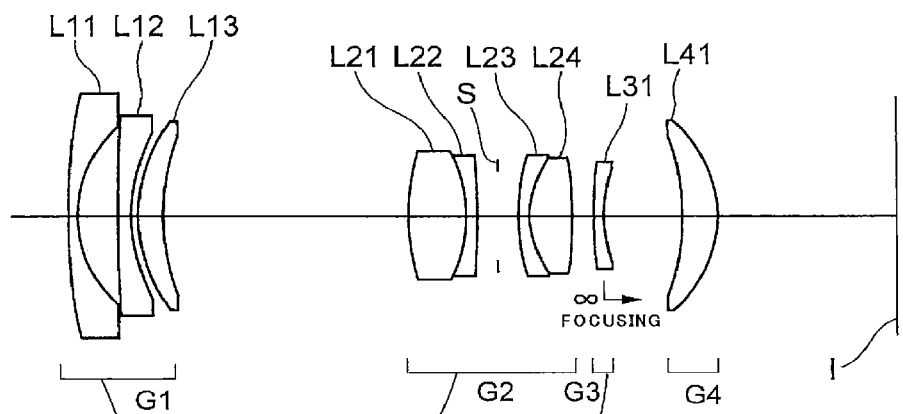
FIGS. 32A and 32B are respectively sectional views showing a zoom lens in a wide angle end state and a telephoto end state, according to a twelfth Example of the third embodiment of the present application.
Figure 32B:
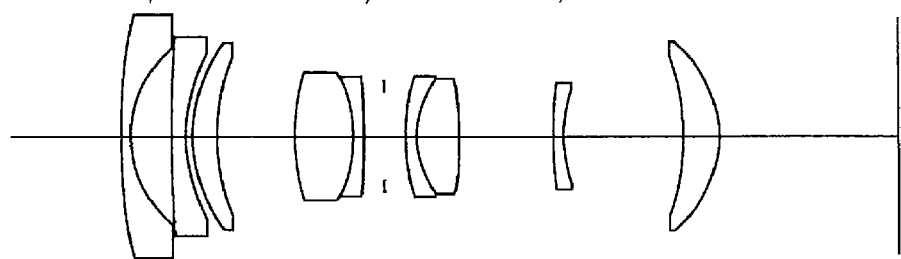

FIGS. 32A and 32B are respectively sectional views showing a zoom optical system in a wide angle end state and in a telephoto end state according to a 12-th example of the third embodiment of the present application.

The zoom lens according to the present example is composed of, in order from an object side, a first lens group G1 having negative refractive power, a second lens group G2 having positive refractive power, a third lens group G3 having negative refractive power and a fourth lens group G4 having positive refractive power.

The first lens group G1 consists of, in order from the object side, a negative meniscus lens L11 having a convex surface facing the object side, a negative meniscus lens L12 having a convex surface facing the object side, and a positive meniscus lens L13 having a convex surface facing the object side. The negative meniscus lens L12 is a glass mold type aspherical lens whose object side and image side lens surfaces are aspherically shaped.

The second lens group G2 consists of, in order from the object side, a cemented lens constructed by a positive lens L21 having a double convex shape cemented with a negative meniscus lens L22 having a concave surface facing the object side, an aperture stop S and a cemented lens constructed by a negative meniscus lens L23 having a convex surface facing the object side cemented with a positive lens L24 having a double convex shape. The positive lens L21 is a glass mold type aspherical lens whose object side lens surface is aspherically shaped.

The third lens group G3 consists of a negative meniscus lens L31 having a convex surface facing the object side. The negative meniscus lens L31 is a glass mold type aspherical lens whose object side lens surface and image side lens surface are spherically shaped.

The fourth lens group G4 consists of a positive meniscus lens L41 having a convex surface facing the image side. The positive meniscus lens L41 is a glass mold type aspherical lens whose object side lens surface and image side lens surface are spherically shaped.

In the zoom lens of the present example being constructed as above, upon varying magnification from a wide-angle end state to a telephoto end state, the first lens group G1 is moved along the optical axis and the second lens group G2 and the third lens group G3 are moved along the optical axis toward the object side, such that an air distance between the first lens group G1 and the second lens group G2 is decreased, an air distance between the second lens group G2 and the third lens group G3 is increased, and an air distance between the third lens group G3 and the fourth lens group G4 is increased. Incidentally, the position of the fourth lens group G4 is fixed upon varying magnification.

In the zoom lens of the present example, focusing from an infinite distance object to a close distance object is carried out by moving the third lens group G3 along the optical axis toward the image side.

Table 12 below shows various values associated with the zoom lens according to the present example.

TABLE 12

12-th Example

[Surface Data]

| m | r | d | nd | vd |
|---|---|---|---|---|
| OP | ∞ | | | |
| 1 | 46.250 | 0.800 | 1.618 | 63.3 |
| 2 | 9.071 | 2.923 | | |
| *3 | 65.166 | 1.000 | 1.619 | 63.7 |
| *4 | 11.707 | 0.576 | | |
| 5 | 12.414 | 1.756 | 2.001 | 25.5 |
| 6 | 19.421 | Variable | | |
| *7 | 16.791 | 4.129 | 1.619 | 63.9 |
| 8 | −10.239 | 0.800 | 1.603 | 38.0 |
| 9 | −51.266 | 1.500 | | |
| 10 (S) | ∞ | 1.500 | | |

TABLE 12-continued

12-th Example

| | | | | |
|---|---|---|---|---|
| 11 | 18.401 | 0.800 | 1.583 | 46.5 |
| 12 | 6.931 | 3.163 | 1.498 | 82.6 |
| 13 | −27.503 | | | |
| *14 | 94.732 | 0.800 | 1.619 | 63.9 |
| *15 | 13.489 | Variable | | |
| *16 | −15.587 | 2.523 | 1.517 | 63.9 |
| *17 | −8.834 | BF | | |
| I | ∞ | | | |

[Aspherical Surface Data]

| m | κ | A4 | A6 | A8 | A10 |
|---|---|---|---|---|---|
| 3 | 1.000E+00 | −3.493E−04 | 9.551E−06 | −9.426E−08 | 3.168E−10 |
| 4 | 1.000E+00 | −4.421E−04 | 1.007E−05 | −8.974E−08 | 2.250E−11 |
| 7 | 1.000E+00 | −7.028E−05 | −8.151E−07 | 3.411E−08 | −4.721E−10 |
| 14 | 1.000E+00 | 1.115E−03 | −3.903E−05 | 6.896E−08 | 2.986E−08 |
| 15 | 1.000E+00 | 1.425E−03 | −3.788E−05 | 5.432E−08 | 2.514E−08 |
| 16 | 1.000E+00 | 1.441E−04 | 5.894E−07 | −2.786E−10 | −1.123E−09 |
| 17 | 1.000E+00 | 2.175E−04 | 2.668E−07 | 4.907E−08 | −1.168E−09 |

[Various Data]
Variable magnification ratio 2.88

| | W | T |
|---|---|---|
| f | 10.2 | 29.4 |
| FNO | 3.6 | 5.8 |
| 2ω | 76.2° | 30.4° |
| Y | 8.19 | 8.19 |
| TL | 63.1 | 59.3 |

| | W | M | T |
|---|---|---|---|
| (Upon focusing on an infinitely distant Object) | | | |
| f | 10.20 | 20.00 | 29.40 |
| d6 | 17.52 | 5.71 | 1.70 |
| d13 | 1.57 | 6.75 | 11.51 |
| d15 | 5.66 | 8.89 | 11.52 |
| BF | 13.04 | 13.04 | 13.04 |
| (Upon focusing on a close distance Object) | | | |
| D | 200.00 | 200.00 | 200.00 |
| d6 | 17.52 | 5.71 | 1.70 |
| d13 | 2.05 | 8.52 | 15.05 |
| d15 | 5.18 | 7.11 | 7.98 |
| BF | 13.04 | 13.04 | 13.04 |

[Lens Group Data]

| | ST | f |
|---|---|---|
| G1 | 1 | −14.31 |
| G2 | 7 | 13.55 |
| G3 | 14 | −25.51 |
| G4 | 16 | 35.00 |

[Values for Conditional Expressions]

m3 = 5.86
fst = 3.55
(3-1) m3/fw = 0.57
(3-2) (r42 + r41)/(r42 − r41) = −3.62
(3-3) fst/m3 = 0.61
(3-4) (−f3)/fw = 2.50

Figure 33A:
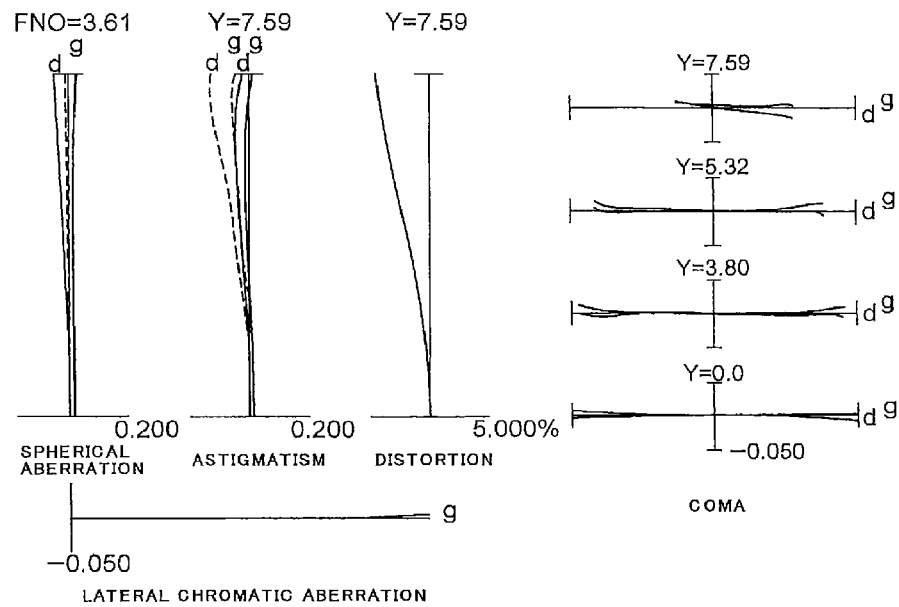
FIGS. 33A and 33B are respectively graphs showing various aberrations of the zoom lens according to the twelfth Example of the present application in a wide angle state and in a telephoto end state, upon focusing on an infinitely distant object.
Figure 33B:
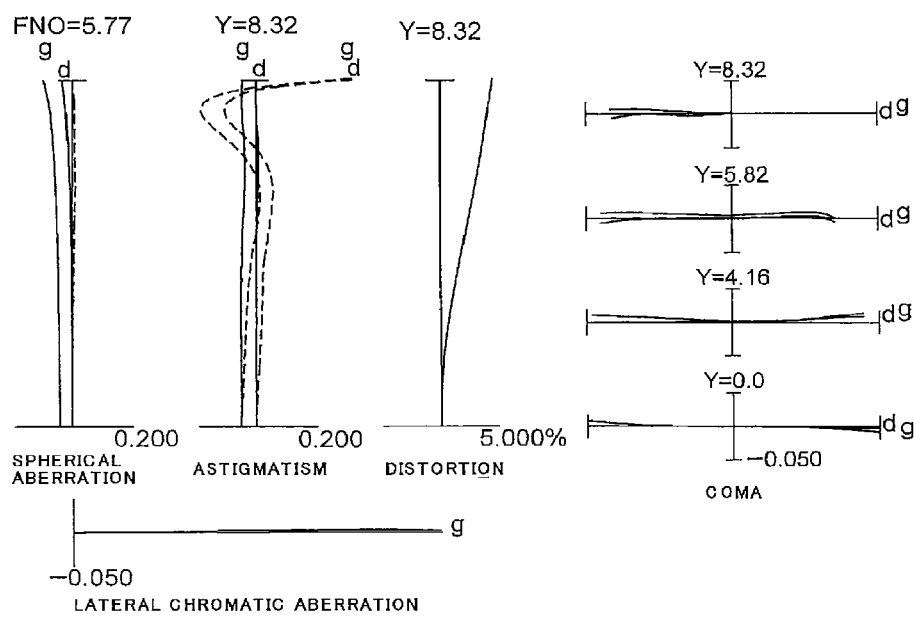

FIGS. 33A and 33B are graphs showing various aberrations upon focusing on an infinitely distant object in the wide-angle end state and in the telephoto end state of the zoom lens according to the 12-th example of the present application.

As apparent from the respective aberration diagrams, it is understood that the zooming lens system according to the present example corrects well the various aberrations from the wide-angle end state to the telephoto end state throughout, and further exhibits the high optical performances.

Thirteenth Example

Figure 34A:
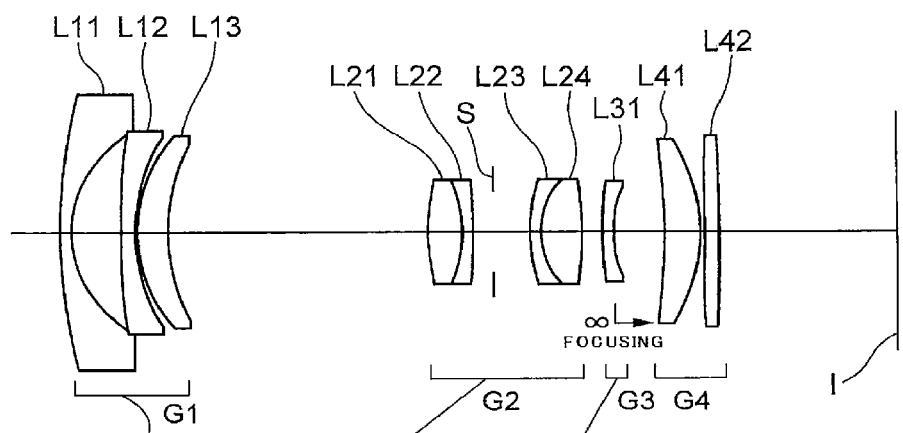
FIGS. 34A and 35B are respectively sectional views showing a zoom lens in a wide angle end state and in a telephoto end state, according to a thirteenth Example of the third embodiment of the present application.
Figure 34B:
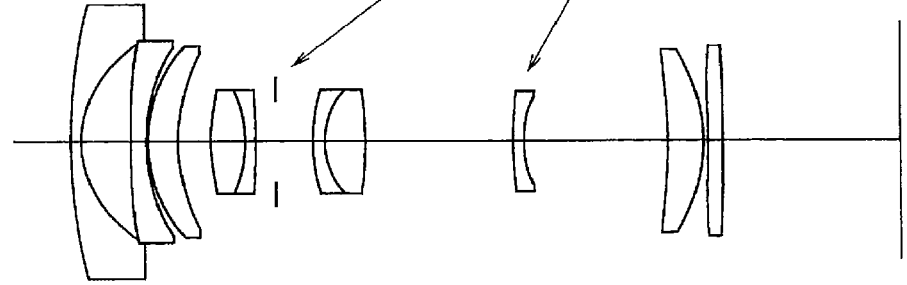

FIGS. 34A and 34B are respectively sectional views showing a zoom lens in a wide angle end state and in a telephoto end state according to an 13-th example of the third embodiment of the present application.

The zoom lens according to the present example is composed of, in order from an object side, a first lens group G1 having negative refractive power, a second lens group G2 having positive refractive power, a third lens group G3 having negative refractive power and a fourth lens group G4 having positive refractive power.

The first lens group G1 consists of, in order from the object side, a negative meniscus lens L11 having a convex surface facing the object side, a negative meniscus lens L12 having a convex surface facing the object side, and a positive meniscus lens L13 having a convex surface facing the object side. The negative meniscus lens L12 is a glass mold type aspherical lens whose object side and image side lens surfaces are aspherically shaped.

The second lens group G2 consists of, in order from the object side, a cemented lens constructed by a positive lens L21 having a double convex shape cemented with a negative meniscus lens L22 having a concave surface facing the object side, an aperture stop S and a cemented lens constructed by a negative meniscus lens L23 having a convex surface facing the object side cemented with a positive lens L24 having a double convex shape. The positive lens L21 is a glass mold type aspherical lens whose object side lens surface is aspherically shaped.

The third lens group G3 consists of a negative meniscus lens L31 having a convex surface facing the object side.

The fourth lens group G4 consists of, in order from the object side, a positive meniscus lens L41 having a convex surface facing the image side and a positive lens L42 having a double convex shape. Incidentally, each of the positive meniscus lens L41 and the positive lens L42 is a glass mold type aspherical lens whose object side lens surface and image side lens surface are aspherically shaped.

In the zoom lens of the present example being constructed as above, upon varying magnification from a wide-angle end state to a telephoto end state, the first lens group G1 is moved along the optical axis and the second lens group G2 and the third lens group G3 are moved along the optical axis toward the object side such that an air distance between the first lens group G1 and the second lens group G2 is decreased, an air distance between the second lens group G2 and the third lens group G3 is increased, and an air distance between the third lens group G3 and the fourth lens group G4 is increased. Incidentally, the position of the fourth lens group G4 is fixed upon varying magnification.

In the zoom lens of the present example, focusing from an infinite distance object to a close distance object is carried out by moving the third lens group G3 along the optical axis toward the image side.

Table 13 below shows various values associated with the zoom lens according to the present example.

TABLE 13

13-th Example

[Surface Data]

| m | r | d | nd | vd |
|---|---|---|---|---|
| OP | ∞ | | | |
| 1 | 49.983 | 0.800 | 1.603 | 65.440 |
| 2 | 9.505 | 3.797 | | |
| *3 | 105.000 | 1.000 | 1.623 | 58.163 |
| *4 | 15.558 | 0.100 | | |
| 5 | 12.387 | 2.300 | 2.001 | 25.455 |
| 6 | 17.350 | Variable | | |
| *7 | 17.524 | 2.569 | 1.623 | 58.163 |
| 8 | −10.281 | 0.800 | 1.603 | 38.028 |
| 9 | −57.158 | 1.500 | | |
| 10 (S) | ∞ | 2.772 | | |
| 11 | 18.079 | 0.800 | 1.583 | 46.422 |
| 12 | 6.987 | 3.000 | 1.498 | 82.570 |
| 13 | −30.422 | Variable | | |
| 14 | 67.175 | 0.800 | 1.623 | 58.163 |
| 15 | 11.200 | Variable | | |
| *16 | −36.612 | 2.616 | 1.583 | 59.460 |
| *17 | −12.977 | 0.300 | | |
| *18 | 1000.000 | 1.115 | 1.583 | 59.460 |
| *19 | −210.703 | BF | | |
| I | ∞ | | | |

[Aspherical Surface Data]

| m | κ | A4 | A6 | A8 | A10 |
|---|---|---|---|---|---|
| 3 | 1.000E+00 | −1.815E−04 | 4.949E−06 | −2.802E−08 | 0.000E+00 |
| 4 | 1.000E+00 | −2.152E−04 | 4.869E−06 | −9.757E−09 | −2.834E−10 |
| 7 | 1.000E+00 | −5.840E−05 | −1.272E−06 | 8.962E−08 | −2.229E−09 |
| 16 | 1.000E+00 | 2.682E−06 | 4.729E−06 | −1.432E−07 | 1.899E−09 |
| 17 | 1.000E+00 | 1.508E−04 | 2.729E−06 | −7.215E−08 | 0.000E+00 |
| 18 | 1.000E+00 | 7.330E−05 | 1.194E−06 | −2.778E−08 | 2.807E−11 |
| 19 | 1.000E+00 | 7.834E−05 | 1.005E−06 | −1.240E−08 | −1.054E−10 |

[Various Data]
Variable magnification ratio 2.83

| | W | T |
|---|---|---|
| f | 10.3 | 29.1 |
| FNO | 3.56 | 5.66 |

TABLE 13-continued

| | 13-th Example | |
|---|---|---|
| 2ω | 77.0° | 31.4° |
| Y | 8.19 | 8.19 |
| TL | 48.90 | 48.29 |

| | W | M | T |
|---|---|---|---|
| (Upon focusing on an infinitely distant Object) | | | |
| f | 10.30 | 20.356 | 29.100 |
| d6 | 19.255 | 6.343 | 2.342 |
| d13 | 1.600 | 6.867 | 10.960 |
| d15 | 3.777 | 7.568 | 10.723 |
| BF | 13.299 | 13.299 | 13.299 |
| (Upon focusing on a close Object) | | | |
| D | 200.000 | 200.000 | 200.000 |
| d6 | 19.255 | 6.343 | 2.342 |
| d13 | 2.102 | 8.572 | 14.245 |
| d15 | 3.275 | 5.863 | 7.438 |
| BF | 13.299 | 13.299 | 13.299 |

[Lens Group Data]

| | ST | f |
|---|---|---|
| G1 | 1 | −15.658 |
| G2 | 7 | 14.031 |
| G3 | 14 | −21.707 |
| G4 | 16 | 29.815 |

[Values for Conditional Expressions]

m3 = 6.95
fst = 3.29
(3-1) m3/fw = 0.67
(3-2) (r42 + r41)/(r42 − r41) = −2.10
(3-3) fst/m3 = 0.47
(3-4) (−f3)/fw = 2.11

Figure 35A:
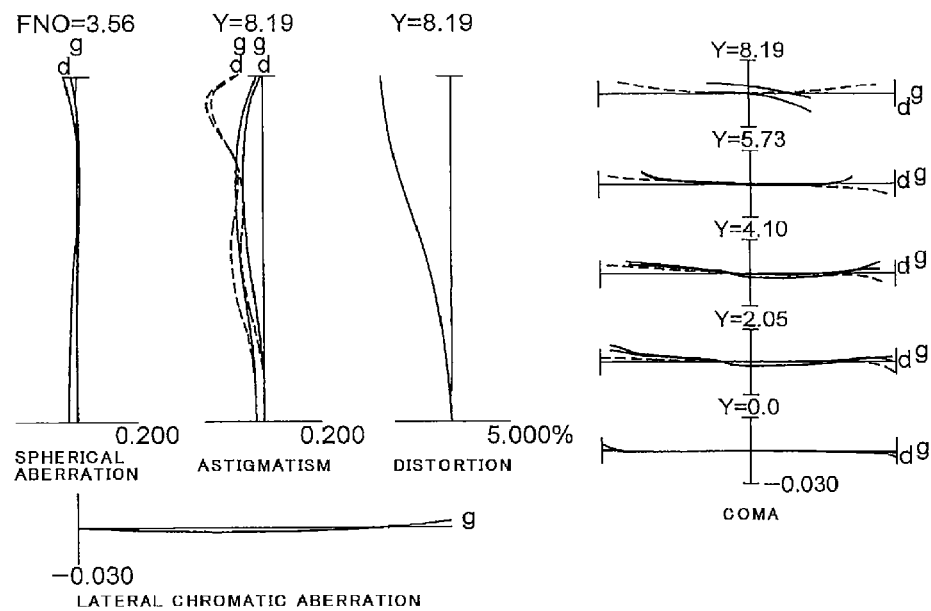
Figure 35B:
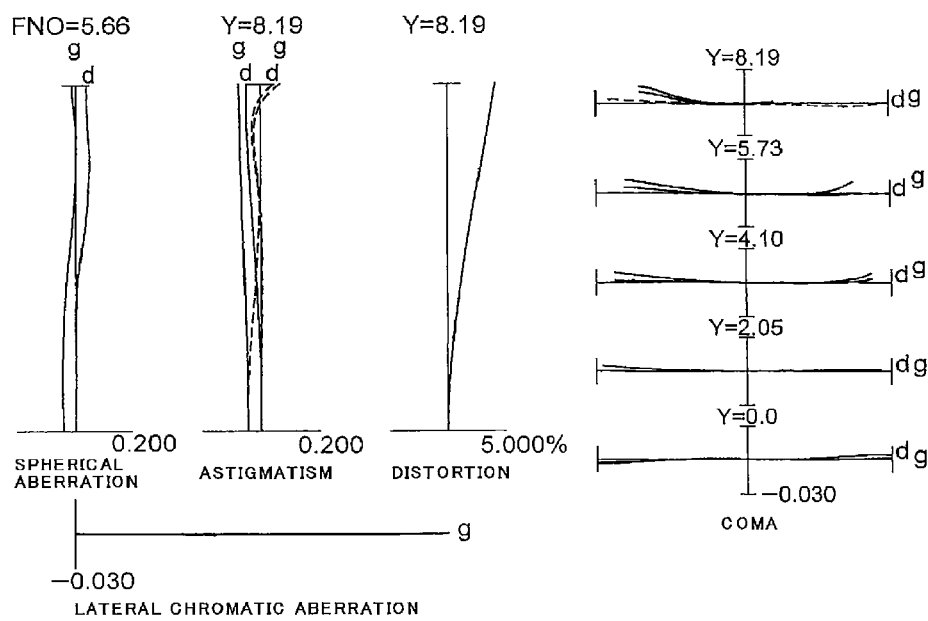

FIGS. 35A and 35B are graphs showing various aberrations upon focusing on an infinitely distant object in the wide-angle end state and in the telephoto end state of the zoom lens according to the 13-th example of the present application.

As apparent from the respective aberration diagrams, it is understood that the zoom lens according to the present example corrects well the various aberrations from the wide-angle end state to the telephoto end state throughout, and further exhibits the high optical performances.

According to the said 10-th to 13-th examples, it is possible to realize a zoom lens which is short in the entire length, downsized and light in weight so that it can be held in a small lens barrel, and which has excellent optical performances.

Hereinafter, a zoom lens according to numerical examples of the fourth embodiment of the present application will be explained with reference to the accompanying drawings.

14-th Example

Figure 36A:
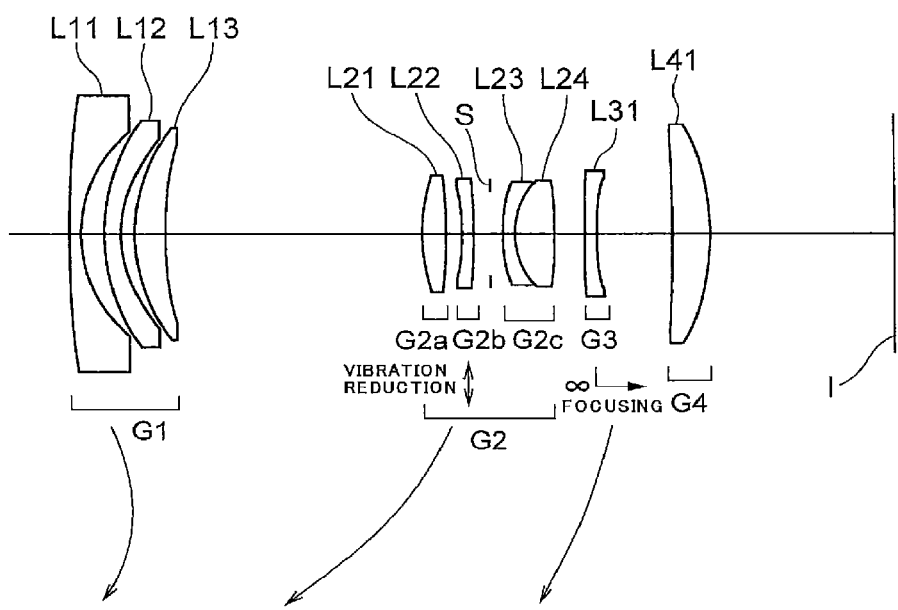
FIGS. 36A and 36B are respectively sectional views showing a zoom lens in a wide angle end state and in a telephoto end state, according to a fourteenth Example of a fourth embodiment of the present application.
Figure 36B:
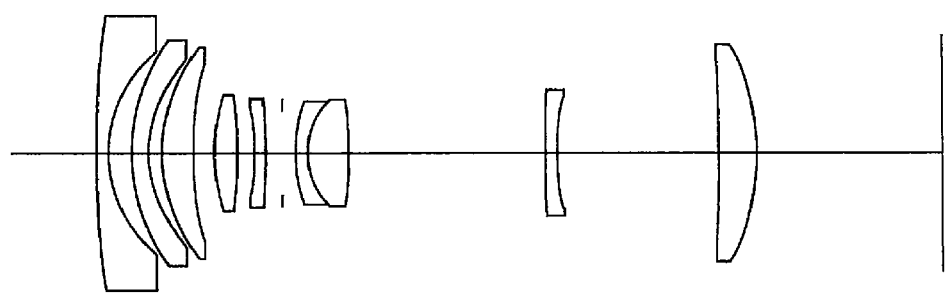

FIGS. 36A and 36B are respectively sectional views showing a zoom lens in a wide angle end state and in a telephoto end state, according to a 14-th example of the fourth embodiment of the present application.

The zoom lens according to the present example is composed of, in order from an object side, a first lens group G1 having negative refractive power, a second lens group G2 having positive refractive power, a third lens group G3 having negative refractive power and a fourth lens group G4 having positive refractive power.

The first lens group G1 consists of, in order from the object side, a negative meniscus lens L11 having a convex surface facing the object side, a negative meniscus lens L12 having a convex surface facing the object side, and a positive meniscus lens L13 having a convex surface facing the object side. An object side lens surface and an image side lens surface of the negative meniscus lens L12 are aspherically shaped.

The second lens group G2 consists of, in order from the object side, a first segment group G2a having positive refractive power, a second segment group G2b having negative refractive power, an aperture stop S and a third segment group G2c having positive refractive power.

The first segment group G2a consists of a positive lens L21 having a double convex shape.

The second segment group G2b consists of a negative meniscus lens L22 having a concave surface facing the object side. An object side lens surface of the negative meniscus lens L22 is aspherical.

The third segment group G2c consists of, in order from the object side, a cemented lens constructed by a negative meniscus lens L23 having a convex surface facing the object side cemented with a positive lens L24 having a double convex shape.

The third lens group G3 consists of a negative meniscus lens L31 having a convex surface facing the object side. An object side lens surface and an image side lens surface of the negative meniscus lens L31 are aspherical.

The fourth lens group G4 consists of a positive meniscus lens L41 having a convex surface facing the image side. An image side lens surface of the positive meniscus lens L41 is aspherical.

In the zoom lens of the present example being constructed as above, upon varying magnification from a wide-angle end state to a telephoto end state, the first lens group G1 is moved along the optical axis and the second lens group G2 and the third lens group G3 are moved along the optical axis toward the object side, such that an air distance between the first lens group G1 and the second lens group G2 is decreased, an air distance between the second lens group G2 and the third lens group G3 is increased, and an air distance between the third lens group G3 and the fourth lens group G4 is increased. Incidentally, the position of the fourth lens group G4 is fixed upon varying magnification. The first segment group G2a, the second segment group G2b, the aperture stop S and the third segment group G2c in the second lens group G2 are moved in a body upon varying magnification.

In the zoom lens of the present example, focusing from an infinite distance object to a close distance object is carried out by moving the third lens group G3 along the optical axis toward the image side.

In the zoom lens of the present example, vibration reduction is carried out by moving the second segment group G2b in the second lens group G2 as a movable group to have a component in a direction perpendicular to the optical axis.

Table 14 below shows various values associated with the zoom lens according to the present example.

TABLE 14

14-th Example

[Surface Data]

| m | r | d | nd | vd |
|---|---|---|---|---|
| OP | ∞ | | | |
| 1 | 78.892 | 0.80 | 1.7450 | 52.4 |
| 2 | 10.034 | 1.71 | | |
| *3 | 17.452 | 1.00 | 1.8512 | 40.0 |
| *4 | 9.307 | 0.98 | | |
| 5 | 12.455 | 2.27 | 2.0007 | 25.5 |
| 6 | 26.745 | Variable | | |
| 7 | 15.912 | 1.59 | 1.6380 | 61.0 |
| 8 | −36.986 | 1.13 | | |
| *9 | −14.015 | 0.80 | 1.4978 | 82.6 |
| 10 | −36.732 | 1.15 | | |
| 11 (S) | ∞ | 0.90 | | |
| 12 | 13.073 | 0.80 | 1.6133 | 35.8 |
| 13 | 5.489 | 2.81 | 1.4978 | 82.6 |
| 14 | −33.124 | Variable | | |
| *15 | −32.118 | 0.80 | 1.5452 | 63.7 |
| *16 | 43.926 | Variable | | |
| 17 | −77.198 | 2.73 | 1.6263 | 60.3 |
| *18 | −16.492 | BF | | |
| I | ∞ | | | |

[Aspherical Surface Data]

| m | κ | A4 | A6 | A8 | A10 |
|---|---|---|---|---|---|
| 3 | 0.000E+00 | 1.232E−04 | −1.192E−06 | 9.574E−09 | −1.191E−11 |
| 4 | 0.000E+00 | −9.802E−06 | −1.437E−06 | −1.507E−08 | −7.874E−11 |
| 9 | 0.000E+00 | 2.704E−05 | 3.771E−06 | −1.175E−07 | 0.000E+00 |
| 15 | 0.000E+00 | 4.690E−04 | 3.430E−05 | −9.148E−07 | 0.000E+00 |
| 16 | 0.000E+00 | 6.793E−04 | 3.487E−05 | −8.133E−07 | 0.000E+00 |
| 18 | 0.000E+00 | 5.620E−05 | −1.305E−06 | 4.685E−09 | 7.830E−12 |

[Various Data]

| | W | T |
|---|---|---|
| f | 10.20 | 29.40 |
| FNO | 3.6 | 6.35 |
| 2ω | 77.6° | 31.2° |
| Y | 8.20 | 8.20 |
| TL | 58.03 | 58.47 |
| BF | 12.89 | 12.89 |

(Upon focusing on an infinitely distant Object)

| | W | M | T |
|---|---|---|---|
| f | 10.20 | 18.60 | 29.40 |
| d6 | 18.13 | 6.61 | 1.45 |
| d14 | 2.12 | 7.29 | 13.58 |

TABLE 14-continued

| 14-th Example | | | |
|---|---|---|---|
| d16 | 5.41 | 8.01 | 11.16 |
| BF | 12.89 | 12.89 | 12.89 |

[Lens Group Data]

| | ST | f |
|---|---|---|
| G1 | 1 | −16.57 |
| G2 | 7 | 14.62 |
| G3 | 15 | −33.90 |
| G4 | 17 | 32.92 |

[Vibration Reduction Data]

| | W | M | T |
|---|---|---|---|
| f | 10.20 | 18.60 | 29.40 |
| Z | 0.18 | 0.25 | 0.30 |
| θ | 0.5 | 0.5 | 0.5 |
| K | −0.50 | −0.65 | −0.84 |

[Values for Conditional Expressions]

fvr = −46.06
(4-1) |fw/fvr| = 0.22
(4-2) fw/f2 = 0.70
(4-3) |f2/fvr| = 0.32

Figure 37A:
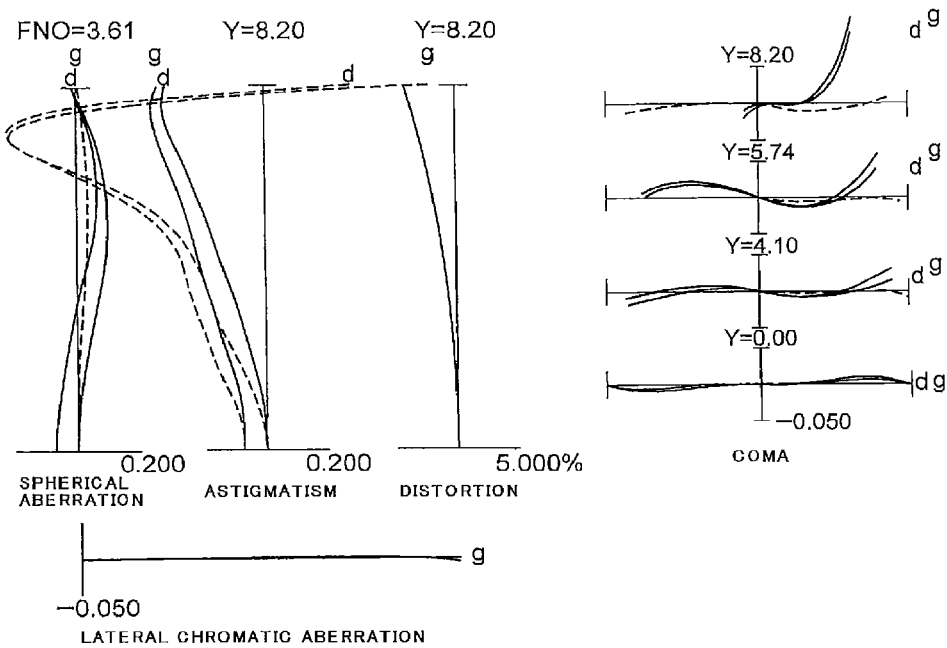
FIGS. 37A and 37B are respectively graphs showing various aberrations of the zoom lens according to the fourteenth Example of the present application in a wide angle state and in a telephoto end state, upon focusing on an infinitely distant object.
Figure 37B:
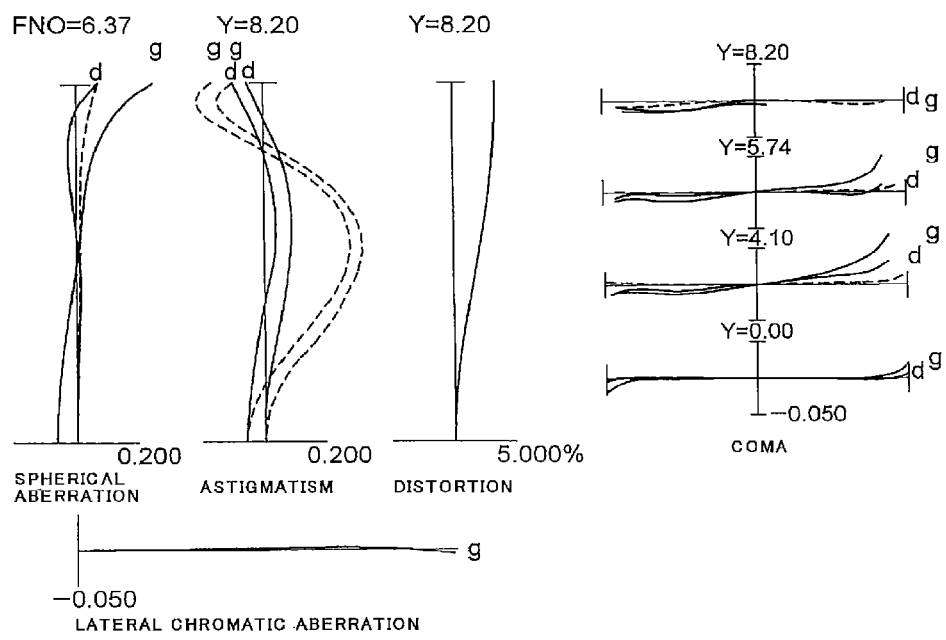

FIGS. 37A and 37B are graphs showing various aberrations upon focusing on an infinitely distant object in the wide-angle end state and in the telephoto end state of the zoom lens according to the 14-th example of the present application.

Figure 38A:
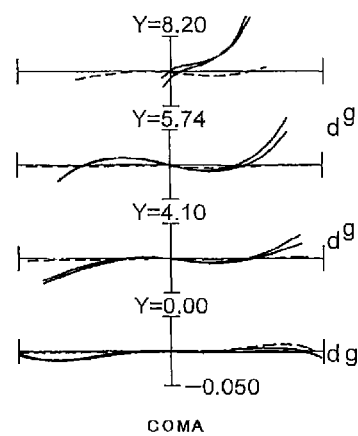
FIGS. 38A and 38B are respectively graphs showing coma aberration upon conducting vibration reduction of the zoom lens system according to the fourteenth Example of the present application in a wide angle end state and in a telephoto end state, upon focusing on an infinitely distant object.
Figure 38B:
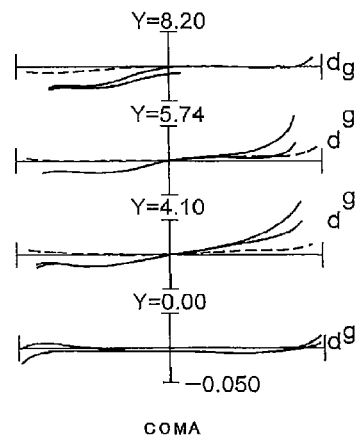

FIGS. 38A and 38B are respectively graphs showing coma aberrations at the time when vibration reduction is carried out against rotational camera shake of 0.5° upon focusing on the infinitely distant object in the wide-angle end state and against rotational camera shake of 0.5° upon focusing on the infinitely distant object in the telephoto end state of the zoom lens according to the 14-th example of the present application.

Figure 39A:
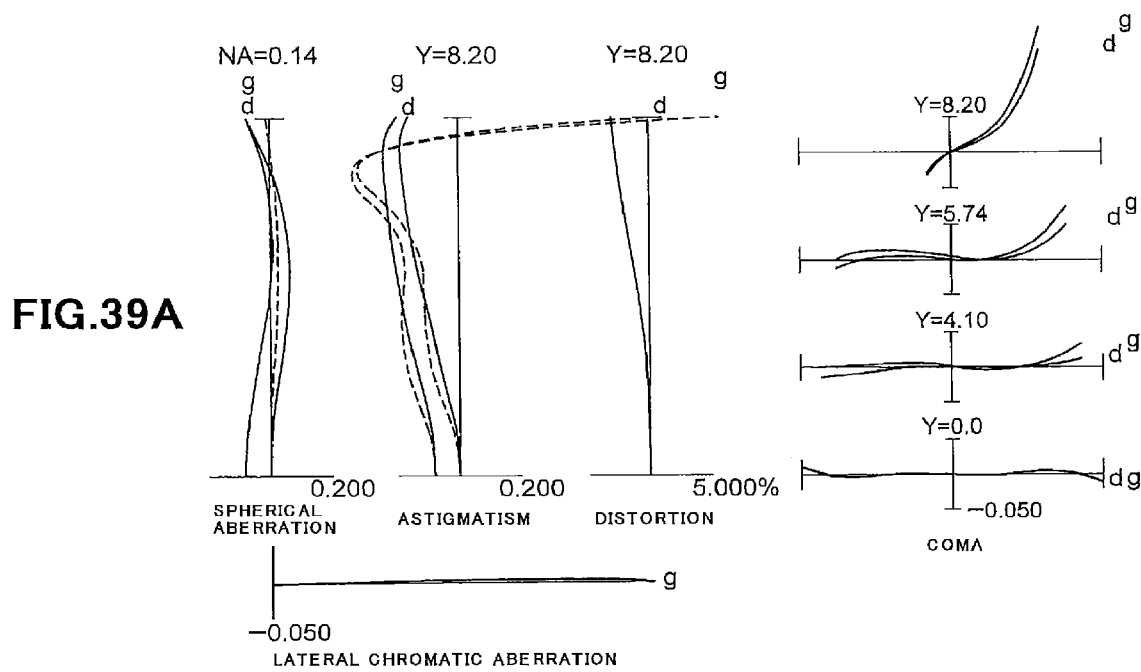
FIGS. 39A and 39B are graphs showing various aberrations of the zoom lens according to the 14-th Example of the present application in a wide angle state and in a telephoto end state, upon focusing on a close distance object.
Figure 39B:
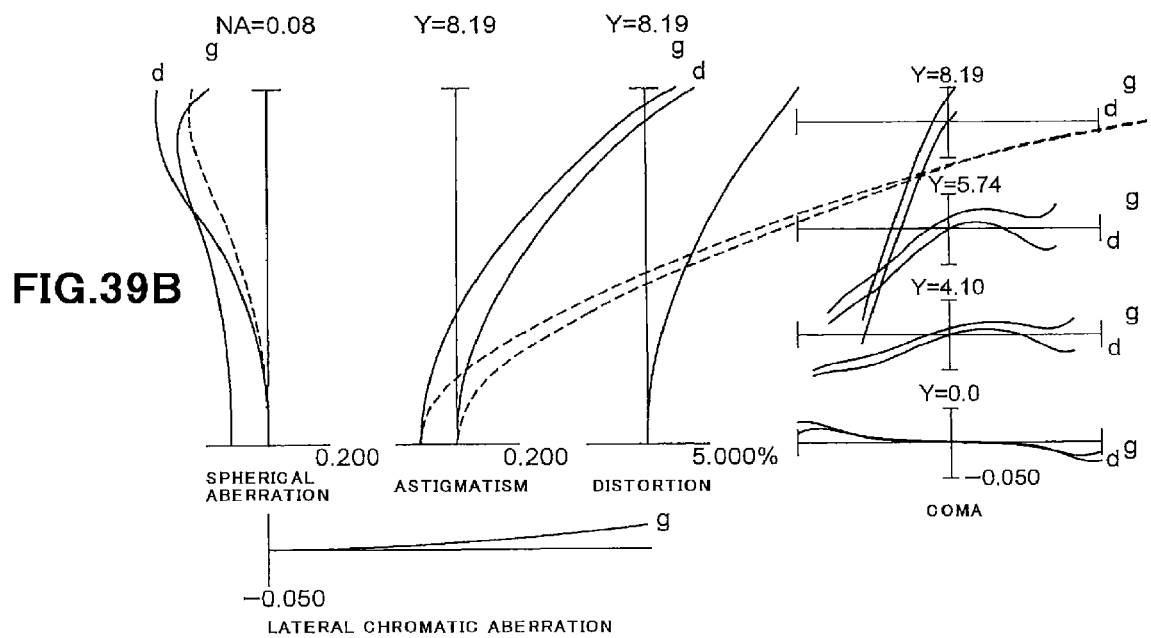

FIGS. 39A and 39B are graphs showing various aberrations upon focusing on a close distance object in the wide-angle end state and in the telephoto end state of the zoom lens according to the 14-th example of the present application.

As apparent from the respective aberration diagrams, it is understood that the zoom lens according to the present example corrects well the various aberrations from the wide-angle end state to the telephoto end state throughout, and further exhibits the high optical performances even when vibration reduction is carried out.

15-th Example

Figure 40A:
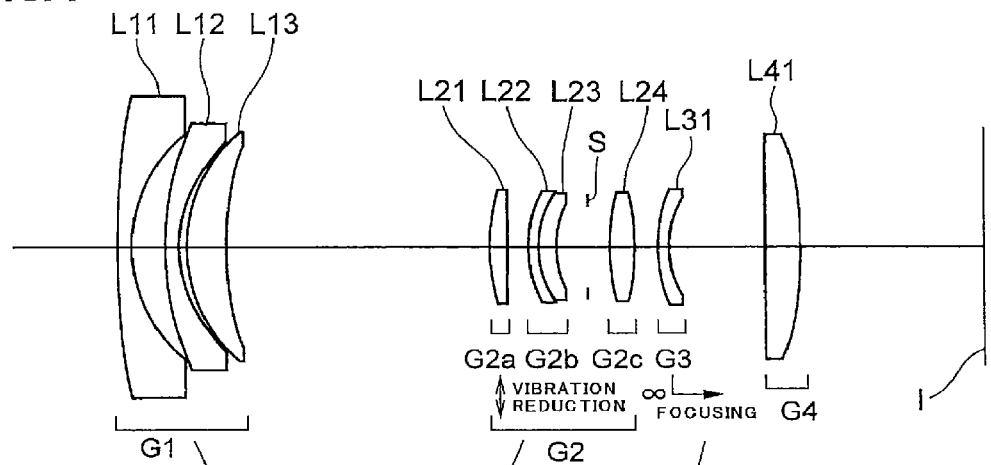
FIGS. 40A and 41B are respectively sectional views showing a zoom lens in a wide angle end state and in a telephoto end state, according to a 15-th Example of the fourth embodiment of the present application.
Figure 40B:
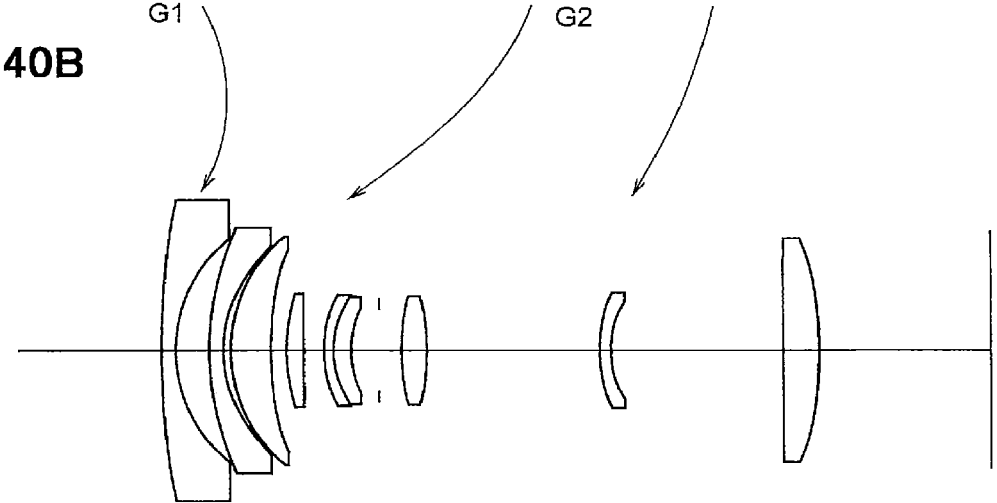

FIGS. 40A and 40B are respectively sectional views showing a zoom optical system in a wide angle end state and in a telephoto end state, according to a 15-th example of the fourth embodiment of the present application.

The zoom lens according to the present example is composed of, in order from an object side, a first lens group G1 having negative refractive power, a second lens group G2 having positive refractive power, a third lens group G3 having negative refractive power and a fourth lens group G4 having positive refractive power.

The first lens group G1 consists of, in order from the object side, a negative meniscus lens L11 having a convex surface facing the object side, a negative meniscus lens L12 having a convex surface facing the object side, and a positive meniscus lens L13 having a convex surface facing the object side. An image side lens surface of the negative meniscus lens L12 is aspherically shaped.

The second lens group G2 is composed of, in order from the object side, a first segment group G2a having positive refractive power, a second segment group G2b having negative refractive power, an aperture stop S and a third segment group G2c having positive refractive power.

The first segment group G2a consists of a positive lens L21 having a double convex shape. An object side lens surface of the positive meniscus lens L21 is aspherical.

The second segment group G2b consists of, in order from the object side, a cemented lens constructed by a negative meniscus lens L22 having a convex surface facing the object side cemented with a positive meniscus lens L23 having a convex surface facing the object side.

The third segment group G2c consists of a positive lens L24 having a double convex shape.

The third lens group G3 consists of a negative meniscus lens L31 having a convex surface facing the object side. An image side lens surface of the negative meniscus lens L31 is aspherical.

The fourth lens group G4 consists of a plano convex positive lens L41 having a convex surface facing the object side. An image side lens surface of the positive lens L41 is aspherical.

In the zoom lens of the present example being constructed as above, upon varying magnification from a wide-angle end state to a telephoto end state, the first lens group G1 is moved along the optical axis and the second lens group G2 and the third lens group G3 are moved along the optical axis toward the object side, such that an air distance between the first lens group G1 and the second lens group G2 is decreased, an air distance between the second lens group G2 and the third lens group G3 is increased, and an air distance between the third lens group G3 and the fourth lens group G4 is increased.

Incidentally, the position of the fourth lens group G4 is fixed upon varying magnification. The first segment group G2a, the second segment group G2b, the aperture stop S and the third segment group G2c in the second lens group G2 are moved in a body upon varying magnification.

In the zoom lens of the present example, focusing from an infinite distance object to a close distance object is carried out by moving the third lens group G3 along the optical axis toward the image side.

In the zoom lens of the present example, vibration reduction is carried out by moving the first segment group G2a in the second lens group G2 as a movable group to have a component in a direction perpendicular to the optical axis.

Table 15 below shows various values associated with the zoom lens according to the present example.

TABLE 15

15-th Example

[Surface Data]

| m | r | d | nd | vd |
|---|---|---|---|---|
| OP | ∞ | | | |
| 1 | 65.074 | 1.00 | 1.7678 | 49.7 |
| 2 | 10.582 | 2.22 | | |
| 3 | 21.472 | 1.00 | 1.7766 | 48.7 |
| *4 | 9.015 | 0.60 | | |
| 5 | 11.386 | 2.67 | 2.0006 | 25.5 |
| 6 | 22.956 | Variable | | |
| *7 | 15.422 | 1.20 | 1.4978 | 82.6 |
| 8 | −460.710 | 1.48 | | |
| 9 | 9.744 | 0.60 | 1.8081 | 22.7 |
| 10 | 6.869 | 1.20 | 1.8830 | 40.8 |
| 11 | 7.816 | 2.11 | | |
| 12 (S) | ∞ | 1.50 | | |
| 13 | 14.686 | 1.63 | 1.4978 | 82.6 |
| 14 | −19.110 | Variable | | |
| 15 | 10.782 | 0.80 | 1.6908 | 36.5 |
| *16 | 7.017 | Variable | | |
| 17 | ∞ | 2.50 | 1.7007 | 56.3 |
| *18 | −28.026 | BF | | |
| I | ∞ | | | |

[Aspherical Surface Data]

| m | κ | A4 | A6 | A8 | A10 |
|---|---|---|---|---|---|
| 4 | 0.000E+00 | −1.642E−04 | −1.853E−07 | −1.249E−08 | −2.299E−10 |
| 7 | 0.000E+00 | −1.148E−04 | 9.544E−07 | −2.877E−08 | −5.249E−10 |
| 16 | 0.000E+00 | −2.139E−05 | 1.247E−06 | −5.518E−08 | 0.000E+00 |
| 18 | 0.000E+00 | 4.282E−05 | −1.969E−06 | 1.391E−08 | −3.253E−11 |

[Various Data]

| | W | T |
|---|---|---|
| f | 10.2 | 29.40 |
| FNO | 3.6 | 6.35 |
| 2ω | 77.6° | 31.2° |
| Y | 8.20 | 8.20 |
| TL | 59.06 | 59.06 |
| BF | 12.58 | 12.58 |

(Upon focusing on an infinitely distant Object)

| | W | M | T |
|---|---|---|---|
| f | 10.20 | 19.99 | 29.40 |
| d6 | 17.84 | 5.24 | 1.15 |
| d14 | 1.61 | 7.63 | 12.53 |
| d16 | 6.50 | 9.11 | 12.31 |
| BF | 12.58 | 12.58 | 12.58 |

[Lens Group Data]

| | ST | f |
|---|---|---|
| G1 | 1 | −15.4661 |
| G2 | 7 | 14.4691 |

TABLE 15-continued

| 15-th Example | | | |
|---|---|---|---|
| G3 | 15 | −31.8519 | |
| G4 | 17 | 40.0000 | |

| [Vibration Reduction Data] | | | |
|---|---|---|---|
| | W | M | T |
| f | 10.20 | 19.99 | 29.40 |
| Z | 0.07 | 0.10 | 0.12 |
| θ | 0.3 | 0.3 | 0.3 |
| K | 0.80 | 1.04 | 1.27 |

[Values for Conditional Expressions]

fvr = 30.00
(4-1) |fw/fvr| = 0.34
(4-2) fw/f2 = 0.70
(4-3) |f2/fvr| = 0.48

Figure 41A:
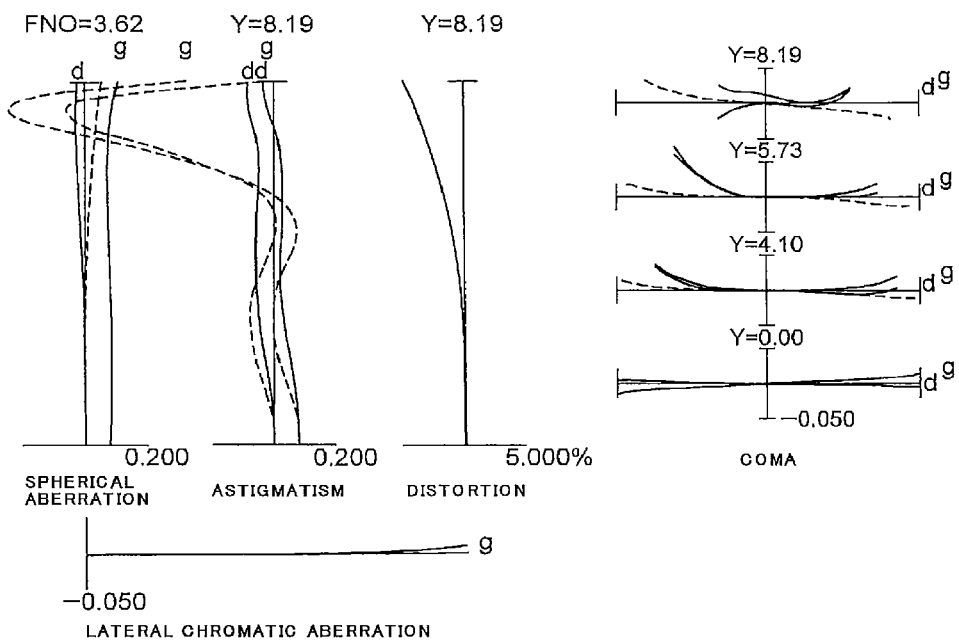
Figure 41B:
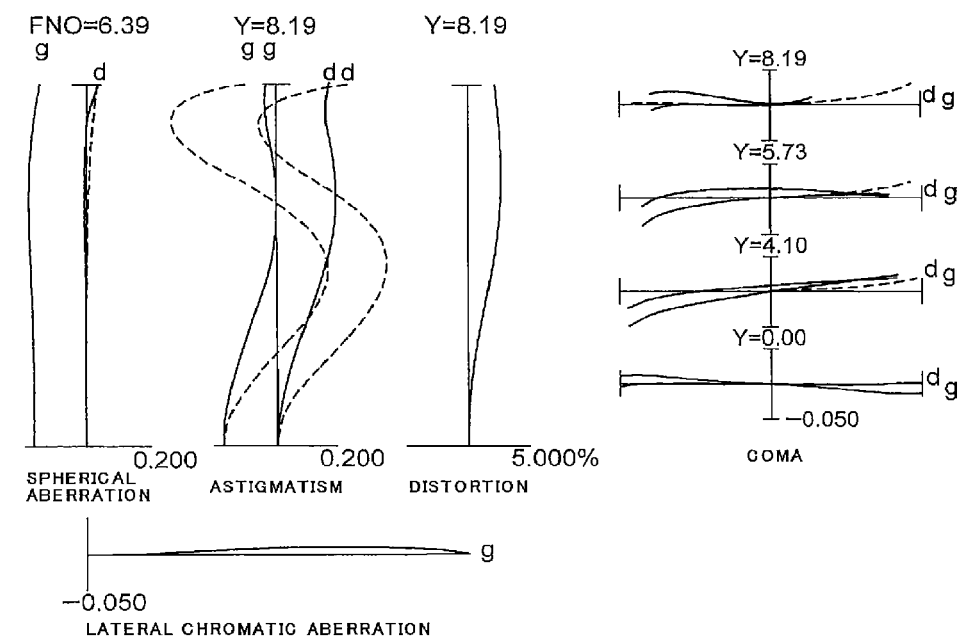

FIGS. 41A and 41B are graphs showing various aberrations upon focusing on an infinitely distant object in the wide-angle end state and in the telephoto end state of the zoom lens according to the 15-th example of the present application.

Figure 42A:
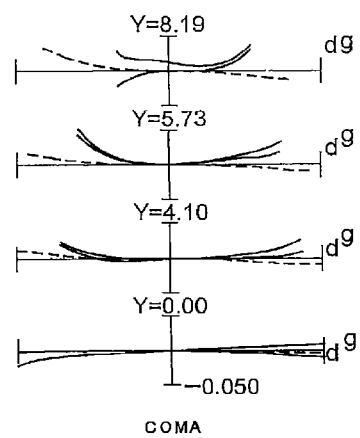
FIGS. 42A and 42B are respectively graphs showing coma aberration upon conducting vibration reduction of the zoom lens according to the 15-th Example of the present application in a wide angle end state and in a telephoto end state, upon focusing on an infinitely distant object.
Figure 42B:
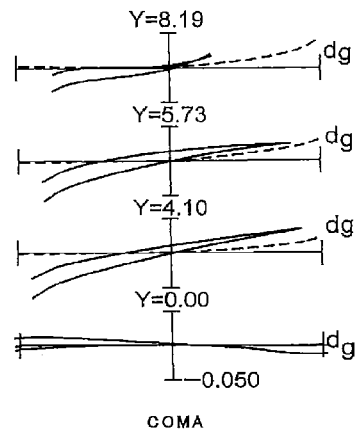

FIGS. 42A and 42B are respectively graphs showing coma aberrations at the time when vibration reduction is carried out against rotational camera shake of 0.3° upon focusing on the infinitely distant object in the wide-angle end state and against rotational camera shake of 0.3° upon focusing on the infinitely distant object in the telephoto end state of the zoom lens according to the 15-th example of the present application.

Figure 43A:
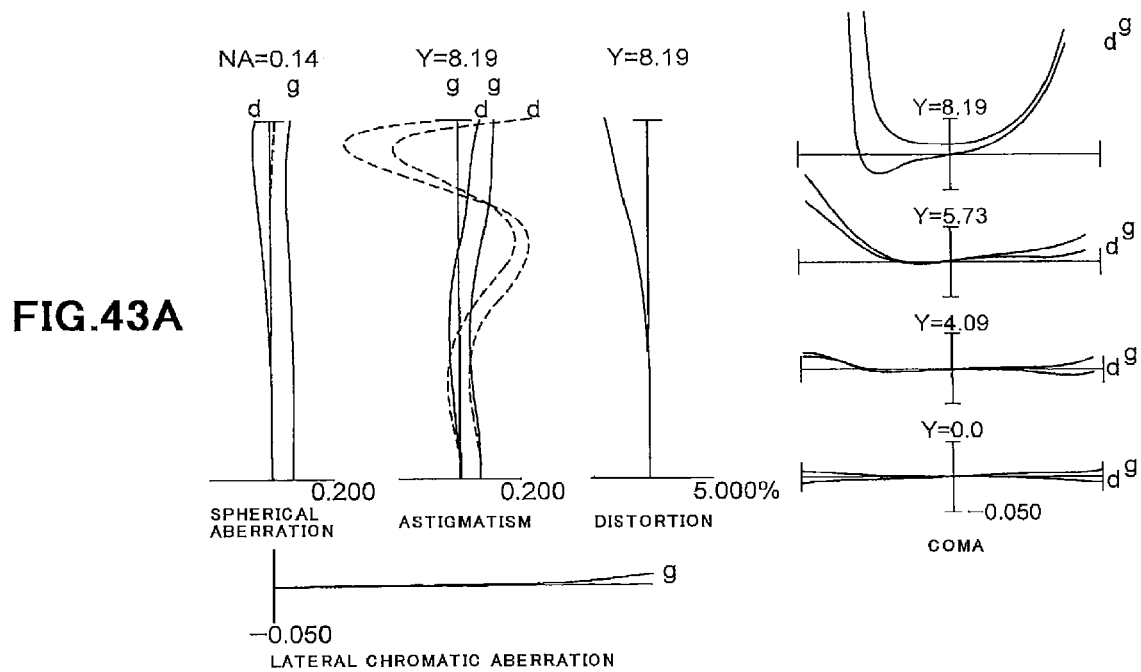
FIGS. 43A and 43B are respectively graphs showing various aberrations of the zoom lens according to the 15-th Example of the present application in a wide angle state and in a telephoto end state, upon focusing on an infinitely distant object.
Figure 43B:
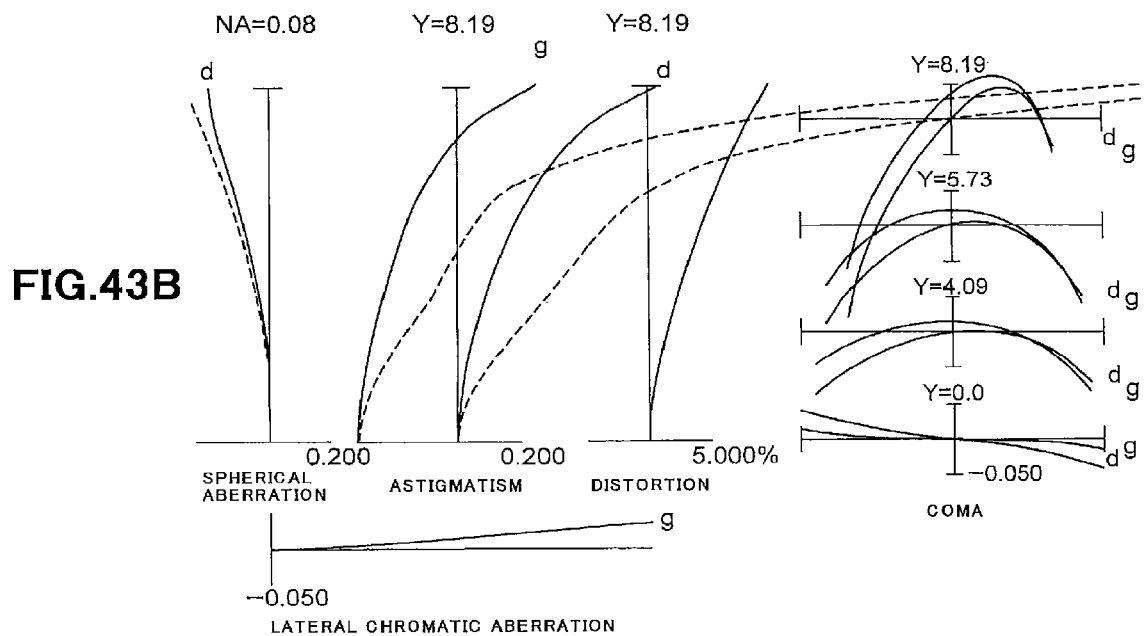

FIGS. 43A and 43B are graphs showing various aberrations upon focusing on a close distance object in the wide-angle end state and in the telephoto end state of the zoom lens according to the 15-th example of the present application.

As apparent from the respective aberration diagrams, it is understood that the zooming lens system according to the present example corrects well the various aberrations from the wide-angle end state to the telephoto end state throughout, and further exhibits the high optical performances even when vibration reduction is carried out.

According to the said 14-th and 15-th examples, it is possible to realize a zoom lens which is short in the entire length, small sized and light in weight and which has excellent optical performances.

According to each example as above-mentioned, it is possible to realize a zoom lens having high optical performances.

Note that each of the above described examples is a concrete example of the invention of the present application, and the invention of the present application is not limited to them. The contents described below can be adopted without deteriorating optical performances of the zoom lens of the present application.

Although the zoom lens having four or five group configuration were illustrated above as numerical examples of the zoom lens according to the first to fourth embodiments of the present application, the present application is not limited to them and the zoom lens having other configurations (such as six group configuration and the like) can be configured. Concretely, a lens configuration that a lens or a lens group is added to the most object side as well as to the most image side of the zoom lens according to the first to fourth embodiments of the present application is also possible.

Further, in the zoom lens according to the first to fourth embodiments of the present application, a portion of a lens group, a single lens group in the entirety thereof, or a plurality of lens groups can be moved in the direction of the optical axis as a focusing lens group. It is particularly preferable that at least a portion of the third lens group is moved as the focusing lens group. The focusing lens group can be used for auto focus, and suitable for being driven by a motor for auto focus such as an ultrasonic motor.

Further, in the zoom lens according to the first to fourth embodiments of the present application, any lens group in the entirety thereof or a portion thereof can be so moved, as a vibration reduction lens group, to have a component in a direction perpendicular to the optical axis, or rotationally moved (swayed) in an in-plane direction including the optical axis for carrying out vibration reduction. Particularly, in the zoom lens according to the first to fourth embodiments of the present application, it is preferable that at least a portion of the second lens group is used as a vibration reduction lens group.

Further, in the zoom lens according to the first to fourth embodiments of the present application, a lens surface of a lens may be a spherical surface, an aspherical surface or a plane surface. When a lens surface is a spherical surface or a plane surface, lens processing, assembling and adjustment become easy, and it is possible to prevent deterioration in optical performance caused by errors in lens processing, assembling and adjustment, so that it is preferable. Moreover, even if an image plane is shifted, deterioration in representation performance is little, so that it is preferable. When a lens surface is an aspherical surface, the aspherical surface may be fabricated by a grinding process, a glass molding process that a glass material is formed into an aspherical shape by a mold, or a compound type process that a resin material on a glass lens surface is formed into an aspherical shape. A lens surface may be a diffractive optical surface, and a lens may be a graded-index type lens (GRIN lens) or a plastic lens.

Further, in the zoom lens according to the first to fourth embodiments of the present application, it is preferable that an aperture stop is disposed in the second lens group, and the function may be substituted by a lens frame without disposing a member as an aperture stop.

Moreover, the lens surface(s) of the lenses configuring the zoom lens according to the first to fourth embodiments of the present application may be coated with anti-reflection coating(s) having a high transmittance in a broad wave range. With this contrivance, it is feasible to reduce a flare as well as ghost and attain a high optical performance with high contrast.

Further, in the zoom lens according to the first and second embodiments of the present application, it is preferable that, in the second lens group, the front lens group and the rear lens group each has at least one negative lens and at least one positive lens. With this configuration, chromatic aberration can be corrected by both of the front lens group and the rear lens group.

Further, in the zoom lens according to the first and second embodiments of the present application, it is preferable that at least a portion of one of the front lens group and the rear lens group in the second lens group is made to be a movable group, and when other lens group(s) than the movable group included in the second lens group is(are) made to be fixed group(s), the movable group and the fixed group each includes at one negative lens and at least one positive lens. With this configuration, it is possible to realize a zoom lens by which longitudinal chromatic aberration and lateral chromatic aberration upon conducting no vibration reduction and longitudinal chromatic aberration and lateral chromatic aberration upon conducting vibration reduction are corrected in well balanced manner, thereby chromatic aberrations being corrected superbly at both times when vibration reduction is conducted and when no vibration reduction is conducted.

Next, a camera equipped with the zoom lens according to the first to fourth embodiments of the present application, will be explained with reference to FIG. 44.

Figure 44:
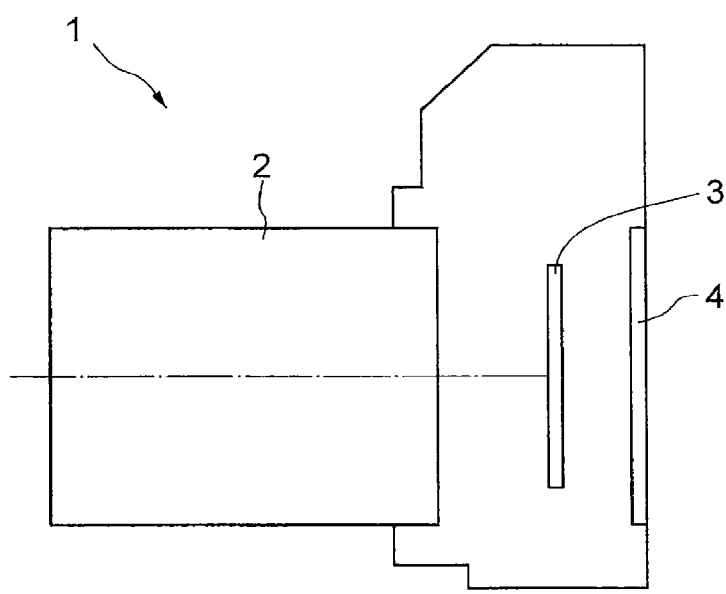
FIG. 44 is a configuration of a camera equipped with the zoom lens according to the first to fourth embodiments of the present application.

FIG. 44 is a view showing a configuration of a camera equipped with the zoom lens according to the first to fourth embodiments of the present application.

A camera 1 shown in FIG. 44 is a lens interchangeable type so-called mirror-less camera equipped with the zoom lens according to the first example as an imaging lens 2, as shown in FIG. 44.

In the camera 1, light emitted from an unillustrated object (an object to be imaged) is converged by the imaging lens 2, and forms an image of the object to be imaged on an imaging plane of an imaging part 3 through an unillustrated OLPF (optical low pass filter). The image of the object to be imaged is photo-electronically converted through a photo-electronic conversion element provided in the imaging part 3 to form an object image. This object image is displayed on an EVF (electronic view finder) 4 provided on the camera 1. Thus, a photographer can observe the object image through EVF 4.

When the photographer presses an unillustrated release button, the object image formed through the imaging part 3 is stored in an unillustrated memory. Thus, the photographer can take a picture of the object to be imaged by the camera 1.

The zoom lens according to the first example mounted on the camera 1 as the imaging lens 2 is a zoom lens having a high optical performance. Accordingly, the camera 1 can realize a high optical performance. Incidentally, even if the camera is so composed that the zoom lens according to the second to 15-th examples is mounted on the camera as the imaging lens 2, the same effect can be attained as the camera 1.

Figure 46:
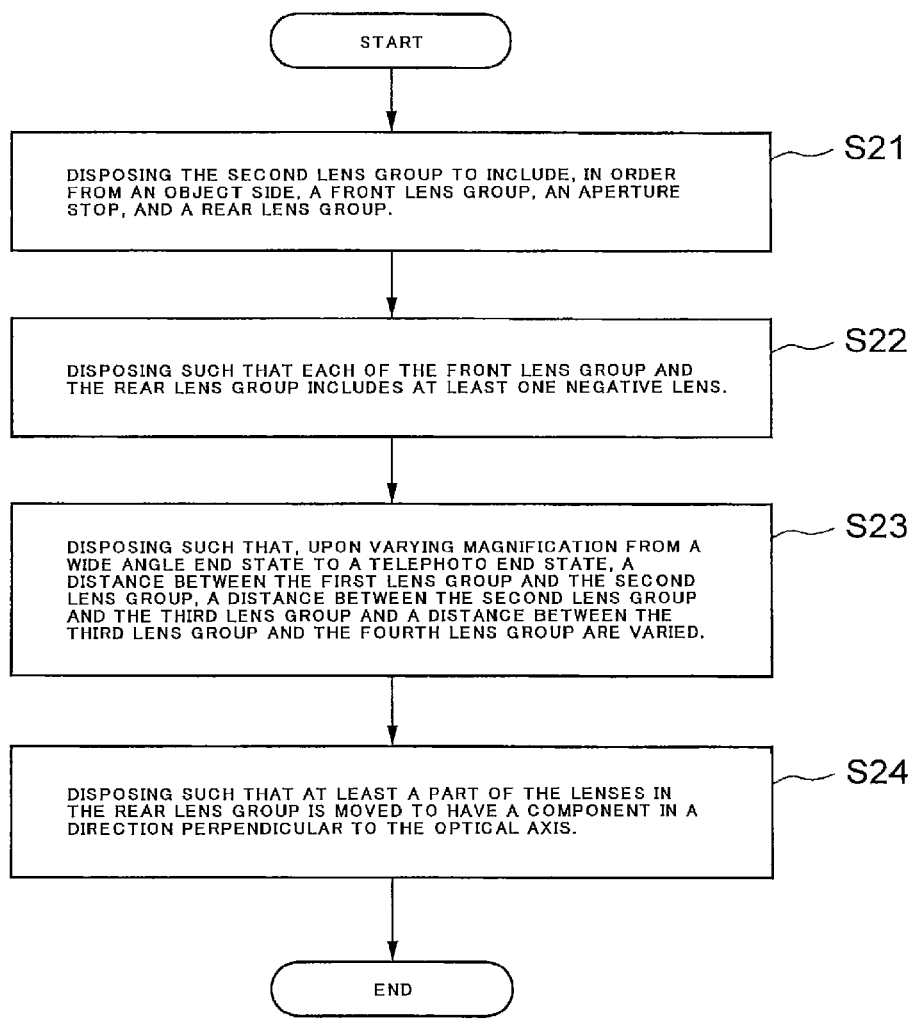
FIG. 46 is a flowchart schematically showing a method for manufacturing the zoom lens according to the second embodiment of the present application.
Figure 47:
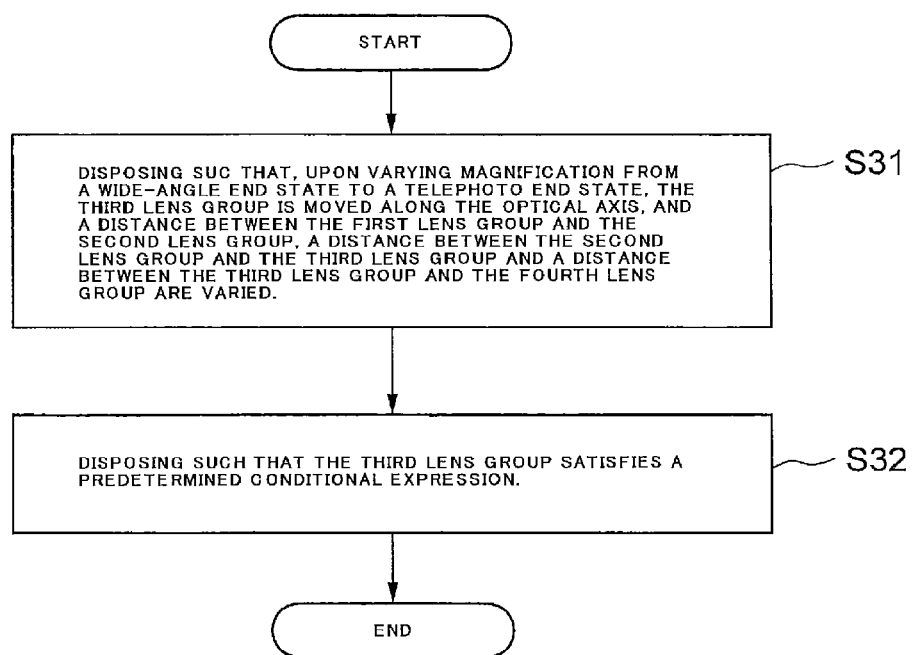
FIG. 47 is a flowchart schematically showing a method for manufacturing the zoom lens according to the third embodiment of the present application.
Figure 48:
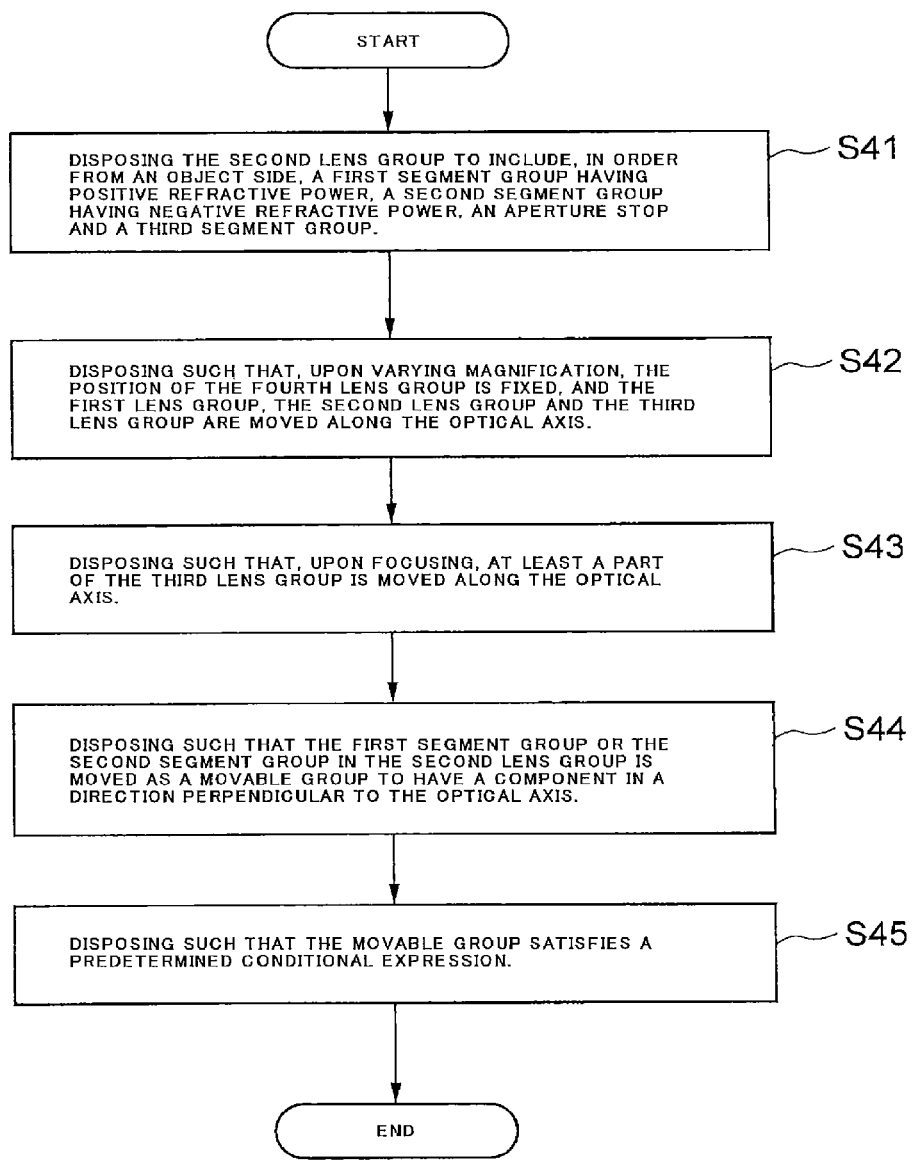
FIG. 48 is a flowchart schematically showing a method for manufacturing the zoom lens according to the fourth embodiment of the present application.

Next, an outline of each of methods for manufacturing the zoom lens according to the first to fourth embodiments of the present application is described with referring to FIG. 46 to FIG. 48.

Figure 45:
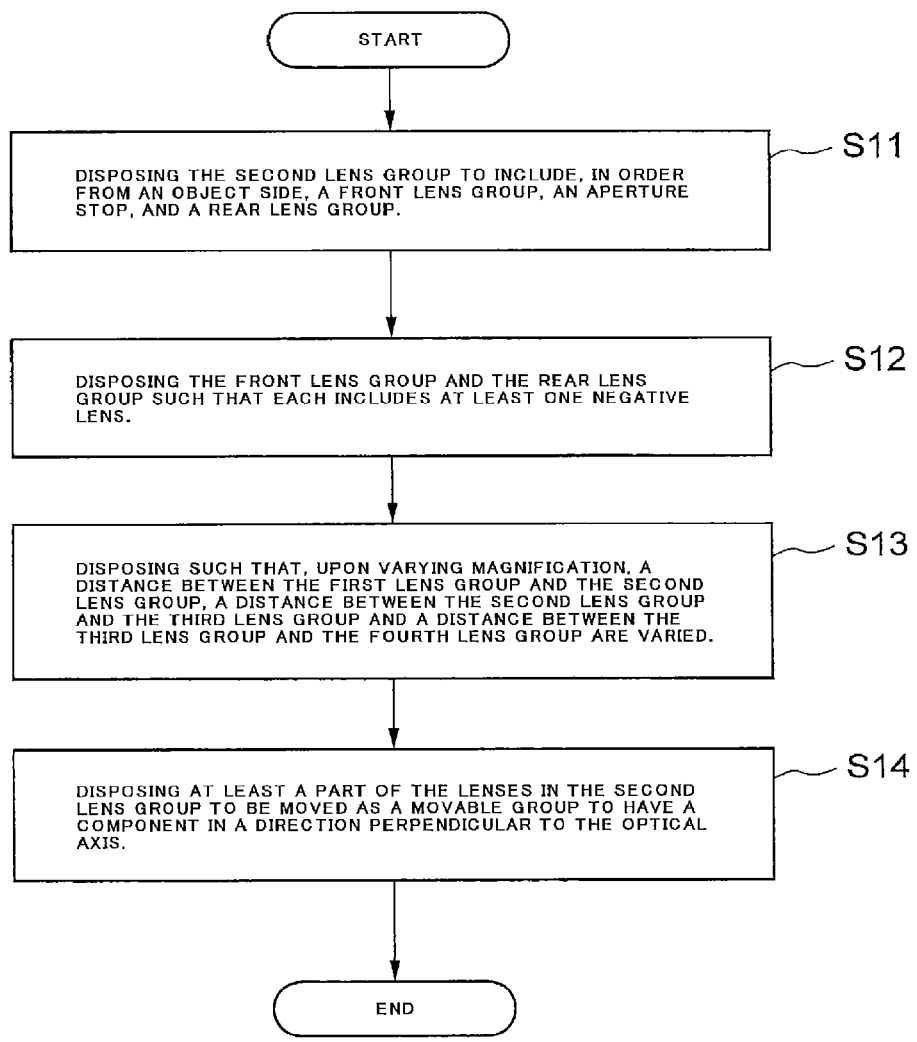
FIG. 45 is a flowchart schematically showing a method for manufacturing the zoom lens according to the first embodiment of the present application.

In a method for manufacturing a zoom lens according to the first embodiment of the present application, as shown in FIG. 45, the zoom lens comprises, in order from an object side: a first lens group having negative refractive power; a second lens group having positive refractive power; a third lens group having negative refractive power; and a fourth lens group having positive refractive power. The method comprises the following steps of S11 to S14:

Step S11: disposing the second lens group to include, in order from the object side, a front lens group, an aperture stop, and a rear lens group.

Step S12: disposing the first to fourth lens groups in a lens barrel such that the front lens group and the rear lens group each includes at least one negative lens.

Step S13: by, for example, providing a known movement mechanism at the lens barrel, constructing a distance between the first lens group and the second lens group, a distance between the second lens group and the third lens group, and a distance between the third lens group and the fourth lens group to be varied upon varying magnification.

Step S14: by, for example, providing a known movement mechanism at the lens barrel, constructing such that at least a portion of lenses in the second lens groups is moved as a movable group to have a component in a direction perpendicular to the optical axis.

Thus, the method for manufacturing the zoom lens according to the first embodiment of the present application can manufacture a zoom lens by which chromatic aberrations can be corrected excellently at both times when vibration reduction is conducted and when vibration reduction is not conducted, and which has superb optical performances.

In a method for manufacturing a zoom lens according to the second embodiment of the present application, as shown in FIG. 46, the zoom lens comprises, in order from an object side: a first lens group having negative refractive power; a second lens group having positive refractive power; a third lens group having negative refractive power; and a fourth lens group having positive refractive power. The method comprises the following steps of S21 to S24:

Step S21: disposing the second lens group to include, in order from the object side, a front lens group, an aperture stop, and a rear lens group.

Step S22: disposing the first to fourth lens groups in a lens barrel such that the front lens group and the rear lens group each includes at least one negative lens.

Step S23: by, for example, providing a known movement mechanism at the lens barrel, constructing such that a distance between the first lens group and the second lens group, a distance between the second lens group and the third lens group, and a distance between the third lens group and the fourth lens group to be varied upon varying magnification from the wide-angle end state to the telephoto end state.

Step S24: by, for example, providing a known movement mechanism at the lens barrel, constructing such that at least a portion of lenses in the rear lens groups is moved to have a component in a direction perpendicular to the optical axis.

Thus, the method for manufacturing the zoom lens according to the second embodiment of the present application can manufacture a zoom lens by which chromatic aberrations can be corrected excellently at both times when vibration reduction is conducted and when vibration reduction is not conducted, and which has superb optical performances.

In a method for manufacturing a zoom lens according to the third embodiment of the present application, as shown in FIG. 47, the zoom lens comprises, in order from an object side: a first lens group having negative refractive power; a second lens group having positive refractive power; a third lens group having negative refractive power; and a fourth lens group having positive refractive power. The method comprises the following steps of S31 to S34:

Step S31: disposing the first to fourth lens groups in a lens barrel in order from the object side. Providing a known movement mechanism in the lens barrel such that the third lens group is moved along the optical axis and a distance between the first lens group and the second lens group, a distance between the second lens group and the third lens group and a distance between the third lens group and the fourth lens group are varied upon varying magnification from the wide-angle end state to the telephoto end state.

Step S32: disposing such that the third lens group satisfies the following conditional expression (3-1):

$$0.50 < m3/fw < 0.80 \qquad (3\text{-}1)$$

where m3 denotes an amount of movement of the third lens group upon varying magnification from the wide angle end state to the telephoto end state, and fw denotes a focal length of the zoom lens in the wide angle end state.

Thus, the method for manufacturing the zoom lens according to the third embodiment of the present application can manufacture a small-sized zoom lens whose entire length is short and which has a high optical performance.

In a method for manufacturing a zoom lens according to the fourth embodiment of the present application, as shown in FIG. 48, the zoom lens comprises, in order from an object side: a first lens group having negative refractive power; a second lens group having positive refractive power; a third lens group having negative refractive power; and a fourth lens group having positive refractive power. The method comprises the following steps of S41 to S45:

Step S41: disposing the second lens group to include, in order from the object side, a first segment group having positive refractive power, a second segment group having negative refractive power, an aperture stop and a third segment group, and disposing the first to fourth lens groups in a lens barrel in order from the object side.

Step S42: by, for example, providing a known movement mechanism at the lens barrel, constructing such that the position of the fourth lens group is fixed and the first to third lens groups are movable along the optical axis.

Step S43: by, for example, providing a known movement mechanism at the lens barrel, disposing at least a portion of the third lens group is movable along the optical axis.

Step S44: by, for example, providing a known movement mechanism at the lens barrel, disposing such that the first segment group or the second segment group in the second lens group is movable as a movable group to have a component in a direction perpendicular to the optical axis.

Step S45: disposing such that the movable group satisfies the following conditional expression (4-1):

$$0.15 < |fw/fvr| < 0.50 \qquad (4\text{-}1)$$

where fw denotes a focal length of the zoom lens in the wide angle end state, and fvr denotes a focal length of the movable group.

Thus, the method for manufacturing the zoom lens according to the fourth embodiment of the present application can manufacture a zoom lens which is small sized and which has superb optical performances.

What is claimed is:

1. A zoom lens comprising, in order from an object side: a first lens group having negative refractive power; a second lens group having positive refractive power; a third lens group having negative refractive power and a fourth lens group having positive refractive power;

upon varying magnification, a distance between the first lens group and the second lens group, a distance between the second lens group and the third lens group and a distance between the third lens group and the fourth lens group being varied;

the second lens group including, in order from the object side, a front lens group, an aperture stop, and a rear lens group;

each of the front lens group and the rear lens group including at least one positive lens; and at least a part of the lenses in the second lens group being moved as a movable group to have a component in a direction perpendicular to an optical axis.

2. A zoom lens according to claim 1, wherein the following conditional expression is satisfied:

$$1.00 < |f2vr|/fw < 4.00$$

where f2vr denotes a focal length of the movable group; and fw denotes a focal length of the zoom lens in a wide angle end state.

3. A zoom lens according to claim 1, wherein the following conditional expression is satisfied:

$$0.50 < |f2vr|/f2 < 5.00$$

where f2vr denotes a focal length of the movable group; and f2 denotes a focal length of the second lens group.

4. A zoom lens according to claim 1, wherein the following conditional expression is satisfied:

$$1.00 < m12/fw < 2.00$$

where m12 denotes an amount of variation in a distance along the optical axis from a most image side lens surface in the first lens group to a most object side lens surface in the second lens group upon varying magnification from a wide angle end state to a telephoto end state; and fw denotes a focal length of the zoom lens in the wide angle end state.

5. A zoom lens according to claim 1, wherein upon varying magnification from a wide angle end state to a telephoto end state, the first lens group, the second lens group and the third lens group are moved along the optical axis and a position of the lens group disposed at a most image side is fixed.

6. A zoom lens according to claim 1, wherein the front lens group includes at least two lenses and has at least one aspherical surface.

7. A zoom lens according to claim 1, wherein upon varying magnification from a wide-angle end state to a telephoto end state, the third lens group is moved along the optical axis; and the following conditional expression is satisfied:

$$0.50 < m3/fw < 0.80$$

where m3 denotes an amount of movement of the third lens group upon varying magnification from the wide angle end state to the telephoto end state, and fw denotes a focal length of the zoom lens in the wide angle end state.

8. A zoom lens according to claim 7, wherein the fourth lens group comprises a meniscus lens having a convex surface facing an image side.

9. A zoom lens according to claim 8, wherein the following conditional expression is satisfied:

$$-5.00<(r42+r41)/(r42-r41)<-1.30$$

where r41 denotes curvature radius of an object side lens surface of the meniscus lens in the fourth lens group; and r42 denotes curvature radius of an image side lens surface of the meniscus lens in the fourth lens group.

10. A zoom lens according to claim 1, wherein
in the second lens group the front lens group consists of, in order from the object side, a first segment group having positive refractive power and a second segment group having negative refractive power, and the rear lens group consists of a third segment group;
upon varying magnification, the first lens group, the second lens group and the third lens group are moved along the optical axis, and a position of the fourth lens group is fixed;
upon focusing, at least a part of the third lens group is moved along the optical axis;
the first segment group or the second segment group in the second lens group is moved as a movable group to have a component in a direction perpendicular to the optical axis; and
the following conditional expression is satisfied:

$$0.15<|fw/fvr|<0.50$$

where fw denotes a focal length of the zoom lens in a wide angle end state, and fvr denotes a focal length of said movable group.

11. An optical apparatus being characterized in being equipped with the zoom lens according to claim 1.

12. A zoom lens comprising, in order from an object side: a first lens group having negative refractive power; a second lens group having positive refractive power; a third lens group having negative refractive power and a fourth lens group having positive refractive power;
the second lens group including, in order from the object side, a first segment group having positive refractive power, a second segment group having negative refractive power, an aperture stop and a third segment group having positive refractive power;
upon varying magnification, the first lens group, the second lens group and the third lens group being moved along the optical axis,
upon focusing, at least a part of the third lens group being moved along an optical axis;
the first segment group or the second segment group in the second lens group being moved as a movable group to have a component in a direction perpendicular to the optical axis; and
the following conditional expression being satisfied:

$$0.15<|fw/fvr|<0.50$$

where fw denotes a focal length of the zoom lens in a wide angle end state, and fvr denotes a focal length of said movable group.

13. A zoom lens according to claim 12, wherein the following conditional expression is satisfied:

$$0.50<fw/f2<0.90$$

where fw denotes a focal length of the zoom lens in the wide angle end state; and f2 denotes a focal length of the second lens group.

14. A zoom lens according to claim 12, wherein the following conditional expression is satisfied:

$$0.20<|f2/fvr|<0.60$$

where f2 denotes a focal length of the second lens group; and fvr denotes a focal length of the movable group.

15. An optical apparatus being characterized in being equipped with the zoom lens according to claim 12.

16. A method for manufacturing a zoom lens comprising, in order from an object side: a first lens group having negative refractive power; a second lens group having positive refractive power; a third lens group having negative refractive power and a fourth lens group having positive refractive power, comprising the steps of:
disposing the second lens group to include, in order from the object side, a front lens group, an aperture stop, and a rear lens group;
disposing the front lens group and the rear lens group such that each includes at least one positive lens;
disposing such that, upon varying magnification, a distance between the first lens group and the second lens group, a distance between the second lens group and the third lens group and a distance between the third lens group and the fourth lens group are varied; and
disposing at least a part of the lenses in the second lens group to be moved as a movable group to have a component in a direction perpendicular to an optical axis.

17. A method for manufacturing a zoom lens comprising, in order from an object side: a first lens group having negative refractive power; a second lens group having positive refractive power; a third lens group having negative refractive power and a fourth lens group having positive refractive power, comprising the steps of:
disposing the second lens group to include, in order from an object side, a first segment group having positive refractive power, a second segment group having negative refractive power, an aperture stop and a third segment group having a positive refractive power;
disposing such that, upon varying magnification, the first lens group, the second lens group and the third lens group are moved along an optical axis;
disposing such that, upon focusing, at least a part of the third lens group is moved along the optical axis;
disposing such that the first segment group or the second segment group in the second lens group is moved as a movable group to have a component in a direction perpendicular to the optical axis; and
disposing such that the movable group satisfies the following conditional expression:

$$0.15<|fw/fvr|<0.50$$

where fw denotes a focal length of the zoom lens in a wide angle end state, and fvr denotes a focal length of said movable group.

* * * * *